US011374500B2

(12) United States Patent
Jitaru

(10) Patent No.: US 11,374,500 B2
(45) Date of Patent: Jun. 28, 2022

(54) HARVESTING ENERGY FROM PARASITIC ELEMENTS OF A POWER CONVERTER

(71) Applicant: Rompower Technology Holdings, LLC, Tucson, AZ (US)

(72) Inventor: Ionel Jitaru, Tucson, AZ (US)

(*) Notice: Subject to any disclaimer, the term of this patent is extended or adjusted under 35 U.S.C. 154(b) by 42 days.

(21) Appl. No.: 17/428,943

(22) PCT Filed: Nov. 15, 2018

(86) PCT No.: PCT/US2018/061333
§ 371 (c)(1),
(2) Date: Aug. 5, 2021

(87) PCT Pub. No.: WO2019/099708
PCT Pub. Date: May 23, 2019

(65) Prior Publication Data
US 2022/0140742 A1    May 5, 2022

Related U.S. Application Data

(60) Provisional application No. 62/587,816, filed on Nov. 17, 2017.

(51) Int. Cl.
*H02M 3/335* (2006.01)
*H02M 1/00* (2006.01)
*H02M 3/158* (2006.01)

(52) U.S. Cl.
CPC ..... *H02M 3/33592* (2013.01); *H02M 1/0048* (2021.05); *H02M 3/1582* (2013.01); *H02M 3/33507* (2013.01)

(58) Field of Classification Search
None
See application file for complete search history.

(56) References Cited

U.S. PATENT DOCUMENTS

| | | | |
|---|---|---|---|
| 4,870,554 A | 9/1989 | Smith | |
| 7,012,817 B2 * | 3/2006 | Liu | H02M 1/34 363/20 |
| 7,130,204 B2 * | 10/2006 | Tsuruya | H01F 27/38 363/21.01 |
| RE40,072 E | 2/2008 | Prager et al. | |
| 8,669,744 B1 | 3/2014 | Vinciarelli | |
| 8,907,581 B2 * | 12/2014 | Ivankovic | H05B 45/382 315/210 |
| 9,899,929 B2 * | 2/2018 | Jitaru | H02M 3/33592 |
| 9,999,106 B2 * | 6/2018 | Huang | H02M 3/33507 |
| 2007/0097713 A1 | 5/2007 | Chang | |
| 2008/0031021 A1 | 2/2008 | Ros et al. | |
| 2014/0334194 A1 | 11/2014 | Davila | |
| 2015/0270784 A1 | 9/2015 | Dillersberger | |

* cited by examiner

*Primary Examiner* — Jeffrey A Gblende
(74) *Attorney, Agent, or Firm* — Thomas W. Galvani, P.C.; Thomas W. Galvani

(57) ABSTRACT

Power converter electronic circuitries configured to harvest and store energy from at least the parasitic oscillation occurring during the operation thereof. Methodologies of using such energy for the current injection, carried out by discharging the parasitic capacitance across the switching elements to achieve zero voltage switching condition for these switching elements. In a specific case, the methodology of current injection (with the use of so harvested and stored energy) is self-adjusting, causing the optimization of the energy required to discharge the parasitic capacitances.

26 Claims, 39 Drawing Sheets

(1) $Tr = 2\pi\sqrt{L_1 C_{eq}}$ (2) $W_1 = \frac{1}{2} C_{eq}(NV_O)^2$  (Reported to Vin)

(3) $W_2 = 0$  (Reported to Vin)

(4) $W_1 - W_2 = \frac{1}{2} L_1 I_{M1}^2$ (5) $I_{M1} = \dfrac{NV_O}{\sqrt{\dfrac{L_1}{C_{eq}}}}$

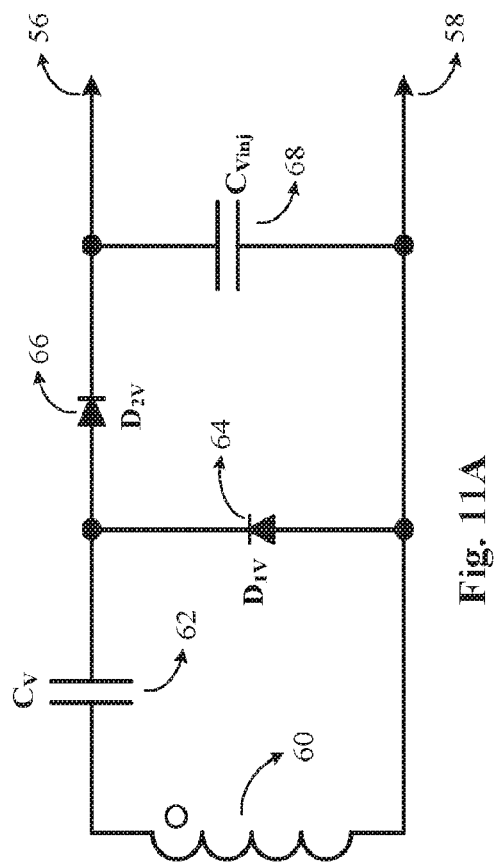
Fig. 11A
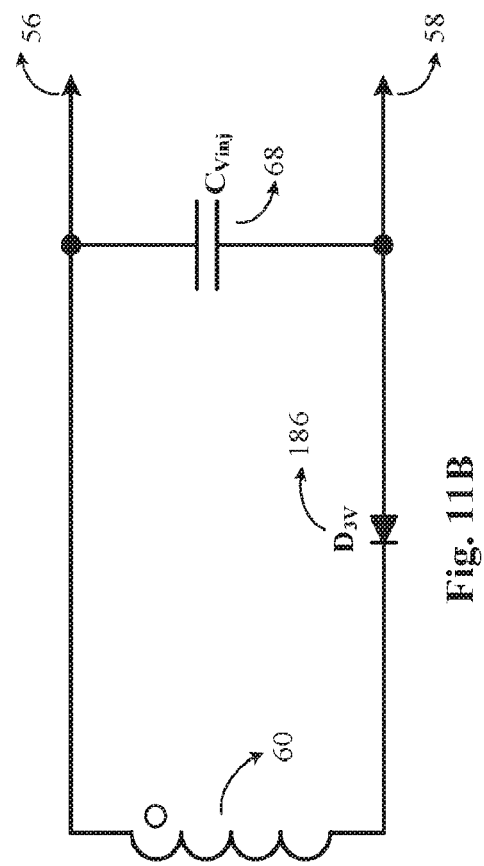
Fig. 11B
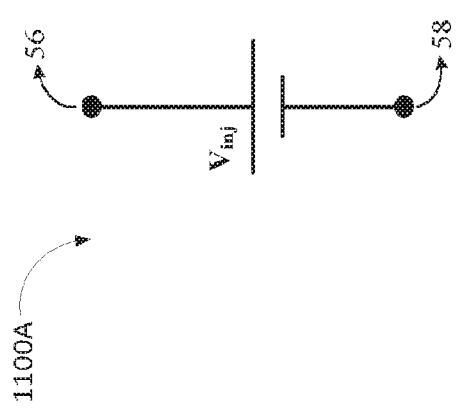
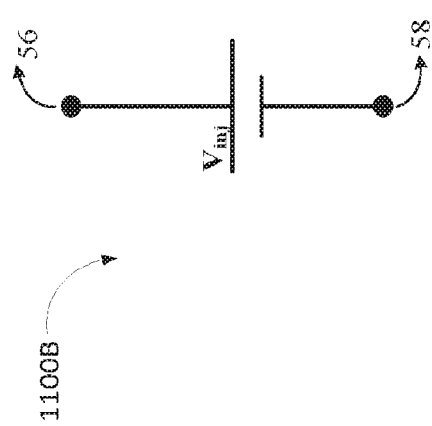

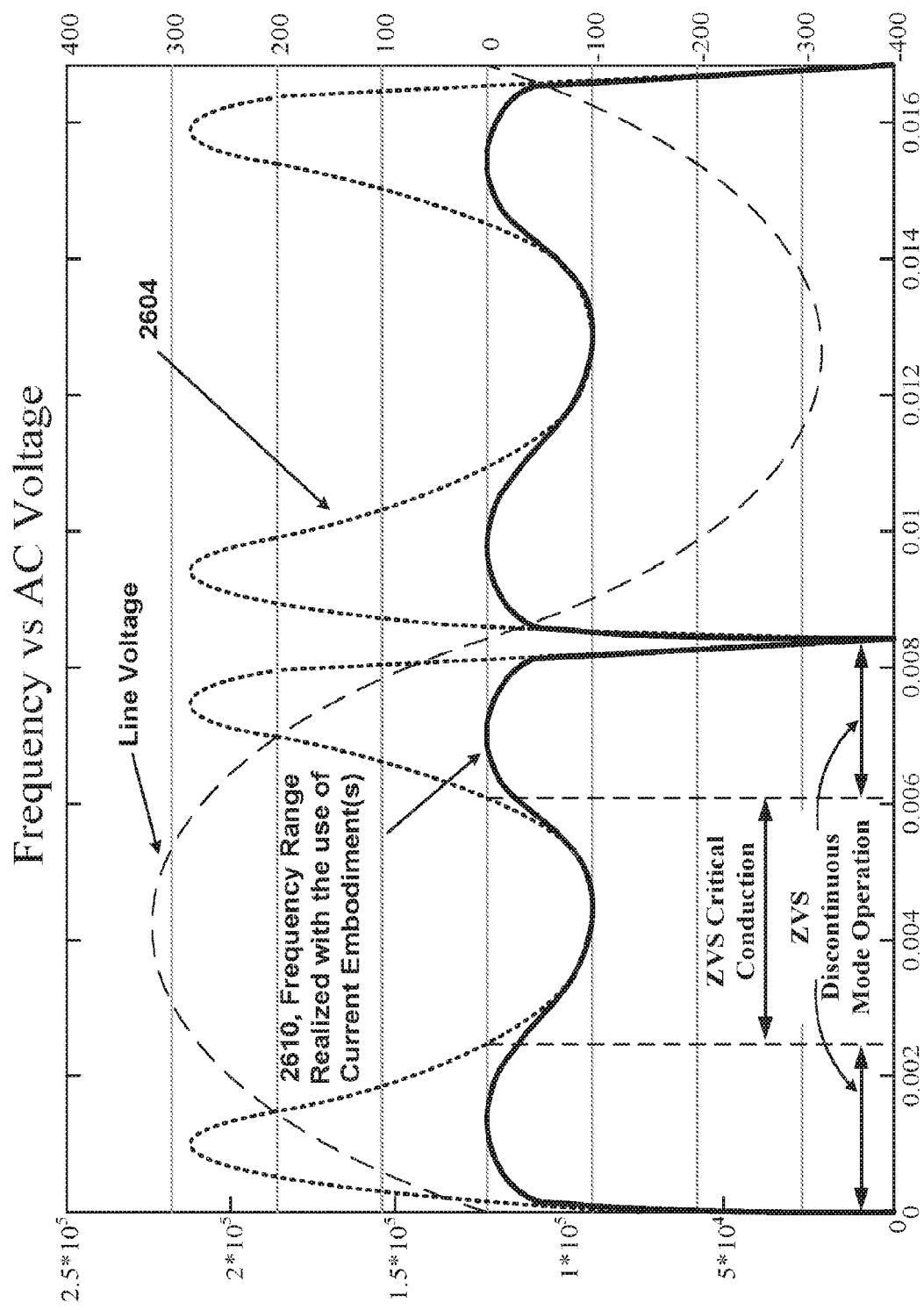

HARVESTING ENERGY FROM PARASITIC ELEMENTS OF A POWER CONVERTER

CROSS-REFERENCE TO RELATED APPLICATIONS

This patent application is a national stage entry application of, claims priority from, and claims benefit of International Application No. PCT/US2018/061333, filed Nov. 15, 2018, which claims priority from and benefit of the U.S. Provisional Patent Application No. 62/587,816 filed on Nov. 17, 2017 and titled "Harvesting Energy from the Parasitic Elements", both of which are incorporated herein by reference.

TECHNICAL FIELD

The present invention relates to AC-DC adaptors and, in particular, to solutions of harvesting the energy from the parasitic oscillation present during the operation of such adaptors and reusing this harvested energy to create zero voltage switching conditions for the main switch of an AC-DC adaptor.

RELATED ART

The flyback topology and buck and boost topologies are probably the most used topologies for constructing electronic circuits for AC-DC power converters. In the case of the flyback topology is explained with its simplicity, low cost of implementation, and the fact that the flyback-topology-based electronic circuitry can operate efficiently over a very large range of input voltage range. In AC-DC adapter applications (under about 70 W) the flyback topology operates when disposed after a simple bridge rectifier, where the input voltage range is from about 90Vac to about 264Vac in order to have a universal input voltage capability to operate over the entire world. To meet all the AC voltage standards existing in different countries, after the current rectification the flyback-based converter has to be able to operate efficiently from a DC input voltage ranging from about 127Vdc to about 375Vdc, which is a range in which the ratio of the upper limit to the lower limit of the range is almost 3:1. Moreover, the new standards for power delivery require an adapter to provide an output voltage ranging from about 5V to about 20V (which is a 4:1-ratio output voltage range). Most of the forward-derived topologies known in related art topologies are simply not able to operate efficiently over such large input and output voltage ranges.

The trend for miniaturization in portable equipment (such as laptops and tablets) extends the operational demands for AC-DC adapters. Currently most of the laptops and tablets require a power ranging from 30 W to 65 W. Despite the significant technological advancement in portable computing devices, laptops, and tablets—and substantial reduction of their sizes—is not accompanied, however, with the visible reduction of the dimensions of related AC-DC adapters. Such discrepancy raises a to-date-unsatisfied need for AC-DC adapters with reduced size and/or footprint. To reduce the size of the adapters while maintaining the convection-based cooling methodology used in the AC-DC adapters today, a significant improvement in efficiency of adapters is required as well as a reduction in size of the constituent magnetic and capacitive elements of the adapters (the latter may require an increase of the frequency of operation).

Over the years, the efficiency of operation of the AC-DC adapters was increased from 70% to 89-90% in most recent products, mostly due to the significant progress in semiconductor devices and better understanding of magnetic technology. The flyback topology possesses several drawbacks that limit the efficiency of its operation—among which are the dissipation of energy contained in the leakage inductance, energy contained in the parasitic oscillation during the dead time, and energy contained in the parasitic capacitance across the main switch. In most of the applications, a flyback-topology-based circuitry is used to operate in a discontinuous mode. In this mode, 1) the magnetizing current is built up from zero level to a peak level during a time period of conduction of the main switch, and after the main switch turns off the magnetizing current flows into the secondary winding and transfers the energy to the output capacitor until the magnetizing current decreases to zero, which is 2) followed by a period of time when no substantial energy is stored in the transformer or transferred to the secondary side, which period of time is referred as the "dead time".

In the boost-topology-based electronic circuitry the mode of operation it is similar. During the conduction time of the main switch, the magnetizing current is build up in the boost inductor. When the main switch turns off, the energy stored in the boost inductor is transferred to the output via the boost rectifier means (which can be a diode or a synchronized rectifier, in some cases). In a discontinuous mode of operation, after the energy is transferred to the output and the current through the boost rectifier reaches zero, there is a dead time period before the primary switch turns on again.

The loss of energy during the operation of conventional electronic circuitries configured according to flyback, boost, and buck topologies remains a problem limiting the efficiency of operation of the AC-DC adaptors and, therefore, preventing the reduction of sizes and footprints of such adaptors from being significantly reduced.

SUMMARY

Embodiments of the invention discussed in this disclosure address the problem that continues to persist in related art—specifically, the problem of loss/dissipation of energy from the parasitic oscillation during the dead time of operation of electronic circuits that are configured according to various topologies (and, in particular, of electronic circuits that are based on a flyback topology). The problem is solved by providing methodologies of harvesting such energy and using the harvested energy to create zero voltage switching conditions for the main switch of an AC-DC adaptor electronic circuitry. The proposed solutions increase the efficiency of the flyback and/or boost and/or buck topologies of the AC-DC adaptors, thereby causing a decrease of the dissipated heat and, as a result, creating conditions for a much higher power density (resulting, in practice, in the reduction of dimensions of the AC-DC adaptor). Furthermore, new topologies are discussed that operate while creating zero voltage switching conditions for the main switch even if and when these topologies operate in a continuous mode—in contradistinction with the related art. In related embodiments of this invention described are other methods of harvesting the energy from the parasitic capacitance reflected across the main switch of the converter and creating conditions for zero voltage switching on the main switch.

For example, embodiments of the invention provide an electronic circuitry having primary and secondary sides and comprising a power converter (including an input voltage source; a transformer having primary and secondary windings, on the primary and secondary sides, respectively; a combination of a main switch in parallel with a main switch capacitor, the combination being in series with the primary winding on the primary side; and a synchronous rectifier in series with the secondary winding on the secondary side) and a first electronic circuit (having a first auxiliary winding on the secondary side of the transformer in series with and between a first diode and a first terminal of a first switch; a first capacitor connected between a second terminal of the first switch and a ground; and a current source circuitry disposed in parallel with the first capacitor and connected directly to the second terminal of the first switch). The first electronic circuit is configured to store energy from parasitic oscillations, occurring across the main switch during dead time of operation of the power converter, in the first capacitor, thereby attenuating said parasitic oscillation without substantial dissipation of the energy from the parasitic oscillations.

In another example, such electronic circuitry may be complemented with an active clamp circuit across the main switch, the active clamp circuit containing a clamp switch and the clamp capacitor in series with the clamp switch. Here, the clamp switch may be configured to be turned on at a moment of time after the main switch is turned off and/or to be turned off at a moment of time prior to the moment of time at which current passing through the secondary winding reaches a zero level.

BRIEF DESCRIPTION OF THE DRAWINGS

FIG. 11A depicts an embodiment of a circuit for implementing a voltage source.

FIG. 11B shows a related embodiment of a circuit for implementing a voltage source.

FIG. 26B depicts the line voltage and the frequency variation in a PFC configured to utilize the embodiments of this invention.

The sizes and relative scales of elements in Drawings may be set to be different from actual size and scales to appropriately facilitate simplicity, clarity, and understanding of the Drawings. For the same reason, not all elements present in one Drawing may necessarily be shown and/or labeled in another.

It is intended that throughout this disclosure and in all Figures similar designations (labels of the same type) refer to and define electronic elements of the same type (diodes, synchronous rectifiers, switches, inductors, capacitors etc.) whether or not in any particular instance of presentation a name of a given element is expressly spelled out.

DETAILED DESCRIPTION

In this patent application are presented several solutions for harvesting the energy from the parasitic oscillations during the dead time during the operation of flyback-topology-based power converters, and also in buck-topology and/or and boost-topology based converters. The patent application presents additional solutions of injecting additional energy to the exiting energy of the parasitic oscillations from other sources such as leakage inductance. Further this patent application presents current injection circuits to obtain zero voltage switching across the main switch utilizing the energy from the parasitic oscillation and other energy sources such as leakage inductance energy.

Flyback Topology—Conventional Approaches

In the conventional use of the buck-topology-based electronic circuitry, during the conduction of the main switch the magnetizing current is built up through the buck inductor. When the main switch turns off, the energy stored in the buck inductor is further transferred to the output via the buck rectifier (which can be a diode or a synchronized rectifier). Just a in the case of the flyback-topology and the boost-topology operating in a discontinuous mode, there is a dead time after the current through the inductor element reaches zero and before the main switch turns on. In all these topologies and other topologies that operate in a discontinuous mode, during the dead time there exists a parasitic oscillation caused by the resonant circuit (formed by the parasitic capacitance reflected across the main switch and the inductive element). In prior art implementations such energy contained in the parasitic oscillation was mostly dissipated—especially for a larger dead time. Further, in most of flyback, boost and buck topologies discussed in related art, the main switch turns on when there is voltage present across the parasitic capacitance reflected across the main switch (which is referred to as hard switching mode).

Figure 1A:
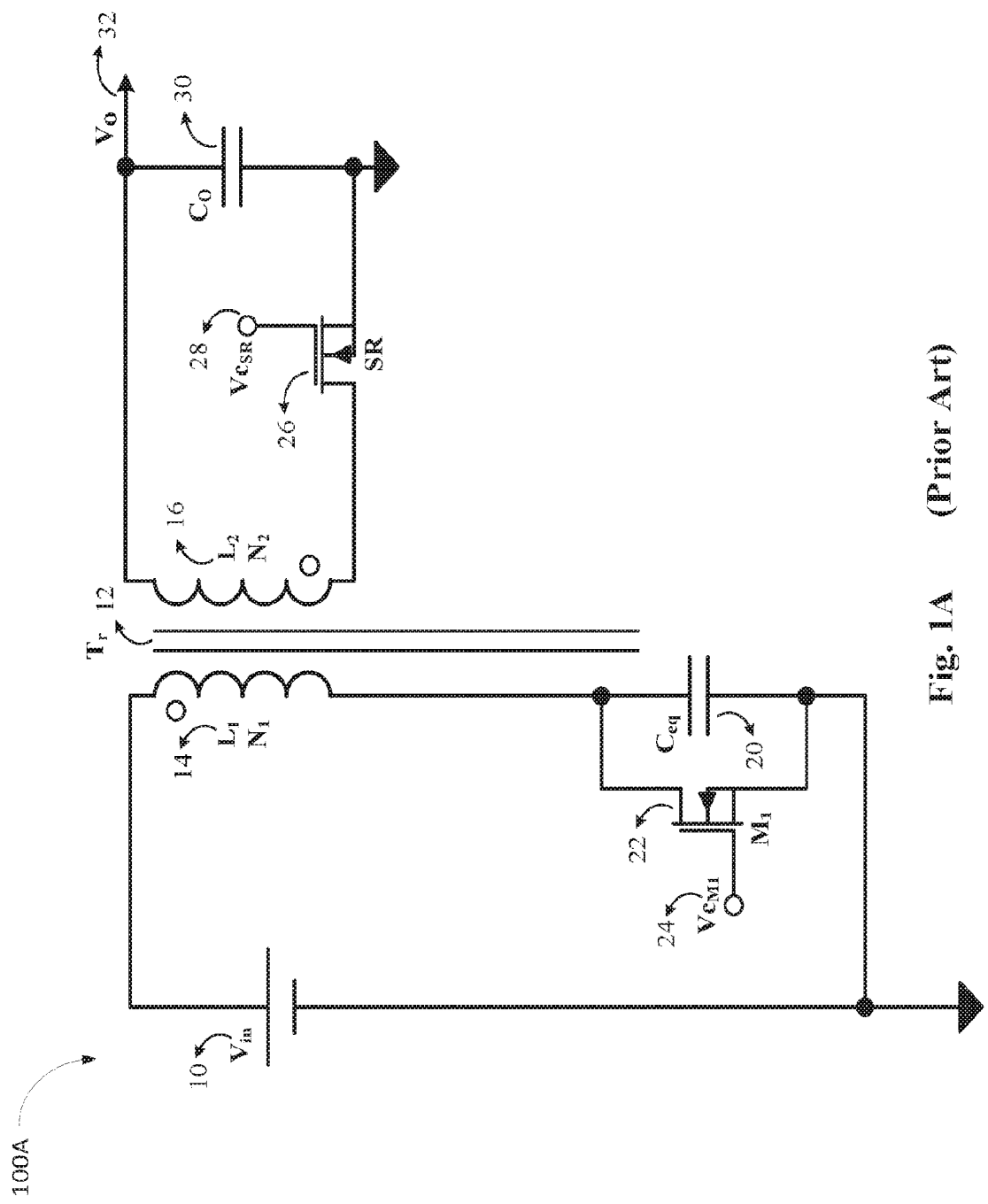
FIG. 1A depicts a conventional flyback topology using synchronous rectification.

A simplified schematic 100A of a flyback topogy of related art is shown, as an example, in FIG. 1A. A flyback-circuitry based converter is formed by a transformer (Tr, 12) having a primary winding (L1,14) with N1 winding turns in the primary side and a secondary winding (L2, 16) with N2 winding turns on the secondary side, a primary switch (M1, 22) controlled by a control signal (VcM1, 24), a parasitic capacitance (Ceq, 20) that is the reflected parasitic capacitance across the primary switch, a synchronous rectifier (SR, 26) controlled by a control signal (VcSR, 28), and an output capacitor (Co, 30).

Figure 2:
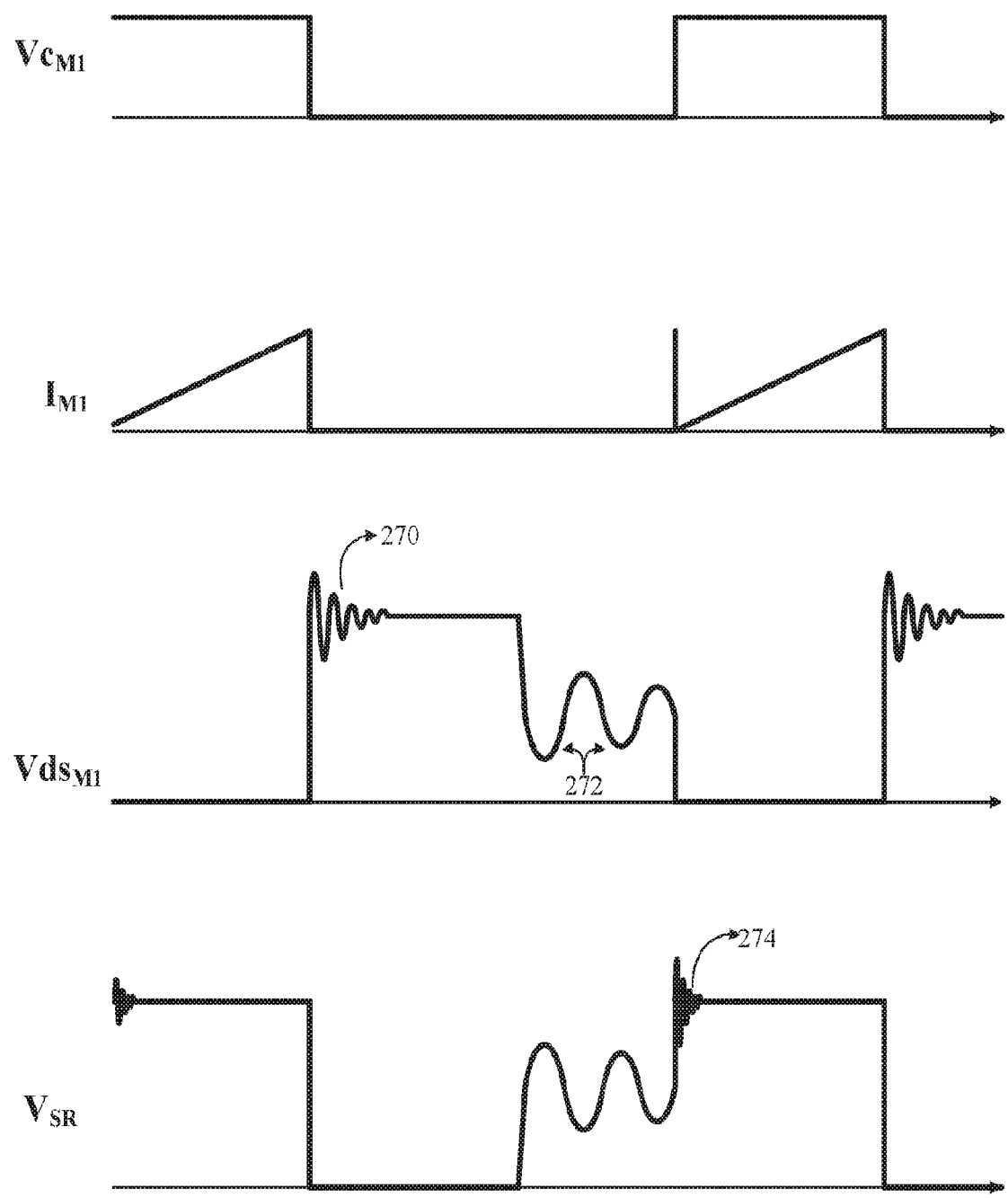
FIG. 2 depicts the key waveforms of operation of a conventional flyback topology of FIG. 1A.

FIG. 2 illustrates the key waveforms of the flyback-based converter 110A of FIG. 1A (as functions of time of operation) when the converter operates in a discontinuous mode. These key waveforms, presented as functions of time of operation, include the control signal for the main switch VcM1; the current through the main switch IM1; the voltage across the main switch VdsM1; and the voltage across the synchronous rectifier VSR. There is energy contained in the parasitic elements—such as the leakage inductance of the transformer—that creates a ringing across the primary switch, shown as 270. During the use of a conventional flyback-topology such as that of FIG. 1A, such energy is dissipated as is the energy contained in the parasitic oscillation across the main switch during the dead time (shown as 272) and the energy contained in the parasitic capacitance (Ceq,20), reflected across the primary switch (M1, 22). For example, in a 65 W flyback-topology-based converter (referred to as flyback converter, for short) that has a leakage inductance of 1.5 µJ, the energy contained in the leakage inductance at full load is 6.8 micro-J.

The parasitic oscillation during the dead time, 270, across the main switch has energy that is function of the voltage reflected from the secondary. For a parasitic capacitance Ceq of 260 pF across the primary switch and a reflected voltage from the secondary of 100 V, for example, the energy in the parasitic oscillation is 1.3 µJ The energy contained in the parasitic capacitance (Ceq, 20) across the primary switch is function of the input voltage. For a parasitic capacitance of 260 pF and DC input voltage of 141 Vdc the energy in Ceq is 2.58 µJ, and for a DC input voltage of 373 Vdc the energy contained in Ceq is 18 µJ. This energy is dissipated if the "turn on" of the main switch (M1, 28) is effectuated in a hard switch mode. In most of the related art flyback converters such energy is dissipated. In addition to that, in a hard switching mode there are spikes and high frequency ringing across the synchronized rectifier, shown as 274 in FIG. 2. That ringing 274 increases the noise and negatively impacts the electromagnetic interference (EMI), thereby requiring snubbers and the use of a higher voltage synchronized rectifiers which will reduce the efficiency of the circuit.

U.S. provisional patent application 62/571,594, the disclosure of which is incorporated by reference herein, presented several technologies designed to harvest the energy from the leakage inductance.

Figures 3, 4:
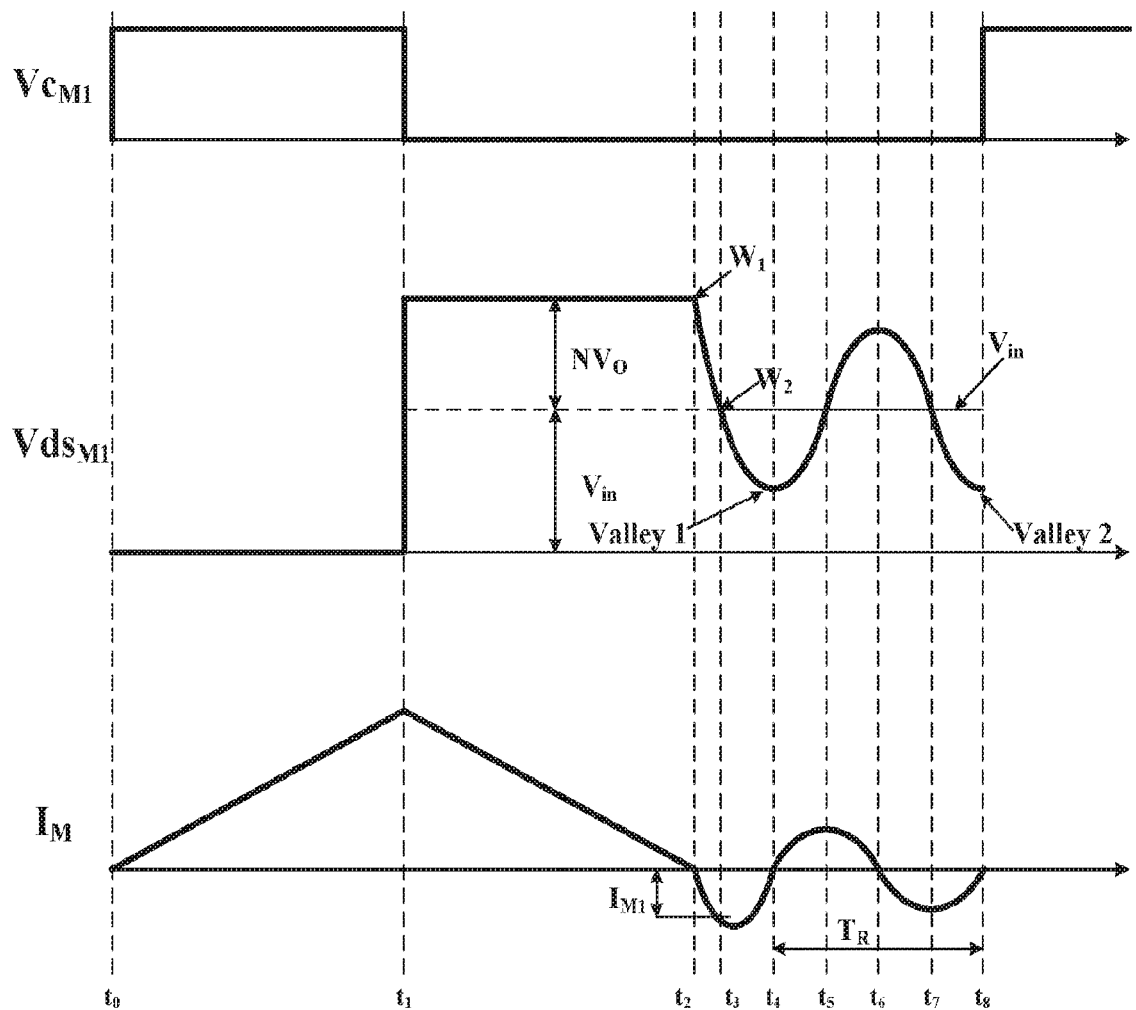
FIG. 3 are plots illustrating the key waveforms of a flyback topology with the parasitic oscillation during the dead time.
FIG. 4 depicts the key energy equations for the parasitic oscillation during the dead time.

FIG. 3 presents, as functions of time of operation, the key waveforms of operation of a flyback topology circuit of FIG. 1A, such as (VcM1, 24), which is the control signal for the main switch; VdsM1, which is the voltage across the main switch M1, and the magnetizing current IM through the transformer (Tr, 12) of the conventional flyback topology 100A.

Between time moments t0 and t1, during the period of conduction of the main switch (M1, 22), energy is stored in the transformer (Tr, 12), in the magnetizing current IM, which increases from a substantially-zero level to a peak value.

At t1, the main switch (M1, 22) is turned off, and the magnetizing current is transferred into the secondary winding (L2, 16), flowing through the rectifier (SR, 26) towards the output capacitor (Co, 30) and the load placed on (Vo, 32).

At t2, the current through (SR, 26) reaches zero. After the moment t2, the secondary conduction path opens up. In the primary side, there is a resonant circuit formed by the inductance of the primary winding (L1, 14) and the parasitic capacitance reflected across the main switch (Ceq, 20). This resonant circuit starts to ring in a resonating fashion when the voltage across (Ceq, 20) starts decaying—as depicted by the VdsM1 waveform. For example, at t3, the voltage across (Ceq, 20) reaches the level of input voltage (Vin, 10). The ringing then continues and the voltage across (Ceq, 20) reaches its lowest level at the moment t4, after which the amplitude reaches the peak at the moment t6; the ringing continues still. The span of ringing—between the amplitudes at each of the peaks and valleys reported to Vin—continues to decrease due to losses in the primary winding L1.

The magnetizing current is depicted by the IM curve of FIG. 3, and it is phase shifted from the voltage ringing across (Ceq, 20) by 90 degrees—At t3, the magnetizing current reaches its maximum negative value of IM1 when the voltage across (Ceq, 20), is equal to (Vin, 10). At this moment—t3—the energy in the resonant circuit is fully contained in the magnetizing current and not in the parasitic capacitance. At t3, the energy contained in (Ceq, 20) in reference to Vin is zero because the steady state level for the voltage across (Ceq, 20) is (Vin, 10). At t2 and t4, on the other hand, the energy of the resonant circuit it is fully contained in the parasitic capacitance (Ceq, 20).

The ringing across (Ceq, 20) is attenuating due to the dissipation of energy in the primary winding. At the frequency of oscillation, the ratio of the winding impedance reported to the winding impedance in dc, Rac/Rd of the primary winding is high and that increases the attenuation. At high input voltage and light load, wherein the dead time is large, the amplitude of the ringing is almost zero at the end of the dead time. That means that the energy contained in the parasitic oscillation is totally dissipated.

FIG. 4 lists the key equations describing the operation of the resonant circuit formed by Ceq and L1. At t2, the energy of the resonant circuit is stored in (Ceq, 20) and its value is presented by Eq. 2. When the voltage across (Ceq, 20) reaches the level of input voltage (Vin, 10), the energy contained in (Ceq, 20) is expressed by the Eq. 3. Eq. 5 represents the dependence of the amplitude of the magnetizing current as a function of the itemized parameters of the circuitry.

In the latest generations of controllers operating according to the "valley detection" principle, the main switch is turned on at the "valley"—approximately at the moment when the oscillating portion of the VdsM1 curve of FIG. 3 is at a minimum, at the time when energy contained in the magnetizing current is zero (see the IM curve). While all the energy is contained at this moment in the parasitic capacitance (Ceq, 20) versus Vin, the energy stored in (Ceq, 20) versus the ground is the smallest. As a result of turning the main switch "on" at the valley, the switching loses are reduced. For operation with larger dead time, the amplitude of the ringing is significantly reduced and the advantage of turning "on" the main switch at the valley is minimized. At the same time, all the energy contained in the natural ringing is dissipated. Several related art solutions were presented in, for example, U.S. patent application Ser. No. 14/274,598; 62/429,373 incorporated herein by reference, or in U.S. Pat. No. RE40,072 E or U.S. Pat. No. 8,669,744.

Figure 1B:
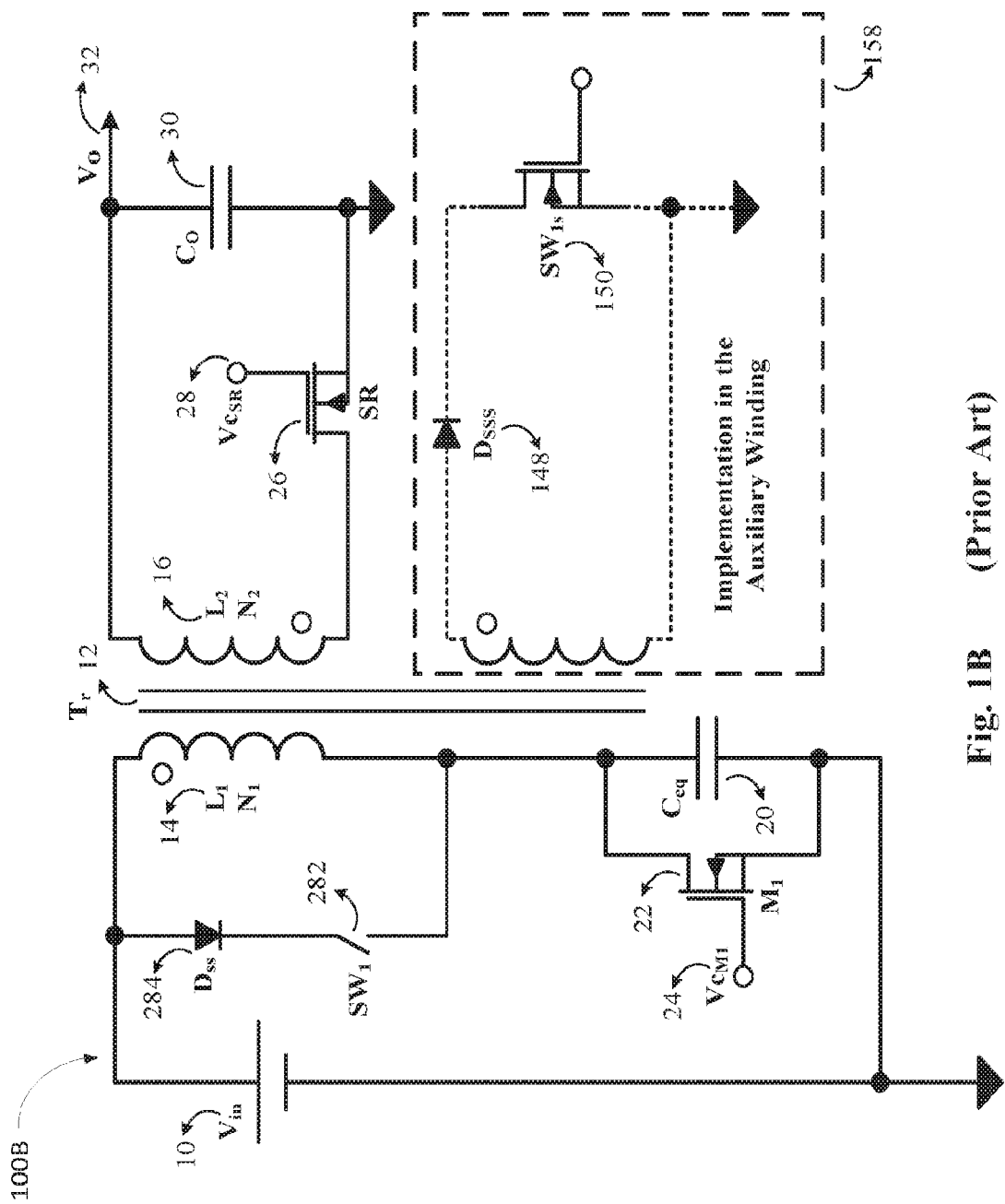
FIG. 1B depicts a flyback topology configured to use a unidirectional switch to trap and preserve the energy harvested from the parasitic oscillation during the dead time.

Each of these solutions has some drawbacks. According to U.S. Ser. No. 14/274,598, for example, when the voltage across the main switch reaches the input voltage level the primary winding of the transformer is shorted directly through an unidirectional switch or through an auxiliary winding tightly coupled with the primary winding via a unidirectional switch, in which the unidirectional switch remains "on" until the end of the dead time period. Just before the main switch turns "on", the unidirectional switch is turned "off" and the energy contained in the negative magnetizing current is partially discharging the parasitic capacitance reflected across the main switch. The hardware configuration 100B structured to implement this idea is presented in FIG. 1B. The unidirectional switch is formed by the diode (Dss, 284) and the switch (SW1, 282). When an auxiliary winding is used, the unidirectional switch is formed by the diode (Dsss, 148) and the switch (SW1s,150) as depicted in FIG. 1B. The unidirectional switch can be also placed across an auxiliary winding, as displayed by 150. The key waveforms of this concept are presented in FIG. 5, where the magnetizing current depicted by IM is shorted by the unidirectional switch 150 to eliminate the natural ringing.

Figure 5:
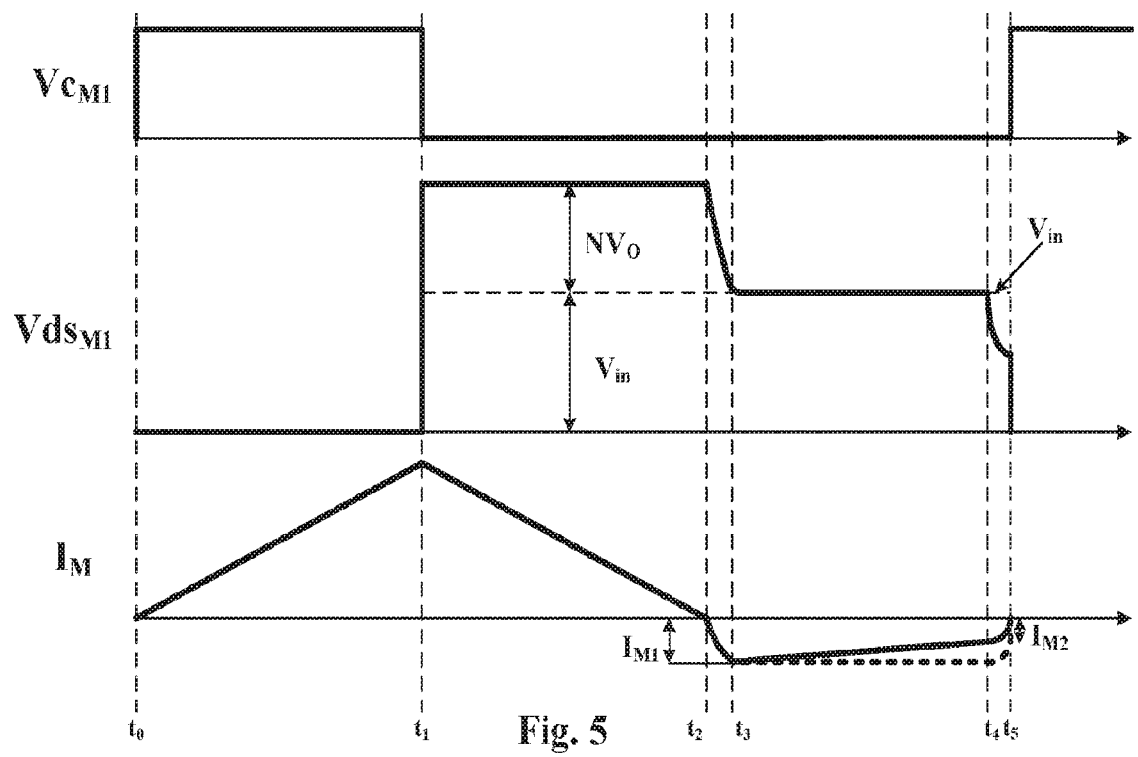
FIG. 5 depicts the key waveforms of the flyback topology using the earlier-disclosed concept.

The major drawback of the operation of the circuitry 100B of FIG. 1B is the decay of the IM due to the voltage drop on the diode (Dss, 284) and the conduction losses through (SW1, 282). At the end of the dead time, at t4—as is depicted in FIG. 5—the amplitude of the magnetizing current is substantially decayed.

Figure 1C:
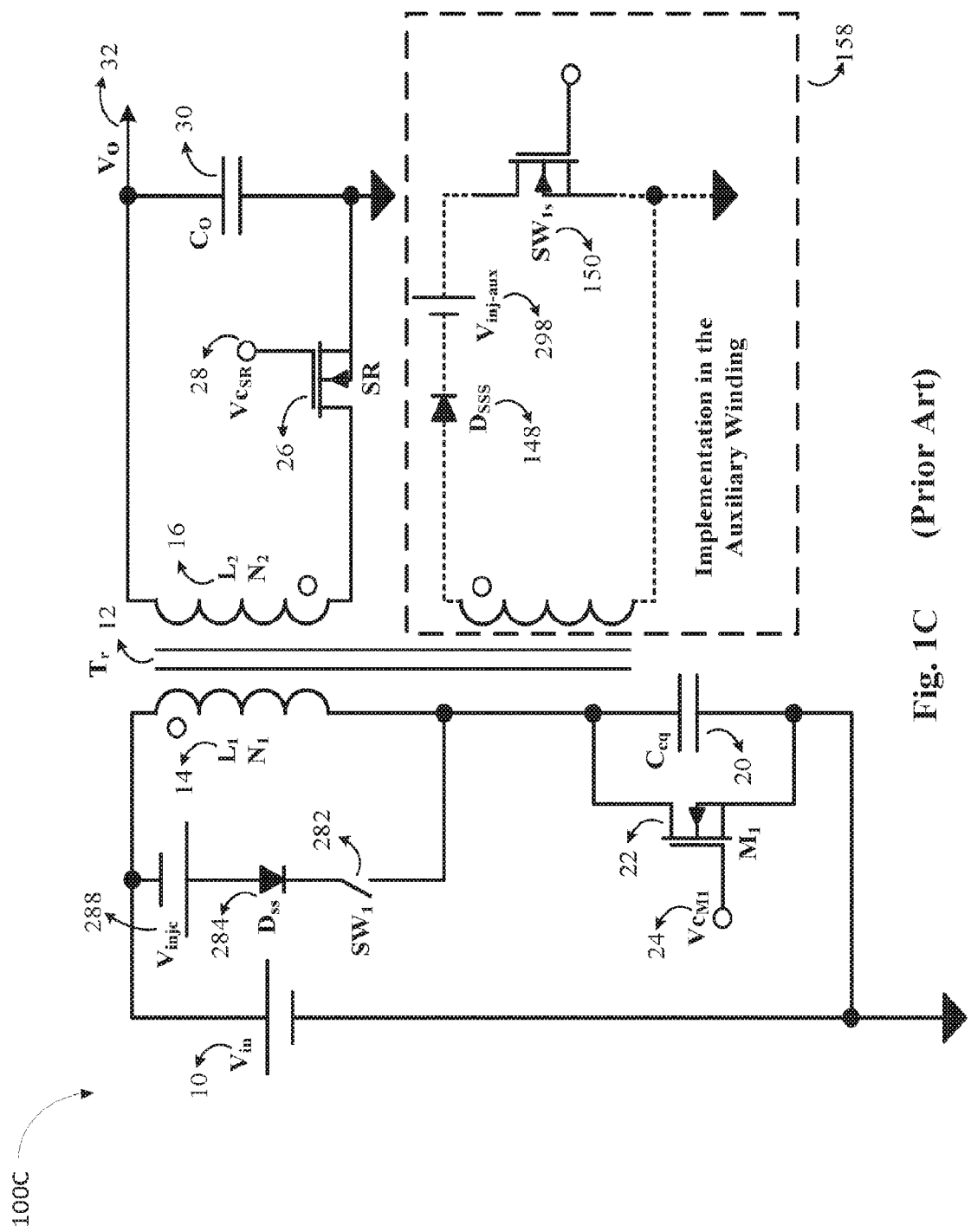
FIG. 1C depicts the electronic circuit from FIG. 1B with a voltage injection to compensate for the energy loss during the dead time.
Figure 6:
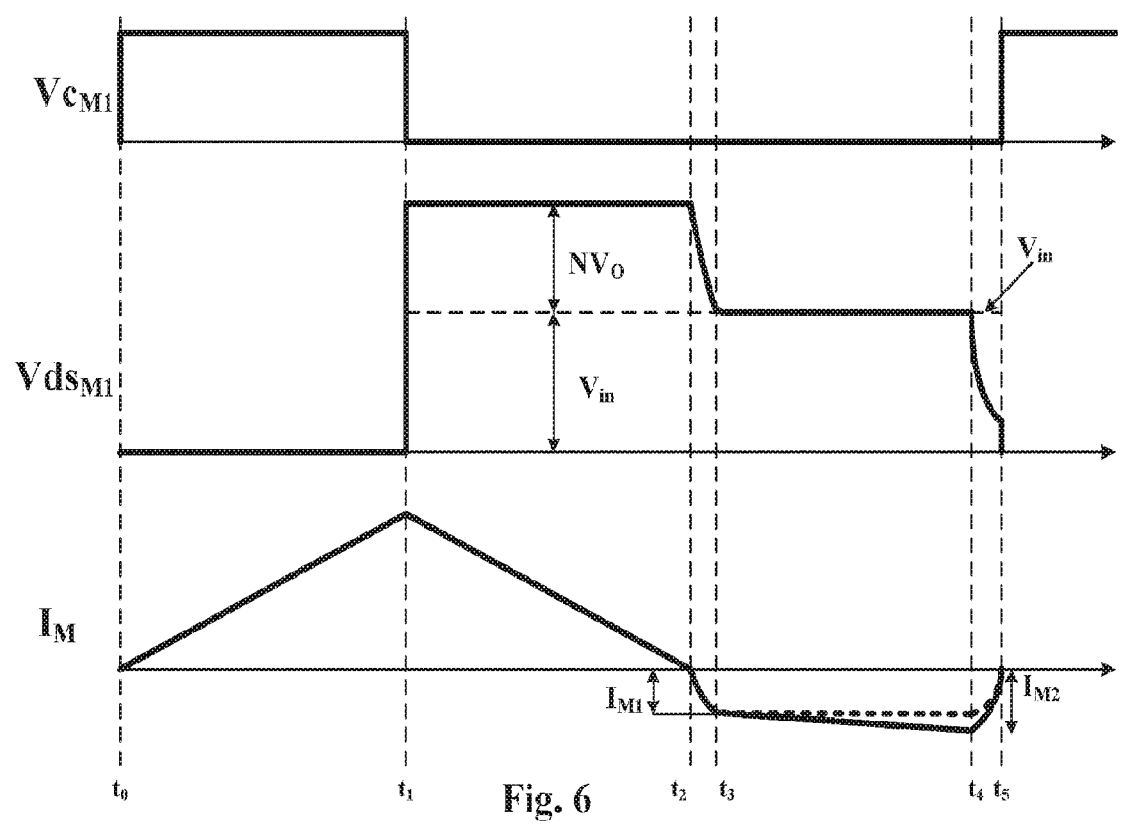
FIG. 6 depicts the key waveforms of the flyback topology using the earlier-disclosed concept.

In reference to FIG. 1C, showing the schematic of electronic circuitry 100C, U.S. 62/429,373 addresses a concept of injecting additional energy into magnetizing current by the voltage source (Vinjc, 288). As a result of such injection, the amplitude of the magnetizing current IM can be maintained or even increased. In FIG. 6, the magnetizing current IM is increasing in a such way that the amplitude of the magnetizing current IM at the moment t4—shown as IM2—is larger than the amplitude of IM at the moment t3 (shown as IM1).

By controlling the amplitude IM2 at the moment when the shorting switch (SW1, 282) turns "off", the voltage across the main switch M1 can be caused to decay to a voltage level below the level of Valley 1 (of FIG. 3) as it would be the case when the magnetizing current amplitude remains constant during the dead time. By tailoring the voltage injection (Vinjc, 288), the voltage across the main switch M1 can be made to reach zero, thereby creating zero voltage switching conditions for the main switch. This solution, while solving the problem of maintaining the amplitude of IM or even increasing such amplitude, still retains the problem of having the circulating current and energy dissipation during the dead time.

Notably, while the shorting switch (SW1, 282) can be placed across the primary winding as presented in FIGS. 1B and 1C, it can also be placed across an auxiliary winding as depicted with dotted line in FIGS. 1B and 1C, in the block 158—the fundamental operation of the circuits will substantially remain the same. The diode (Dss, 284) can be even eliminated from the circuits if and when an accurate method is employed to sense when the voltage across the main switch reaches the level of (Vin, 10). This can be done in an auxiliary winding, where the voltage will be zero at t3.

Examples of Embodiments

The implementations of the idea of the present invention is directed to elimination of the limitation(s) of operations of the electronic circuits of the related art. In addition to that in one of the key embodiments of this invention is the extraction of the energy from the natural ringing and the use that energy to discharge the parasitic capacitance reflected across the main switch, Ceq, 20.

According to the idea of the present invention, i) the energy from the parasitic oscillation is stored in a capacitor that remains charged for the entire dead time period, and ii) such stored energy is used to discharge the parasitic capacitance (Ceq, 20) towards zero only before the main switch turns "on". iii) stored energy can also be used for other purposes such as bias power or multiple purposes. As a result of so-configuring the electronic circuitry, the circulation of current is removed and no loss of energy occurs through the conduction of the magnetizing current during the dead time period as it is done in the prior art solutions. The proposed methodology is more operationally efficient than methodologies of related art.

Examples of methods of harvesting energy from the parasitic oscillations are discussed now in reference to FIGS. 7, 8, 9A, 9B, 10A, 10B, 10C, and 10D.

Figure 7:
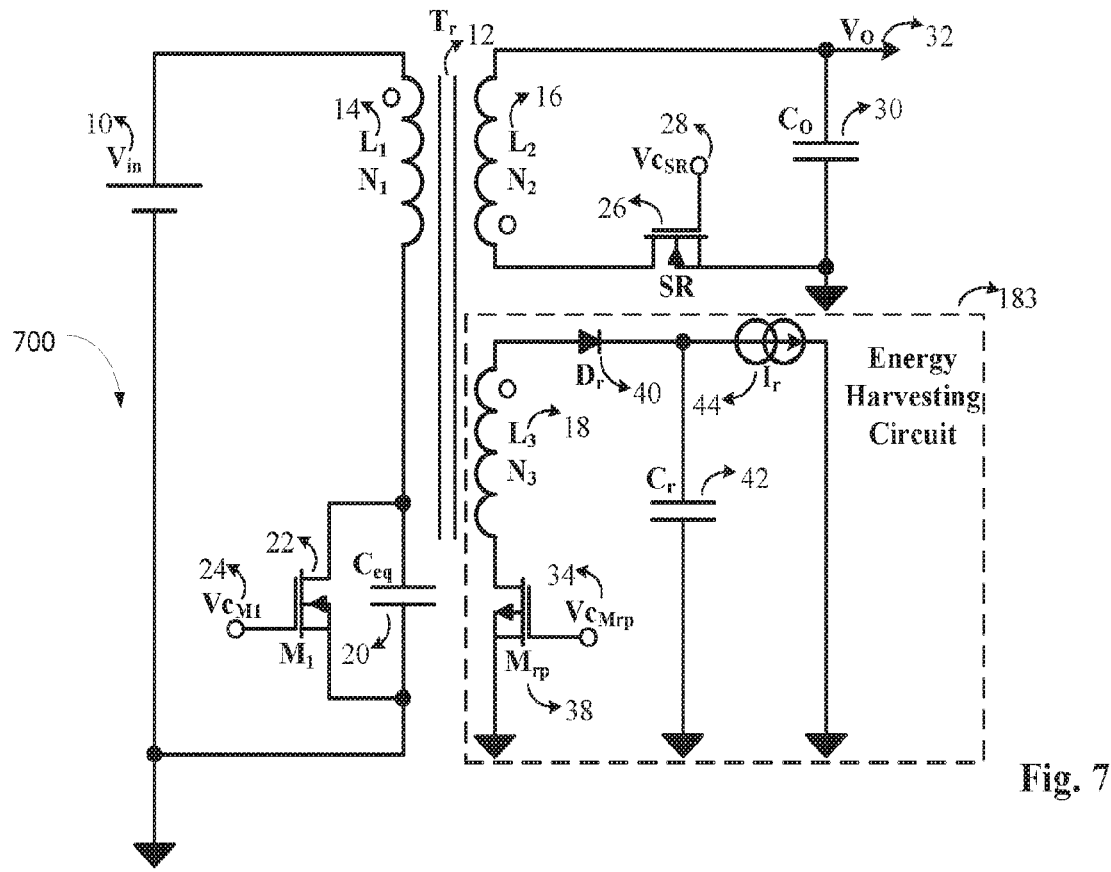
FIG. 7 presents an embodiment of a flyback-topology-based power converter circuitry with the circuit configured to harvest energy from the parasitic oscillation using a P channel Mosfet.

Example 1. FIG. 7 illustrates an embodiment of electronic circuitry 700 configured according to a flyback topology, with an energy harvesting circuit 183. The energy-harvesting circuit 183 contains an auxiliary winding (L3, 18), a P-channel Mosfet switch (Mrp, 38), a diode (Dr, 40), and a capacitor (Cr, 42), where the energy from the parasitic oscillation is preserved. The circuit 183 additionally includes a current source (Ir, 44), which takes the energy from (Cr, 42) and uses it to discharge the parasitic capacitance reflected across the main switch (Ceq, 20) or for other purposes such as forming bias power. The goal is to take the energy from (Cr, 42) and discharge it at each cycle. This circuit 183 works also as a parasitic-oscillation-attenuator or a non-dissipative snubber, or regenerative snubber. Instead of dissipating the energy from the parasitic oscillations, the circuit 183 extracts, in operation, the energy for different purposes.

Figure 8:
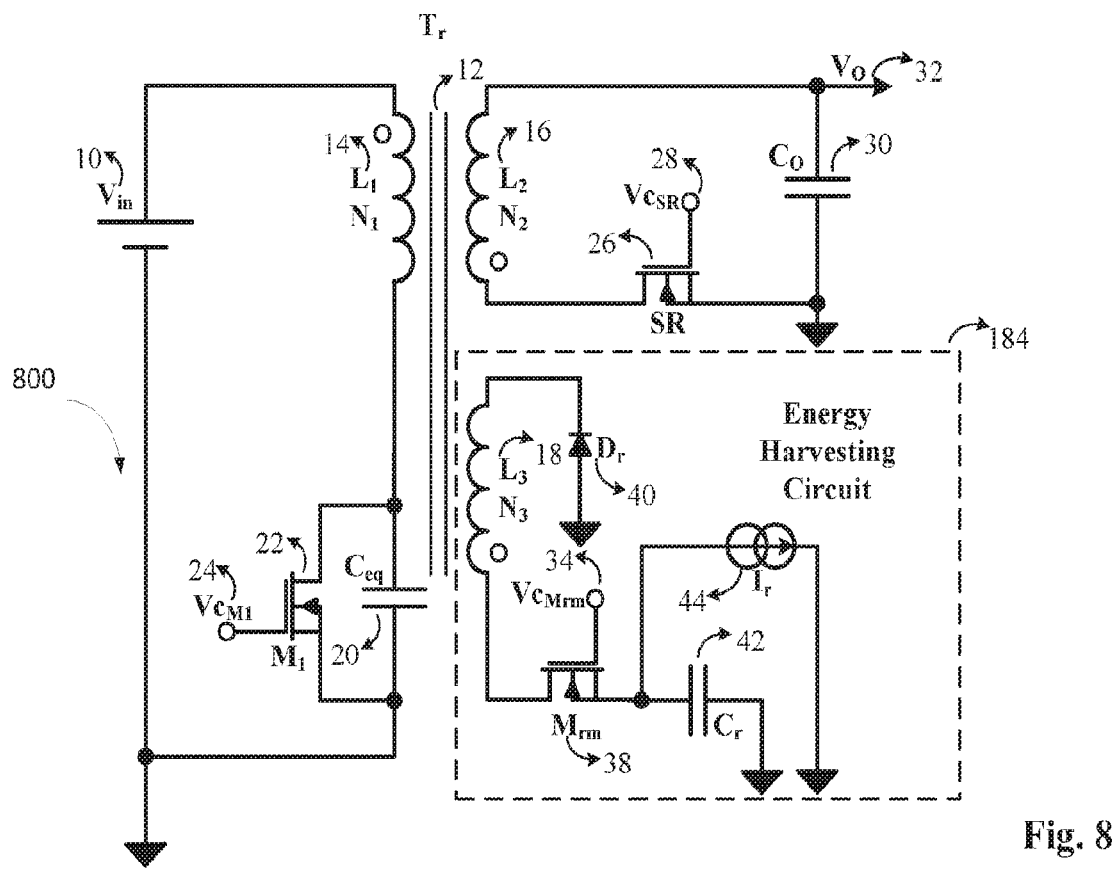
FIG. 8 depicts a flyback-topology-based power converter circuitry with a circuit configured to harvest energy from the parasitic oscillation using an N channel Mosfet.

Example 2. FIG. 8 illustrates a related configuration: the circuitry 800 with an energy harvesting circuit 184, but this time the P channel Mosfet 38 of the circuit 183 of FIG. 7 is replaced by an N channel Mosfet switch. (The capacitor Cr can be also placed at the anode of (Dr, 40), as in FIG. 7, and in that case the source of Mrm can be connected to ground and in that case the current source Ir should reverse its polarity.)

In both implementations of FIGS. 7 and 8, the electronic circuits are configured to extract the energy from a parasitic oscillation stored in (Cr, 42) and attenuate this parasitic oscillation. In one embodiment this energy is used to reduce or even eliminate the switching losses of the main switch. The energy extracted from the natural ringing can be even dissipated if the parasitic oscillation has negative effects which have to be eliminated in cases wherein the efficiency loss is not a problem. The utilization of the energy-harvesting circuits similar to those of FIGS. 7 and 8 can be effectuated not only in a flyback topology as shown, but also in a boost topology, a buck topology, or any other topology with parasitic oscillation.

Example 3. A specific variation of the embodiment of the circuitry of FIG. 8 is configured to harvest energy from a parasitic oscillation in a device containing a magnetic element with a parasitic capacitor reflected across it and at least one switching device connected to it (where there is a dead time period during all switching elements of the circuitry are not conducting), which embodiment employs an additional unidirectional switching device in series with a storage capacitor (which unidirectional switching device conducts during said dead time). Here, the energy from the parasitic oscillation is transferred to the storage capacitor, and the storage capacitor is further discharged before the end of the dead time period.

Figure 9A:
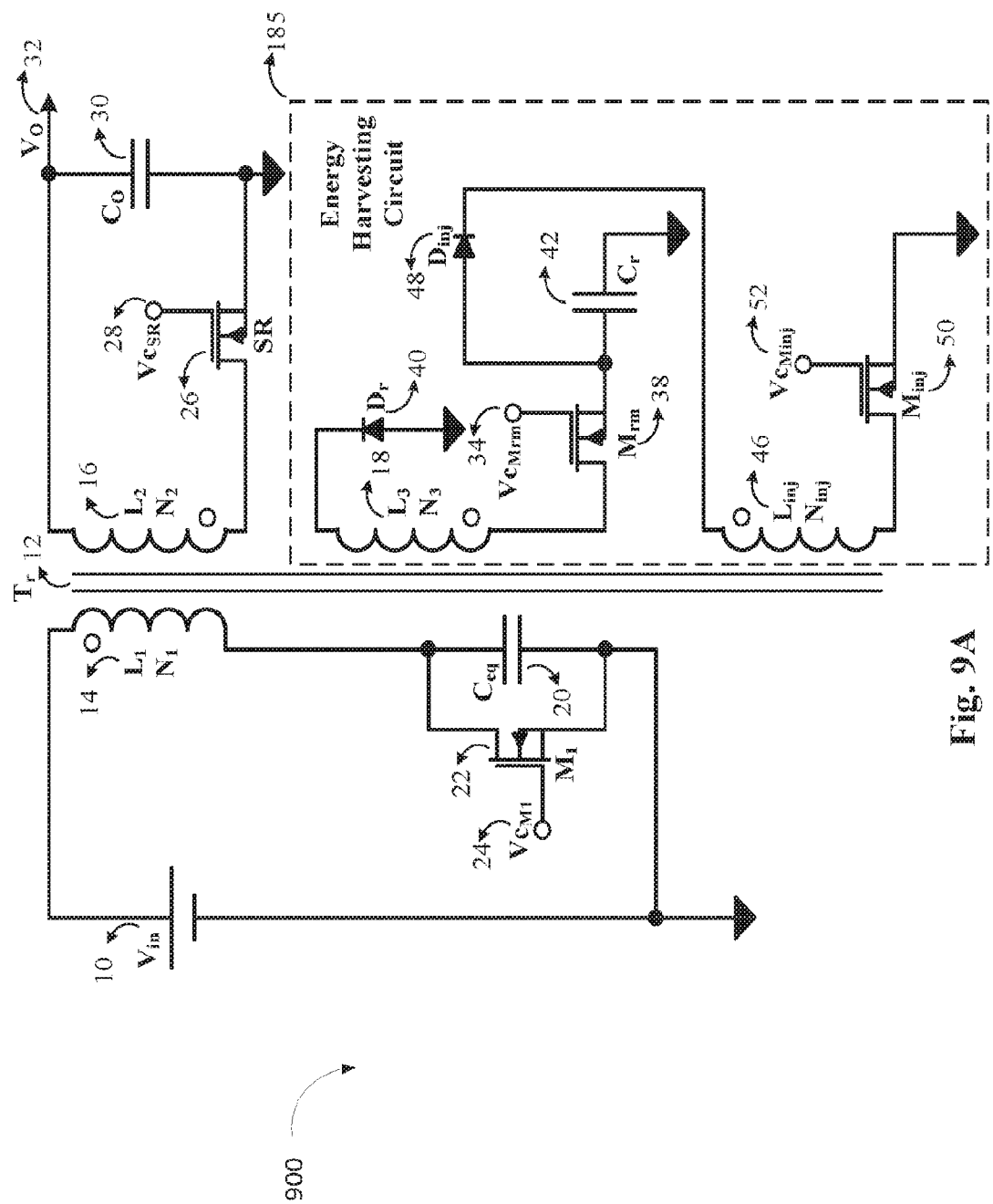
FIG. 9A depicts a specific implementation of the embodiment of FIG. 8, comprising a current injection circuit configured to operate by using the harvested energy.

FIG. 9A presents an example of a flyback topology based electronic circuitry 900 with a particular implementation of the energy harvesting circuit 185. In this implementation, the harvesting circuit 185 includes the energy-harvesting winding (L3, 18); the unidirectional switch formed by the diode (Dr, 40) and an N channel Mosfet (Mrm, 38); and an energy storage capacitor (Cr, 42). In comparison with the energy harvesting circuit of FIG. 8, the discharging circuit (Ir, 44) is formed in this case by a diode (Dinj, 48), an injection winding (Linj, 46), and a switch (Minj, 50) controlled by a signal (VcMinj, 52) which form together a current injection circuit.

Figure 9B:
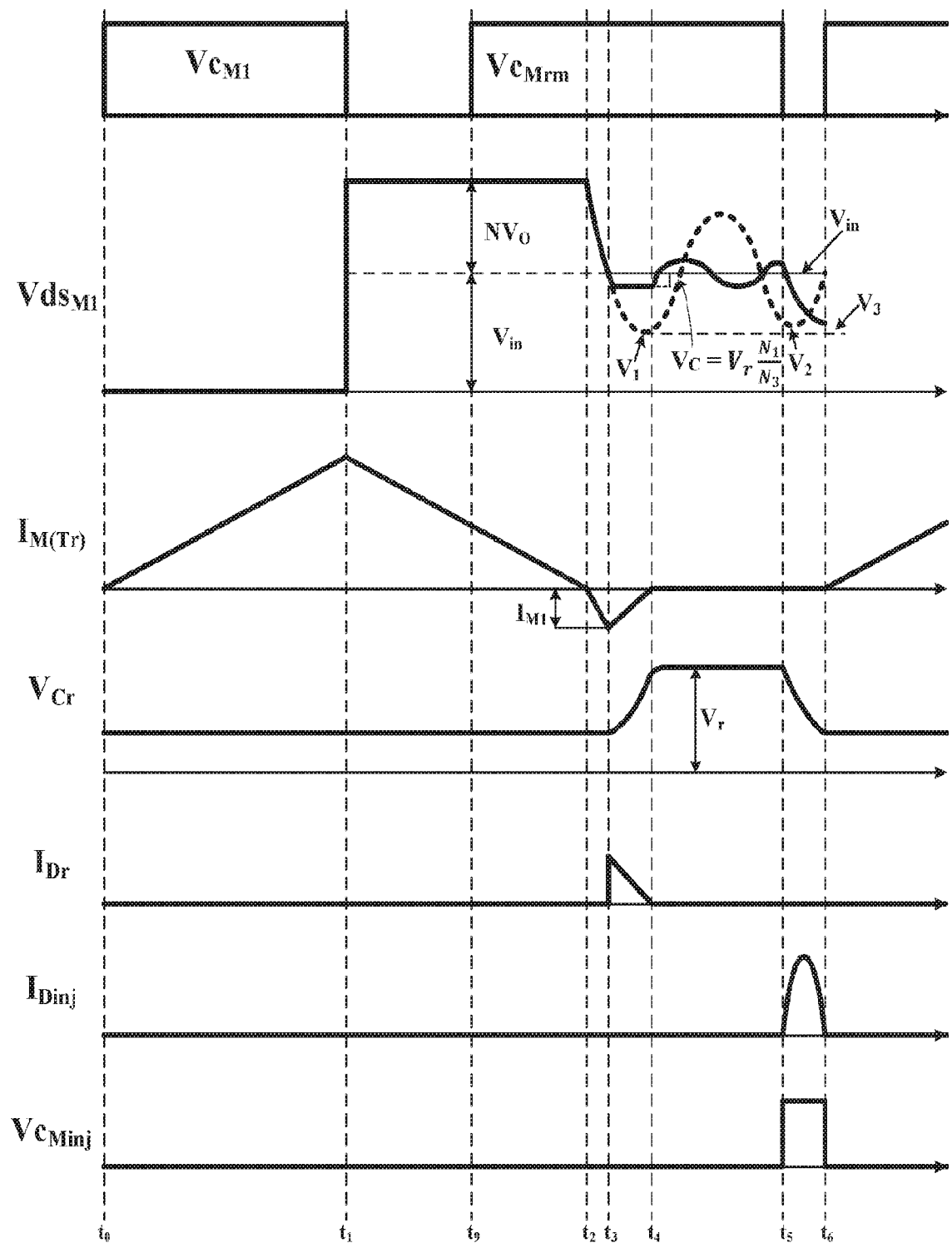
FIG. 9B depicts the key waveforms of the flyback topology depicted in FIG. 9A.

The key waveforms associated with the circuit presented in FIG. 9A are depicted, as functions of time of operation, in FIG. 9B, and include (1) VcM1, which is the control signal for the main switch (M1, 22); (2) VcMrm, which is the control signal for (Mrm, 38); (3) VdsM1, which is the voltage across the main switch (M1, 22); (4) IM(Tr), which is magnetizing current through the transformer (Tr, 12); (5) Vcr, which is the voltage across the energy storage capacitor (Cr, 42); (6) IDr, which is the current through the diode (Dr, 40); (7) IDinj, which is the current through the diode (Dinj, 48); and (8) VcMinj., which is the control signal for (Minj, 50).

Here, in operation, between the moments of time t0 and t1 the main switch (M1, 22) is "on" and the magnetizing current is building up, storing energy in the transformer (Tr, 12). At the moment t1, the main switch (M1, 22) is turned "off". The magnetizing current Im is transferred to the secondary winding (L2, 16) via the (SR, 26). At the moment t2, the magnetizing current Im reaches a zero level and the rectifier (SR, 26) is turned "off". The parasitic capacitance reflected across the main switch (Ceq, 20) is charged at this moment t2 with a voltage (Vin+N*Vo), where N is the ratio of winding turns the between primary and secondary windings: N=N1/N2.

After t2, the voltage across (Ceq, 20) starts decaying in a resonant manner (the capacitor Ceq forms a resonant circuit with the inductor of the primary winding L1). The steady-state level for the voltage across (Ceq, 20) is (Vin, 10). When the voltage across (Ceq, 20) reaches the steady-state level, the energy stored in the resonant capacitor (Ceq, 20), as part of the resonant circuit, is zero. Energy ½*Ceq(Vin^2), stored in (Ceq, 20) and associated with the initial conditions, is reported to the ground. The parasitic oscillation(s) across (Ceq, 20) are shown with a dotted/dashed line of the waveform VdsM1 in FIG. 9B, as labelled by V1.

At the moment t3, when the voltage across (Ceq, 20) is equal to (Vin, 10), the magnetizing current through the transformer (Tr, 12) is reaching its maximum negative value, IM1.

The unidirectional switch formed by (Dr, 40) and (Mrm, 38) is already turned on by the Vcrm signal at t9. Only when the voltage across the energy-harvesting winding (L3, 18)

changes polarity at the moment t3, the magnetizing current IM(Tr) starts flowing into the energy storage capacitor (Cr, 42), as depicted in FIG. 9B by the plot IDr, and between the moments t3 and t4, the energy contained in the magnetizing current is transferred to the energy storage capacitor (Cr, 42). The voltage across (Cr, 42) is increased to Vr after the energy contained in the magnetizing current is transferred to the (Cr, 42).

The energy of the magnetizing current which reached its peak at t3 was fully transferred to the capacitor (Cr, 42) at t4. The voltage across (Cr, 42) is reflected in the primary side and the voltage in the drain of the main switch (M1, 22) appears as depicted by VdsM1, during the time interval between t3 to t4 from FIG. 9B. The voltage in the drain of (M1, 22) has a decay of the amplitude Vc below the Vin level. This voltage-difference from the (Vin, 10) level value leads to some oscillation, referred to in this disclosure as second-order parasitic oscillation with an amplitude of 2*Vc (peak-to-peak) and with an oscillation frequency that is substantially the same as that of the original parasitic oscillation.

According to the idea of the invention, it may be preferred to set a limit (that is, reduce) in a voltage level in order to minimize the second-order parasitic oscillation. In order to accomplish that, in one implementation the discharge current (Ir, 44) of the energy-harvesting circuit (see FIGS. 7, 8) is increased or timed and shaped in a such a way that—when the IDr is approaching a zero level—the voltage across Cr is substantially close to zero (or substantially zero).

As can be appreciated by a skilled artisan from the circuitry 900 of FIG. 9A, the discharge of the capacitor (Cr, 42) is effectuated through a current-injection circuit that includes: (Dinj, 48), the current injection winding (Linj, 46), and the current injection Mosfet (Minj, 50). The diode (Dinj, 48) provides for current with a half-sinusoidal shape, as depicted by IDinj from FIG. 9B. (Notably, to increase the amplitude of the current injection, Vr has to be increased—which is the opposite of the implementation of the idea of the invention: indeed, a larger Vr value leads to increase of the amplitude of the second-order parasitic oscillation. Some solutions will be further discussed below).

Between t4 and t5, the energy that was harvested form the parasitic oscillation is preserved in the capacitor (Cr, 42). As a result of the proposed electronic circuitry configuration and the method for operating of such circuitry, during this period of time there is no dissipation of energy—in contradistinction with what is being observed in related art.

At t5, the current injection switch (Minj, 50) is turned "on", and an injected current characterized by a half-sinusoidal shape) starts flowing through the current injection winding (Linj, 46), and further reflected into the primary side thereby discharging the parasitic capacitance (Ceq, 20), reflected across the main switch. In the event that there are no energy losses (during the energy transfer from the parasitic oscillation to (Cr, 42) and further during the current injection step), the voltage across the main switch between the time moments t5 and t6 will decay to a voltage level of the first valley V1, as per FIG. 9B. In this case V3 is substantially equal to V1. However, considering almost inevitable power dissipation during the energy transfer process, the absolute value of V3 is likely to be greater than the absolute value of V1 in relation to the ground.

The efficiency of the solution is higher than those of the prior art solutions, because here the conduction losses are absent during the dead time period. Efficiency measurements proved such advantage over related art (see U.S. Ser. No. 14/274,598 and U.S. 62/429,373).

Example 4. In this embodiment of the invention, a current injection circuit is configured to take energy from the energy storage capacitor (Cr, 42) and use that energy to discharge the parasitic capacitance (Ceq, 20) reflected across the primary switch.

In the circuit 900, depicted in FIG. 9A, the level of voltage across the main switch VdsM1 (after the current injection decays to a level V3) is not as low as the level of voltage of the first valley. In order to increase the current injection amplitude and to lower the voltage across the main switch at the moment of "turn on", an embodiment 1000A the circuit depicted in FIG. 10A is devised.

Here, the overall circuitry is similar to that of FIG. 9A, but with the exception that the energy harvesting section is further equipped with the capacitor (Cinj, 54) between i) a point common to the injection winding (Linj, 46) and the diode Dinj and ii) the ground. The added capacitor (Cinj, 54) facilitates an increase of energy of the current injection allowing for the discharge of the (Ceq, 20) towards a lower voltage level (and even a zero voltage level). Such discharge can be accomplished regardless of the specific value of Vr.

Figure 10A:
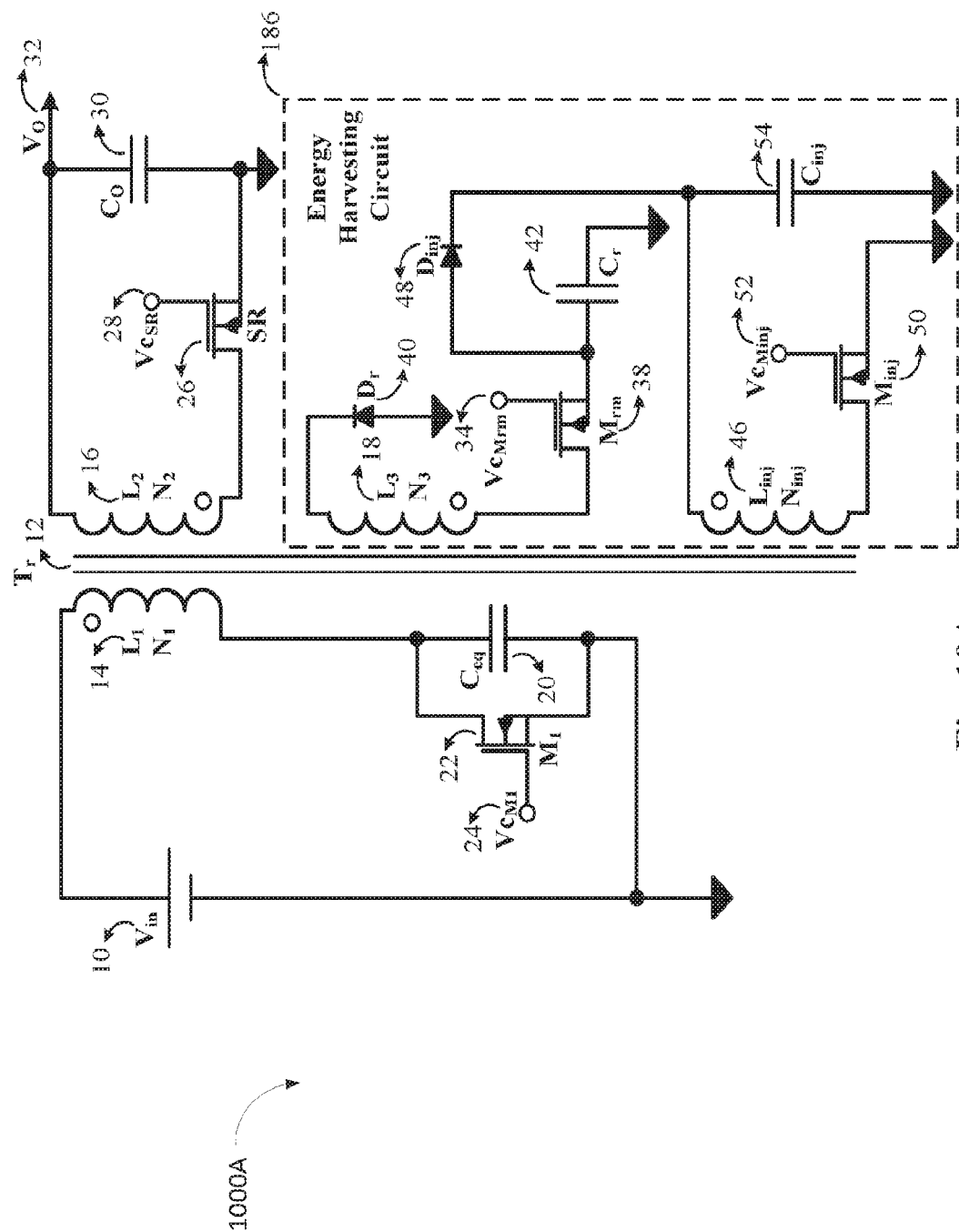
FIG. 10A depicts a flyback topology circuit from FIG. 9A enhanced with an additional current injection capacitor.
Figure 10B:
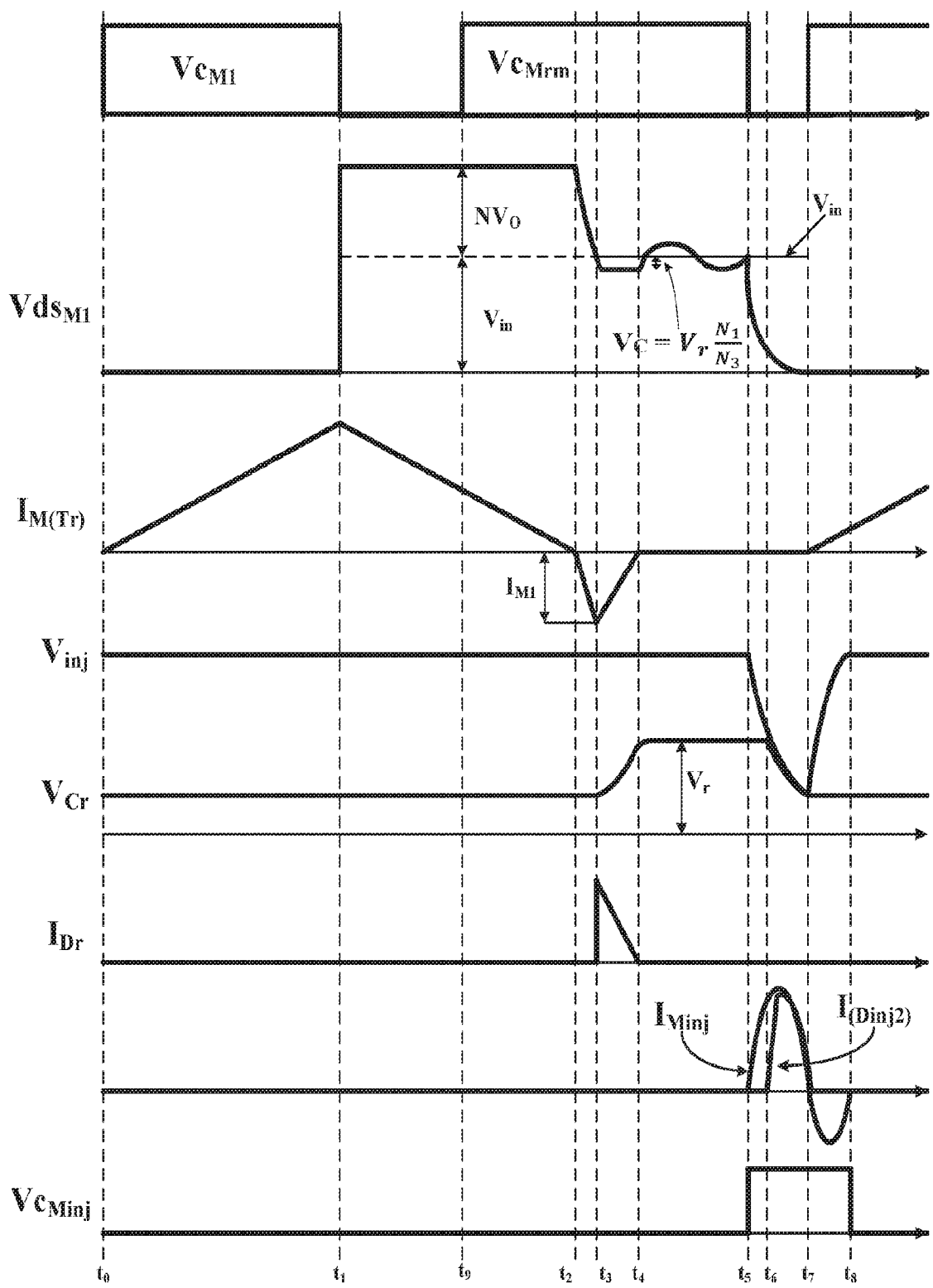
FIG. 10B shows the key waveforms of the flyback topology depicted in FIG. 10A.

The key waveforms of the circuit 1000A of FIG. 10A are presented as functions of time of operation in FIG. 10B, and include the same types of waveforms as those of FIG. 9B. The mode of operation of the circuit 1000A is somewhat similar to the mode of operation of the circuit 9000. In between the moments t2 and t3, the energy contained in the parasitic oscillation is being transferred to the magnetizing current IM; the energy contained in the magnetizing current is then further transferred to (Cr, 42) between t3 and t4. That energy is stored without any dissipation during the time period from t4 to t5.

The difference between the mode of operation of the circuit 100A from that of the circuit 1000A is apparent at the moment t5. Here, at t5 the current-injection switch is turned "on" (see the waveform VcMinj), while the voltage across (Cinj, 54) was charged at a voltage level Vinj. The voltage Vinj starts decaying and the injection current IMinj is building up. By the moment t6, the voltage level across (Cinj, 54) reaches the same level as Vr. The value of capacitance of the capacitor (Cr, 42) is chosen to be larger than that of the capacitor (Cinj, 54). After t6, most of the energy in the injection current is provided by (Cr, 42) while some lesser amount of energy is provided by (Cinj, 54) due to the fact that Cr>Cinj. At the moment t7, the injection current amplitude reaches zero and there is no longer discharging of the capacitor (Cr, 42).

By design, the capacitance of (Cinj, 54) is chosen such that the sum of the additional energy contained in (Cinj, 54) at the t5 and the energy delivered from (Cr, 42) during the time period between t6 and t7 is adequate to discharge the parasitic capacitance (Ceq, 20) and create zero voltage switching conditions for M1. As shown in FIG. 10B, at t7 the main switch M1 turns "on" at zero voltage switching conditions.

Between t7 and t8, the capacitor (Cinj, 54) is charged back to the Vinj level in a forward quasi-resonant mode, from input voltage source Vin,10. In this embodiment 1000A, the energy for the current injection—that discharges the parasitic capacitance (Ceq, 20) across (M1, 22)—is coming from the energy harvested from the parasitic oscillation across the main switch and stored in (Cr,42) and also from the (Cinj, 54) (that latter having been charged during the period of conduction of the main switch (M1, 22)). This way, the current injection energy is tailored to discharge the (Ceq, 20) to zero before the main switch (M1, 22) turns "on". Such tailoring of the current injection is accomplished by choosing the proper value for the capacitance of the (Cinj, 54). A person of skill will readily appreciate that, without the presence of the capacitor (Cinj, 54), the voltage across the main switch at the moment of "turn on" would be, in the best case scenario, at the level corresponding to the level of the first valley of the parasitic oscillation.

A person of skill in the art will appreciate, therefore, that examples 1 through 4 describe an embodiment of electronic circuitry having primary and secondary sides and including a power converter and a first electronic circuit. The power converter includes i) an input voltage source; ii) a transformer having primary and secondary windings, on the primary and secondary sides, respectively; iii) a combination of a main switch in parallel with a main switch capacitor, the combination being in series with the primary winding on the primary side; and iv) a synchronous rectifier in series with the secondary winding on the secondary side. The first electronic circuit has a) a first auxiliary winding on the secondary side of the transformer in series with and between a first diode and a first terminal of a first switch; b) a first capacitor connected between a second terminal of the first switch and a ground; and c) a current source circuitry disposed in parallel with the first capacitor and connected directly to the second terminal of the first switch. The first electronic circuit is generally configured to store energy from parasitic oscillations (occurring across the main switch during dead time of operation of the power converter) in the first capacitor, thereby attenuating these parasitic oscillations without substantial dissipation of the energy from the parasitic oscillations. The electronic circuitry can be generally configured according to any of flyback topology, boost topology, and buck topology. In any implementation, the current source circuitry may include a second diode in series with an injection winding and an injection switch; the injection switch disposed between the injection winding and the ground (the injection winding being on the secondary side), while the main switch is characterized by a first level of voltage across the main switch at a time when the main switch is turned on. The electronic circuitry may additionally include an injection capacitor disposed between a point, which is electrically common for the injection winding and the second diode, and the ground—to define, in operation of the electronic circuitry, a second level of voltage to which the main switch capacitor is discharged, the second level of voltage being lower than a third level of voltage to which the main switch capacitor is discharged in absence of the injection capacitor. Preferably, the capacitance of the injection capacitor is defined such that a sum of a first energy and a second energy is sufficient to discharge, in the operation of the electronic circuitry, the main switch capacitor while creating a zero-voltage switching condition for the main switch (the first energy is energy contained in the injection capacitor and the second energy is the energy from the parasitic oscillations stored in the first capacitor). In operation of the electronic circuitry, the first energy is being stored in the injection capacitor during a period of conduction of the main switch. The electronic circuitry is preferably configured to define a fourth level of voltage across the main switch at the time when the main switch is turned on such that the fourth level of voltage being lower that the first level of voltage. Alternatively or in addition, the first electronic circuit is configured as a current injection circuit to deliver current through a winding on the secondary side to discharge a parasitic capacitance of the main switch capacitor reflected across the main switch.

The same examples 1 through provide a method for operating such electronic circuitry, which includes the steps of a) turning the main switch on to store energy in the transformer via a magnetizing current in the primary side (where the main switch is characterized by a first level of voltage across the main switch at a time when the main switch is turned on); b) switching the synchronous rectifier off at a moment of time when a magnetizing current, transferred to the secondary winding as a result of having the main switch turned off, reaches a zero level to charge a parasitic capacitance reflected across the main switch with a first voltage; c) passing a magnetizing current through the transformer to the first capacitor to store energy from parasitic oscillations, occurring across the main switch during dead time of operation of the power converter, in the first electronic circuit; and d) discharging the first capacitor through the current source circuitry to inject current into a winding on the secondary side. Generally, the first voltage depends on a ratio of a number of winding turns in the primary winding to a number of turns in the secondary winding. The method may further include a step of discharging the injection capacitor to define, in operation of the electronic circuitry, a second level of voltage to which the main switch capacitor is discharged (the second level of voltage being lower than a third level of voltage to which the main switch capacitor is discharged in absence of the injection capacitor). Preferably, in operation of the electronic circuitry, a capacitance of the first capacitor is chosen to be larger than a capacitance of the injection capacitor. Alternatively or in addition, a capacitance of the injection capacitor is defined such that a sum of a first energy and a second energy is sufficient to discharge, in the operation of the electronic circuitry, the main switch capacitor while at the same time creating a zero-voltage switching condition for the main switch. The step of discharging the first capacitor may include discharging the first capacitor through the current source circuitry configured as a current-injection circuit and including a second diode in series with an injection winding and an injection switch, such that the injection switch is disposed between the injection winding and the ground, the injection winding being on the secondary side. Alternatively or in addition, the step of passing the magnetizing current may include storing the energy from the parasitic oscillations in the first capacitor.

Figure 10C:
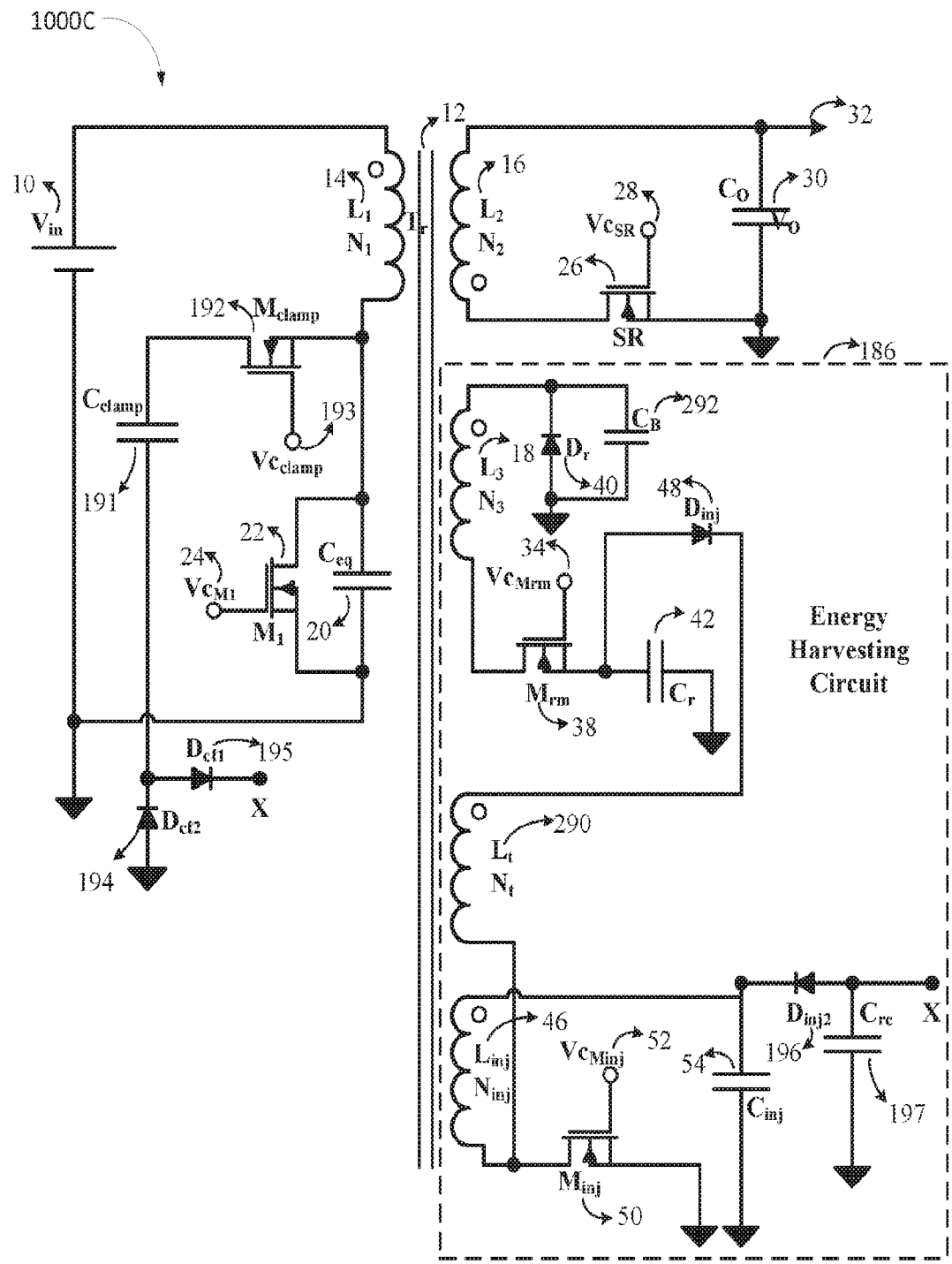
FIG. 10C depicts one of the embodiments of this invention wherein the energy is extracted from the energy harvesting circuit and delivered to the current injection circuit via an additional winding.

Additional Example. FIG. 10C illustrates a schematic 1000C of another embodiment of this invention, configured to provide the energy for current injection circuit from two sources: the energy harvested from the parasitic oscillation as discussed in reference to FIGS. 7, 8, for example, and the energy of the leakage inductance of the transformer. This embodiment includes an active clamp circuit across the main switch, the active clamp circuit containing a clamp switch (Mclamp, 192) and the clamp capacitor (Cclamp, 181) in series with the clamp switch. The clamp capacitor is electrically connected to a combination of two clamp diodes (Dcl1, 195) and (Dcl2, 194). (In one specific embodiment, the clamp switch is configured to be turned on at a moment of time after the main switch is turned off and/or to be turned off at a moment of time prior to the moment of time at which current passing through the secondary winding reaches a zero level.) One source is the leakage inductance energy of the transformer, via a clamp capacitor (Cclamp, 191), and (Dcl1, 195) (see also below in reference to FIG. 14A).

To be able to extract the energy from both sources, an additional winding 290 was added in the transformer. The energy for the current injection circuit formed by (Minj, 50), winding 46, and (Cinj, 54) is delivered via (Dinj2, 196) from the leakage inductance energy and from the energy harvesting circuit, via (Dinj, 48) and through the winding 290 from the capacitor (Cr, 42). The cathode of (Dcl1, 195) is connected to a capacitor (Crc, 197) (as shown by "X"), which in turn is connected to the current injection circuit formed by a diode (Dinj2, 196), the injection winding (Linj, 46), the injection switch (Minj, 50) controlled by the signal (VcMinj, 52), and the injection capacitor (Cinj, 54) added between the cathode of (Dinj2, 196) and the ground. (In a related implementation, the injection capacitor (Cinj, 54) may be removed).

The turn ratio Ninj/Nt is used to control the amount of energy that will be extracted from the energy harvesting storage capacitor (Cr,42).

Figure 10D:
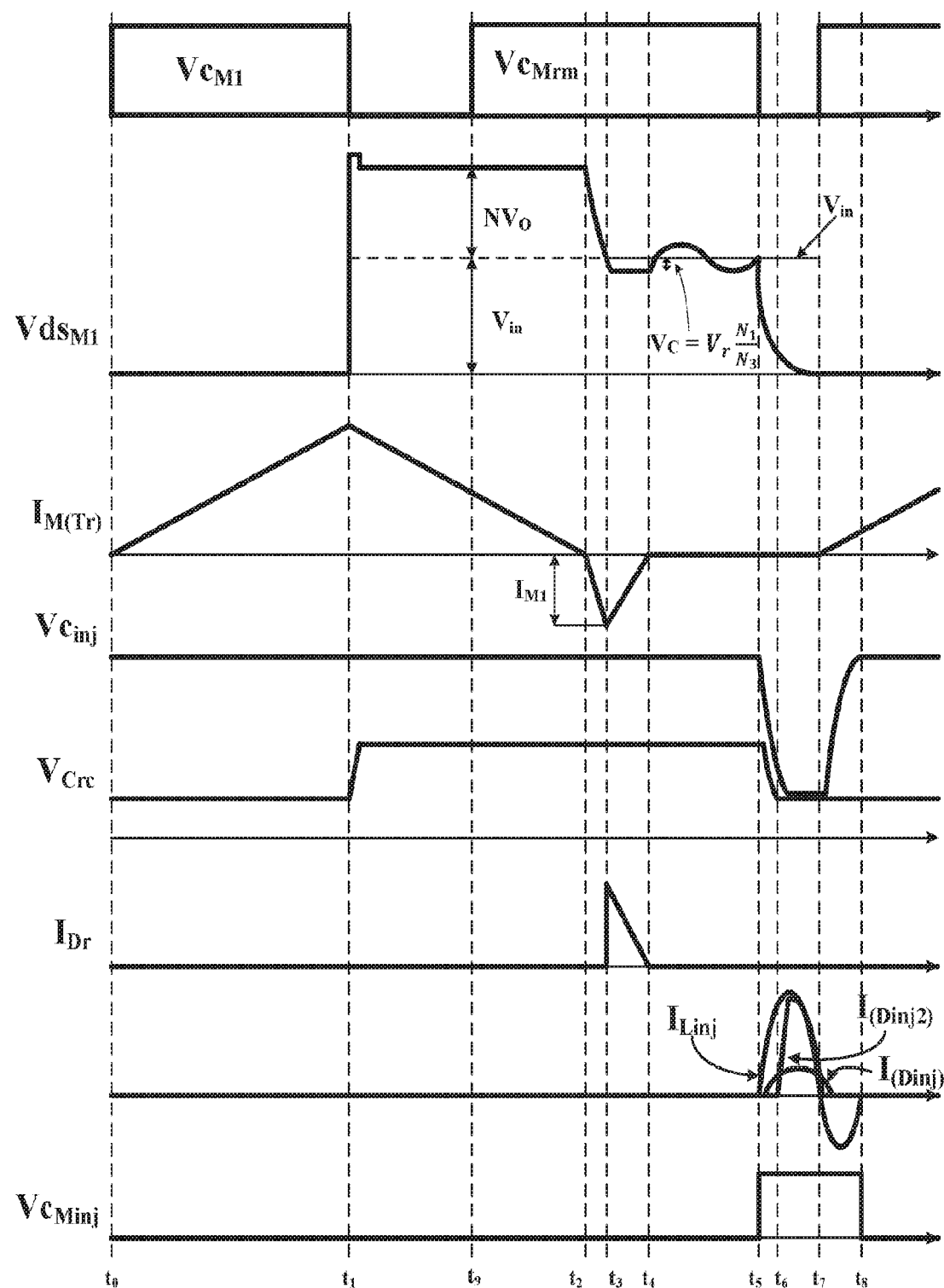
FIG. 10D presents the key waveforms of the circuit depicted in FIG. 33A.

In FIG. 10D are presented, as functions of time of operation, the key waveforms of the circuit 1000C, which include a) VcM1 and VcMrm, which are the control signals for the Mosfet M1 and Mrm, respectively; b) VdsM1, which is the voltage across M1; c) the magnetizing current IM(Tr) in the transformer (Tr, 12), d), the voltage across Cinj: VCinj; e) the voltage across Crc: VCrc; f) the current through Dr, IDr, and ILinj I(Dinj2), I(Dinj); g) and the control signal for Minj, VcMinj.

Here, between the moments t0 to t1, the main switch M1 is "on" and the magnetizing current builds up reaching its peak value at t1, as depicted by IM(Tr). Between t1 to t2, the magnetizing current flows into the secondary winding and the energy of the magnetizing current is delivered to the secondary side until the magnetizing current reaches zero level at t2. At t1, the leakage inductance energy of the transformer (Tr,12) is transferred to the capacitor (Crc, 197), increasing its voltage level as depicted by VCrc. During the period from t2 to t3, a part of the energy contained in the parasitic capacitance Ceq is transferred into the magnetizing current energy of the transformer (Tr,12) characterized by the current IM1. In circuits of the related art this energy is producing the ringing during the dead time (shown as 272 in FIG. 2). Between t3 and t4, the magnetizing current energy characterized by IM1 is transferred to the capacitor Cr and the magnetizing current reaches zero at time t4.

At t5, the current injection Mosfet (Minj,50) is turned "on" and the current injection through (Minj, 50) is formed by three currents: one flowing from Cinj capacitor, another from Crc, I(Dinj2), and the current I(Dinj) arriving from the Cr via Dinj and the winding 290.

It is understood by a skilled artisan that the circuit 1000C of FIG. 10C is configured to provide energy, for current injection, from the energy that is harvested from the low-frequency ringing 272 and also from the leakage inductance energy. Specifically, in the circuit 1000C, the energy from the leakage inductance of the transformer Tr and the energy contained in the low frequency ringing, 272, is harvested to provide energy for the current injection, which has the role of discharging the parasitic capacitance Ceq, across M1 to zero.

The capacitor CB is optional. When such capacitor is placed across Dr, that increases the energy in the ringing described in reference to FIG. 3, and its energy is expressed by equation 4 in FIG. 4. The capacitor CB reflects into the primary side across Ceq, and by increasing the value of Ceq increases the energy in the ringing described in FIG. 3, by the Valley 1 and Valley 2.

In reference to equation 5 from FIG. 4, a larger Ceq will also increase the value of IM1 depicted in FIG. 3.

Because the energy contained in the ringing (described in reference to FIG. 3) is extracted and used for the current injection with the use of the optional capacitor CBm the appropriate insertion of the capacitor CB may be beneficial in improving the performance of the circuit 1000C (for example, in improving its efficiency).

It is appreciated, therefore, that an embodiment represented in FIGS. 10C and 10D of this additional example provides an electronic circuitry having primary and secondary sides and including a power converter, an active clamp, and a first electronic circuit. The power converter contains an input voltage source; a transformer having primary and secondary windings, on the primary and secondary sides, respectively; a combination of a main switch in parallel with a main switch capacitor (such combination being in series with the primary winding on the primary side); and a synchronous rectifier in series with the secondary winding on the secondary side. The active clamp circuit is disposed across the main switch and contains a clamp switch and the clamp capacitor in series with the clamp switch. The first electronic circuit has (i) a first auxiliary winding on the secondary side of the transformer in series with and between a first diode and a first terminal of a first switch, (ii) a first capacitor connected between a second terminal of the first switch and a ground; and (iii) a current source circuitry disposed in parallel with the first capacitor and connected directly to the second terminal of the first switch. By design, the first electronic circuit is configured to store energy from parasitic oscillations (occurring across the main switch during dead time of operation of the power converter) in the first capacitor, thereby generally attenuating the parasitic oscillations without substantial dissipation of the energy from the parasitic oscillations. In any embodiment of the electronic circuitry, the active clamp circuit may additionally include a combination of two clamp diodes, and/or the current source circuit may be configured as a current-injection circuit. When the current source circuit is configured as a current-injection circuit, it may include a second diode in series with an injection winding and an auxiliary winding (each of the injection and auxiliary windings being at the secondary side); an injection switch disposed between the injection winding and the ground; an injection capacitor in series with and between the injection winding and the ground; and a third diode disposed between a point common to the injection winding and the injection capacitor and a terminal of a clamp diode from the combination of the two clamp diodes. Substantially any embodiment of the electronic circuitry may additionally include an auxiliary capacitor between the terminal of the clamp diode, from the combination of the two clamp diodes, and the ground. In any embodiment, the clamp switch may be configured to be turned on at a moment of time after the main switch is turned off. Alternatively or in addition, the clamp switch may be configured to be turned off at a moment of time prior to the moment of time at which current passing through the secondary winding reaches a zero level.

The same embodiment of FIGS. 10C and 10D additionally provides a method for operating such electronic circuitry. The method generally includes the steps of (a) increasing an amplitude of a magnetizing current of the transformer while the main switch is turned on; (b) transferring leakage inductance energy of the transformer to an auxiliary capacitor on the secondary side; (c) storing energy from parasitic oscillations, occurring across the main switch during dead time of operation of the power converter, in the first capacitor, thereby generally attenuating the parasitic oscillations without substantial dissipation of the energy from the parasitic oscillations; and (d) injecting current, into a winding on the secondary side, by discharging at least one of the auxiliary capacitor and the first capacitor. In implementation of any embodiment of the method, the clamp switch may be configured to be turned on at a moment of time after the main switch is turned off. Alternatively or in addition, the clamp switch may be configured to be turned off at a moment of time prior to the moment of time at which current passing through the secondary winding reaches a zero level. In implementation of any embodiment of the method, the operational advantage can be taken from the fact that the active clamp circuit may additionally include a combination of two clamp diodes, while the current source circuit is configured as a current-injection circuit (including a second diode in series with an injection winding and an auxiliary winding, each of the injection and auxiliary windings being at the secondary side; an injection switch disposed between the injection winding and the ground; an injection capacitor in series with and between the injection winding and the ground; and a third diode disposed between a point common to the injection winding and the injection capacitor and a terminal of a clamp diode from the combination of the two clamp diodes; and the auxiliary capacitor between the terminal of the clamp diode, from the combination of the two clamp diodes, and the ground.) In particular, in such a case the method may further include the step of turning the injection switch on to initiate the step of injecting the current which—in a specific case—may include injecting a current formed as a result of discharging the injection capacitor.

Further Embodiments

In a related embodiment of this invention, a current injection circuit is configured to utilize the energy from the energy storage capacitor (Cr, 42) and also from a current-injection capacitor (which is charged in every cycle from the input voltage via the leakage inductance between the primary winding (L1,14) and current injection winding (Linj, 46)) in a quasi-resonant mode. According to the idea of the invention, such utilization is carried out to achieve a situation when the additional energy, taken from the current injection capacitor, is adequate to discharge the parasitic capacitor (Ceq, 20) to zero before the main switch turns "on".

In this embodiment, in order to increase the energy in the injected current, the value of the capacitance of the (Cinj, 54) capacitor has to be increased. Taking more energy from the (Cinj, 54) reduces the current extracted from the energy-storage capacitor (Cr, 42) and, as a result, the voltage Vr across (Cr, 42) increases, leading to an increase of the amplitude of the second-order parasitic oscillation across the main switch M1.

Methodologies of harvesting energy of the parasitic oscillation and adding the voltage injection to increase the energy of current injection is described in reference to FIGS. 11A,11B, 12, and 13A.

Examples 5 and 6. A voltage-injection circuit takes its energy from the transformers depicted in FIGS. 11A and 11B. A voltage-injection circuit has two terminals, a positive terminal 56 and a negative terminal 58. In FIG. 11A, during the time when the (SR, 26) is "on", a difference of potentials is being formed across the capacitor (Cv, 62). The Cv is charged via the diode (D1V, 64). Further, during the conduction time of the main switch the voltage across the winding 60 adds to the voltage across (Cv, 62) and turns "on" the diode (D2V, 66) charging the capacitor (Cvinj, 68). With a larger leakage inductance between the primary winding (L1, 14) and the winding 60, the energy transferred to Vinj is done efficiently in a quasi-resonant way. To increase the value of leakage inductance, fractional (incomplete) turns can be used to form the winding 60.

FIG. 11B presents an even simpler circuit. Here, the energy is transferred from the winding 60, directly to (Cvinj, 68) via the leakage inductance between the primary winding L1 and the winding 60.

It has to be mentioned that that voltage source can come from other energy sources such as the energy of the leakage inductance between the primary winding, 14, and the secondary winding, 16, or between an auxiliary winding and the secondary winding, as presented in FIG. 10C.

Examples 7 and 8. In order to increase the energy extraction from the capacitor (Cr, 42), a voltage injection technique is employed. This methodology involves increasing the voltage that supplies the current injection circuit at the anode of the diode (Dinj, 48), as depicted in FIG. 12 and FIG. 13A.

Figure 12:
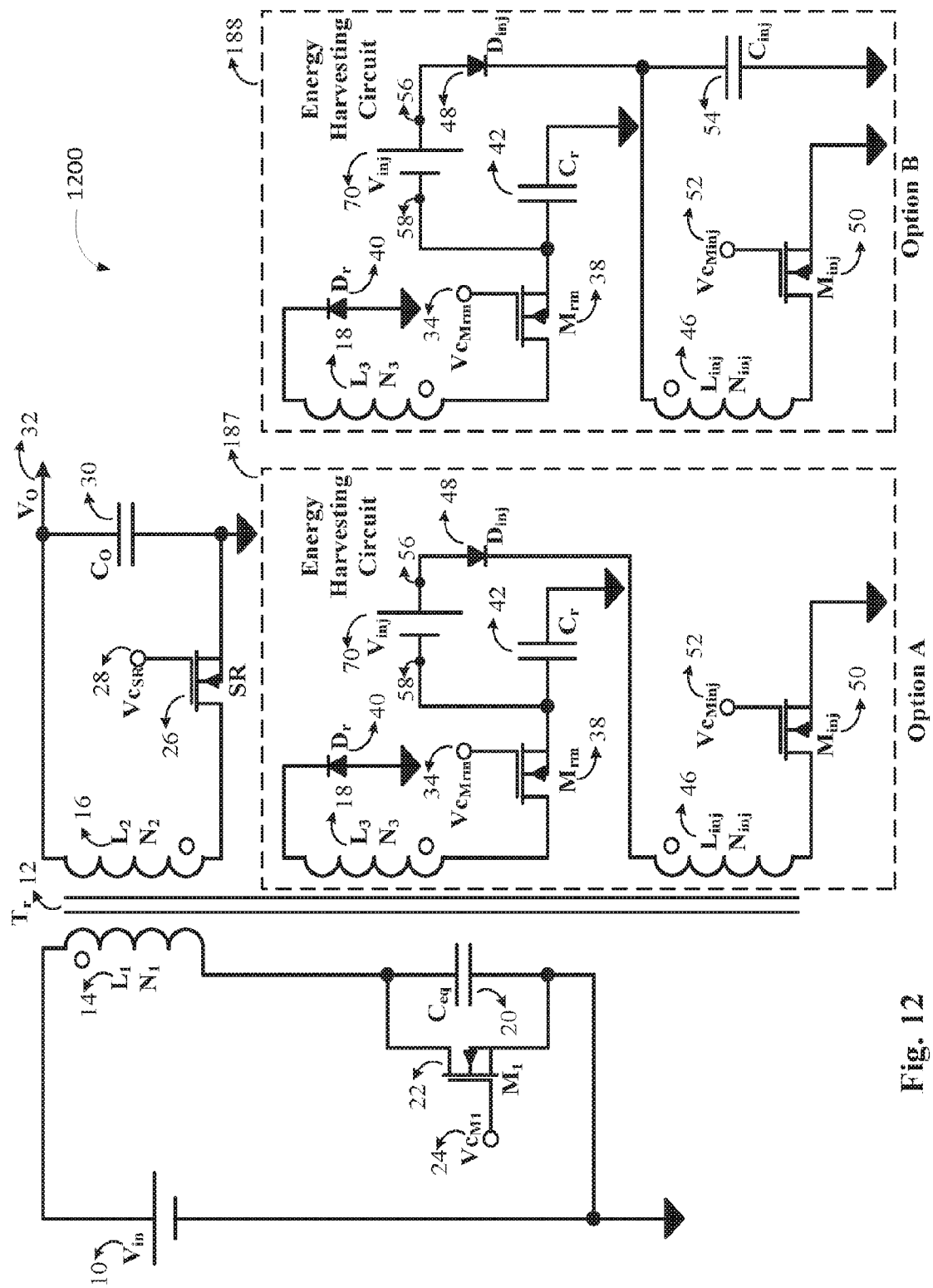
FIG. 12 illustrates an embodiment containing the flyback topology circuitry of FIG. 9A that is equipped with a voltage injection capability and with and without an additional current injection capacitor.
Figure 13A:
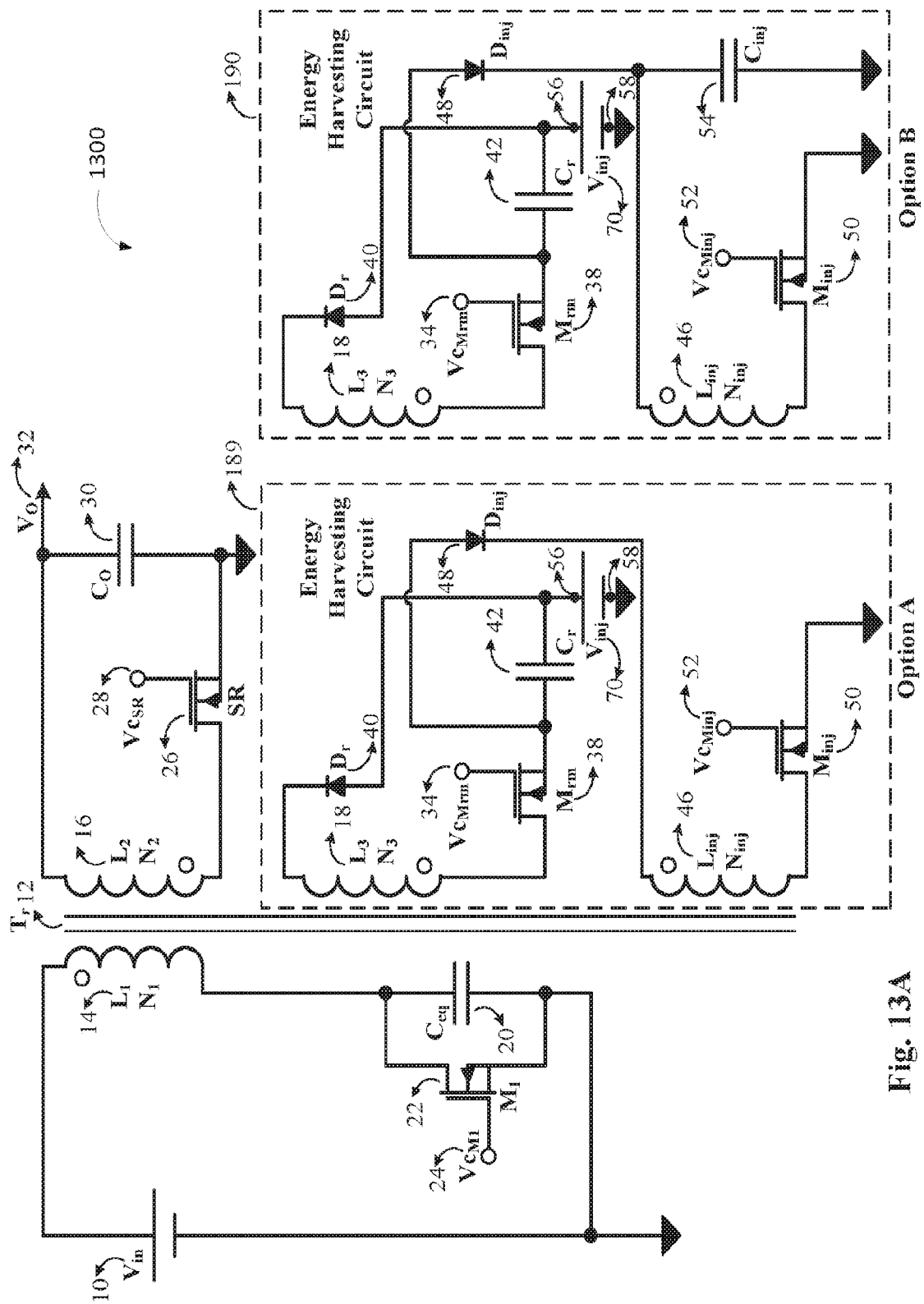
FIG. 13A illustrates a related embodiment, in which a flyback topology circuitry of FIG. 9A additionally contains a differently implemented voltage injection and with and without an additional current injection capacitor.

FIG. 12 presents an embodiment of the electronic circuitry 1200 with two alternative implementations (shown as Option A and Option B) of the energy harvesting circuit characterize by/possessing an additional voltage injection capability. With Option A, the voltage injection is placed in series with the diode (Dinj, 48). The voltage at the anode of (Dinj, 48) is the sum (aggregate) of the voltage across the energy storage capacitor (Cr, 42) and the voltage injection source (Vinj, 70). Because the voltage at the anode of (Dinj, 48) is larger than the voltage across Cr, 42, the current injection is larger and it lowers the voltage across (Cr, 42). As a result, two goals are accomplished: the goal of increasing the injection current amplitude, and the goal of lowering the voltage across Cr (which, in turn, decreases the amplitude of the second-order parasitic oscillation).

The Option B of the energy harvesting circuit employs the capacitor (Cinj, 54), the operational involvement of which has been already discussed in reference to FIG. 10A. The use of Option B offers a great flexibility to the designers, as by controlling the value of the capacitance of the capacitor (Cinj, 54) the energy contained in the injected current can be controlled as desired—and, if more energy is needed to be derived from (Cr, 42), the voltage of the voltage injection source can be tailored accordingly. In an embodiment that utilizes Option B of the energy harvesting circuit, the current injection energy is extracted from three different sources: from the energy storage capacitor Cr, the voltage injection source Vinj, and from the capacitor Cinj.

Examples 9 and 10. FIG. 13A illustrates electronic circuitry 1300A equipped with alternative electronic Options A and B for energy-harvesting/current injection portion of the circuitry. Here, the voltage injection source of the Option A portion of the circuitry is disposed with the negative polarity terminal to the ground. By increasing the voltage of the voltage injection, for example, the amplitude of the current injection through (Dinj, 48) can be increased to the point where the average current of the current injection passing through (Dinj, 48) is equal to the average magnetizing current passing through (Dr, 40). At that point, the voltage across (Cr, 42) can be zero and there will be no ringing in the drain of the main switch. In this case, the circuit will work as the circuit described in U.S. Ser. No. 14/274,598.

If the voltage of the voltage injection is further increased, then the average current through the current injection circuit will be larger than the magnetizing current harvested from the parasitic oscillation, and the voltage across (Cr, 42) will become negative. The operation in this case will be similar to that described in U.S. 62/429,373. This circuit offers full flexibility to the designer.

When Option B of the energy harvesting and current injection is utilized, a (Cinj, 54) capacitor is added as compared with Option A of FIG. 13A, providing the designer with even greater flexibility.

Referring again to FIGS. 11A, 11B, 12, and 13A, in the embodiments where a voltage injection source is used, the energy extraction from the energy storage capacitor (Cr, 42) can be fully controlled and, at the same time, the energy of the current injection is also fully controllable via the value of (Vinj, 70) and the value of Cinj, 54. In the embodiments presented in FIGS. 11A, 11B, 12, and 13A the energy is harvested via (Cr, 42) from the parasitic oscillation during the dead time, and this energy is then used for the current injection circuit in discharging the parasitic capacitance (Ceq, 20). To obtain certain goals—such as zero voltage switching across the main switch—additional energy is taken from the voltage injection source (Vinj, 70) and from the current injection capacitor (Cinj, 54).

Examples of Embodiments Configured to Inject Energy from a Voltage Source Synchronized (in Frequency) with the Parasitic Oscillation.

Figure 13B:
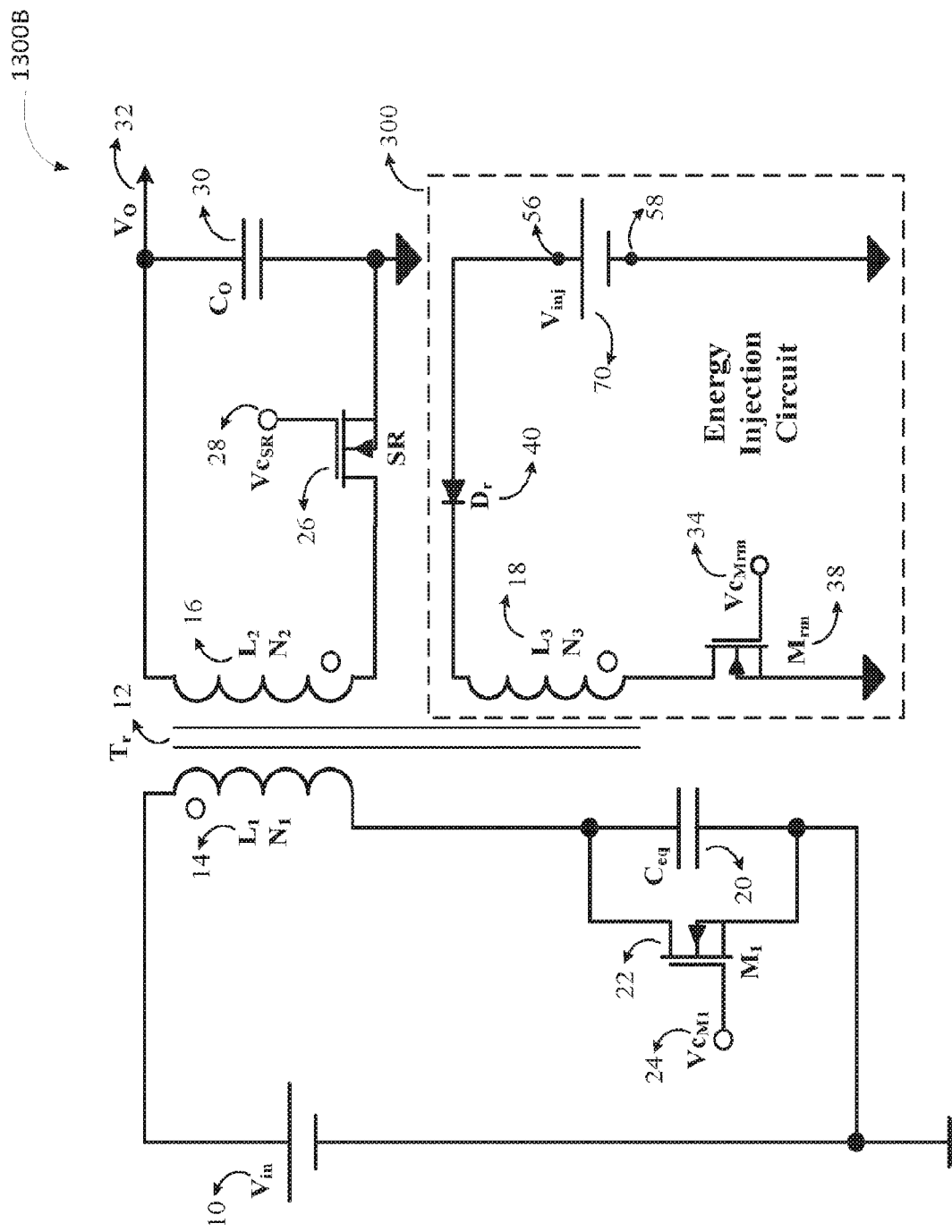
FIG. 13B depicts an embodiment in which the voltage injection is synchronized with the parasitic oscillations.

FIG. 13B is a schematic of electronic circuitry 1300B. In comparison with the embodiments of FIG. 12, 13A, rather than operate by extracting the parasitic oscillation energy, 272, (see FIG. 2) and storing that energy in a capacitor (Cr, 42) and adding additional energy injected from a voltage source—such as the voltage source (Vinj, 70) the embodiment 1300B is configured to use the parasitic ringing energy by injecting additional energy at the time when the magnetizing energy of the magnetizing current is zero. By synchronizing the process of injection with the zero crossing of the magnetizing current, the additional energy can be added to force the next "valley" of the parasitic ringing to reach zero voltage. As shown in FIG. 13B, the Energy injection circuit is formed by an auxiliary winding 18, and a unidirectional switch that is formed by (Mrm, 38), and (Dr, 40), and a voltage injection source (Vin, 70)—just like in the energy harvesting circuit.

Figure 13C:
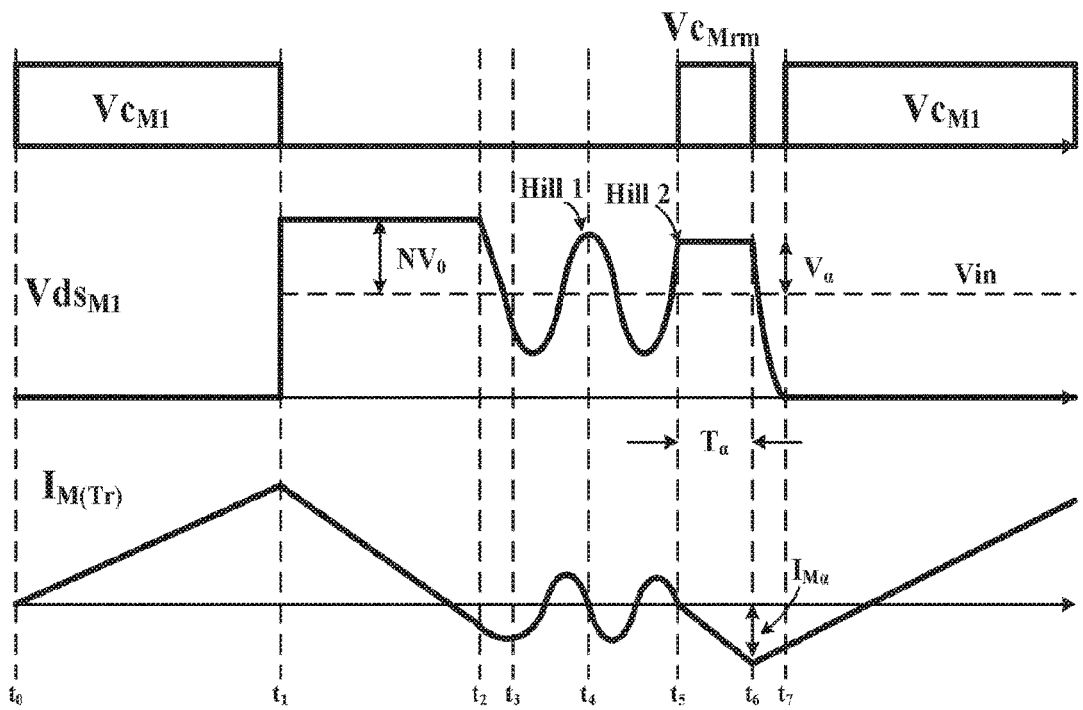
FIG. 13C are plots illustrating the key waveforms of operation (in discontinuous mode) of the embodiment of FIG. 13B.

FIG. 13C presents the key waveforms of the operation of the circuit 1300B: —the control signal from the main switch M1, VcM1; —the control signal for the Mrm, VcMrm; the voltage across the main switch, VdsM1; —and the magnetizing current through the transformer Tr, IM(Tr).

As shown, between t0 to t1 the main switch M1 is "on" and the magnetizing current builds up to its peak value reached at t1. Between t1 to t2, the energy stored in the magnetizing inductance is transferred into the secondary side via the synchronized rectifier (SR, 26). At t3, the energy stored in the parasitic capacitance (Ceq, 20) is converted into inductive energy characterized by a negative magnetizing current IM1, of amplitude calculated according to equation 5 of FIG. 4. Between t3 and t5, as depicted in FIG. 13C, the parasitic oscillations occur. The control signal VcMrm turns "on" the switch (Mrm, 38) at the Hill of the oscillation, at t5, when the magnetizing current amplitude is zero. From t5 to t6, the voltage injection source (Vinj, 70) of the embodiment 1300B injects energy thereby building up the magnetizing current from zero (at the moment t5) to a peak value (at the moment t6).

At t6, (Mrm, 38) turns "off" and the magnetizing current IM (Tr) starts discharging the parasitic capacitor Ceq across the main switch M1, to the zero level thereby creating zero voltage switching conditions for the main switch M1 at the moment t7.

As readily understood by a person of skill in the art, in this embodiment the energy injection is activated at the hill of the parasitic ringing and the energy injected is tailored to add to the energy already existing in the parasitic ringing. With the use of this embodiment, the controller has to be able to detect the Hill prior to the moment of the turn "on" of the main switch M1. The time of injection does not have to coincide with the occurrence of the Hill for the circuit to be operable and to work, but the implementation of the appropriate synchronization offers the advantage of maximizing the efficiency of the energy injection process. (The embodiment in which the synchronization is observed can be referred to as an embodiment with the synchronized voltage injection.)

The amount of injected energy is a function of the voltage level of the voltage injection source. Both (and each of) voltage injection sources depicted in FIGS. 11A and 11B are suitable for this application, because the voltage level is proportional to the input voltage. At a higher level of input voltage (that is, at higher Vin), the amount of energy injected required to obtain zero voltage switching is higher.

Figure 13D:
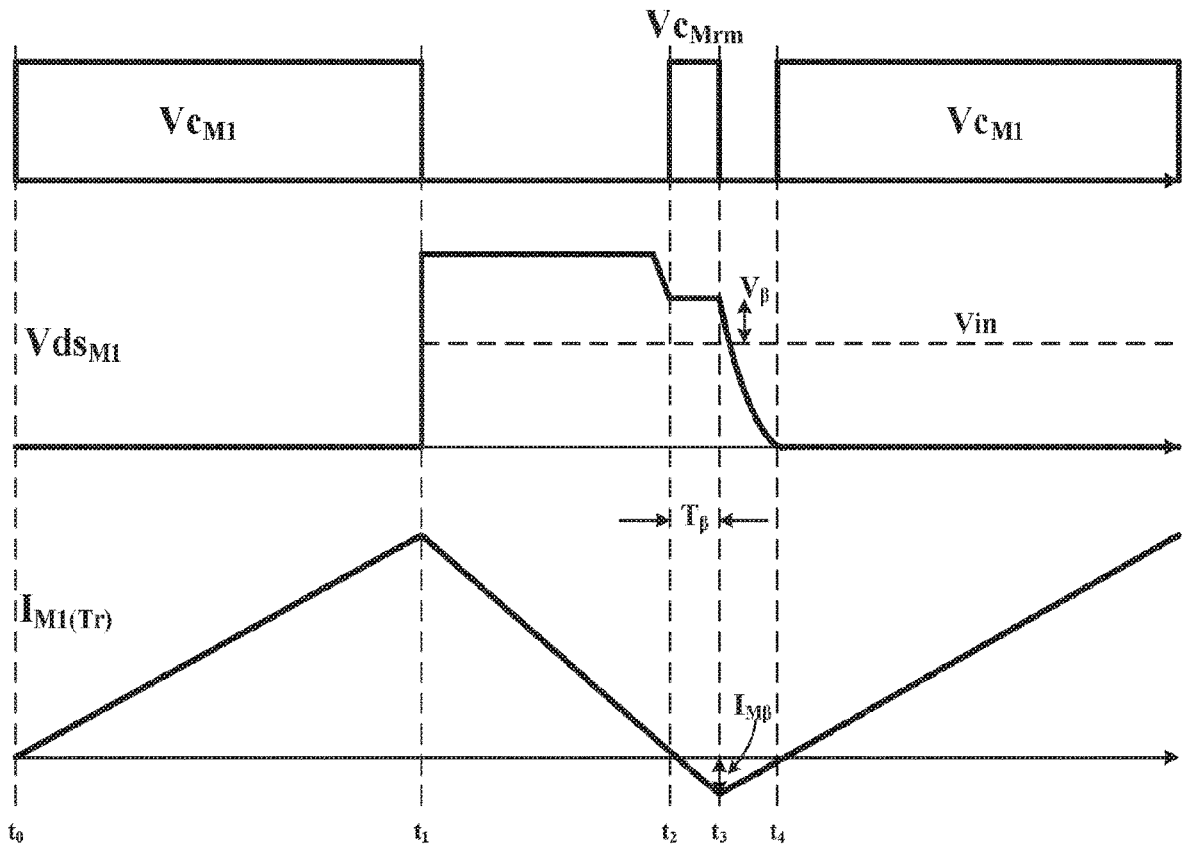
FIG. 13D depicts the key waveforms of operation of the embodiment of FIG. 13B; here, the circuitry operates in critical conduction mode.

The above-described methodology can be applied to a critical conduction operation—as shown in FIG. 13D. Here, the energy injection is carried out prior to the moment when the voltage across the main switch decays to the level below the input voltage level.

A skilled artisan will readily understand that the discussed methodology is substantially different from that of U.S. Pat. No. 9,673,718: that circuitry utilizes a capacitor in place of thee voltage injection source, which capacitor is charged by a bidirectional switch in a flyback mode during the time when (SR, 26) is conducting.

That makes the voltage across the main switch to jump to a Vin+N*Vo level. This creates a voltage jump with a high dV/dt, thereby causing additional losses on switching. The capacitor of U.S. Pat. No. 9,673,718 (in place of the voltage injection source of the current embodiment) is charged to a voltage proportional to the output voltage. The latter varies from 5V to 20V in AC-DC adapters with Intelligent Power Delivery. Accordingly, an adjustment of the conduction time of the bidirectional switch is required for proper operation.

In contradistinction, in the current embodiment the energy injection is synchronized with the hill to effectuate the injection of the additional energy in the magnetizing current at its zero level, and to prevent the subtraction (reduction) of energy if the magnetizing current has an opposite polarity (which situation can practically occur during operation of the circuitry discussed in U.S. Pat. No. 9,673,718).

Another advantageous feature of the present embodiment manifests in that the voltage injection source (Vinj, 56)—unlike the capacitor of U.S. Pat. No. 9,673,718—can be charged with energy taken from other parasitic elements (such as the energy from the leakage inductance, as discussed below in reference to FIG. 14A.

Figure 14A:
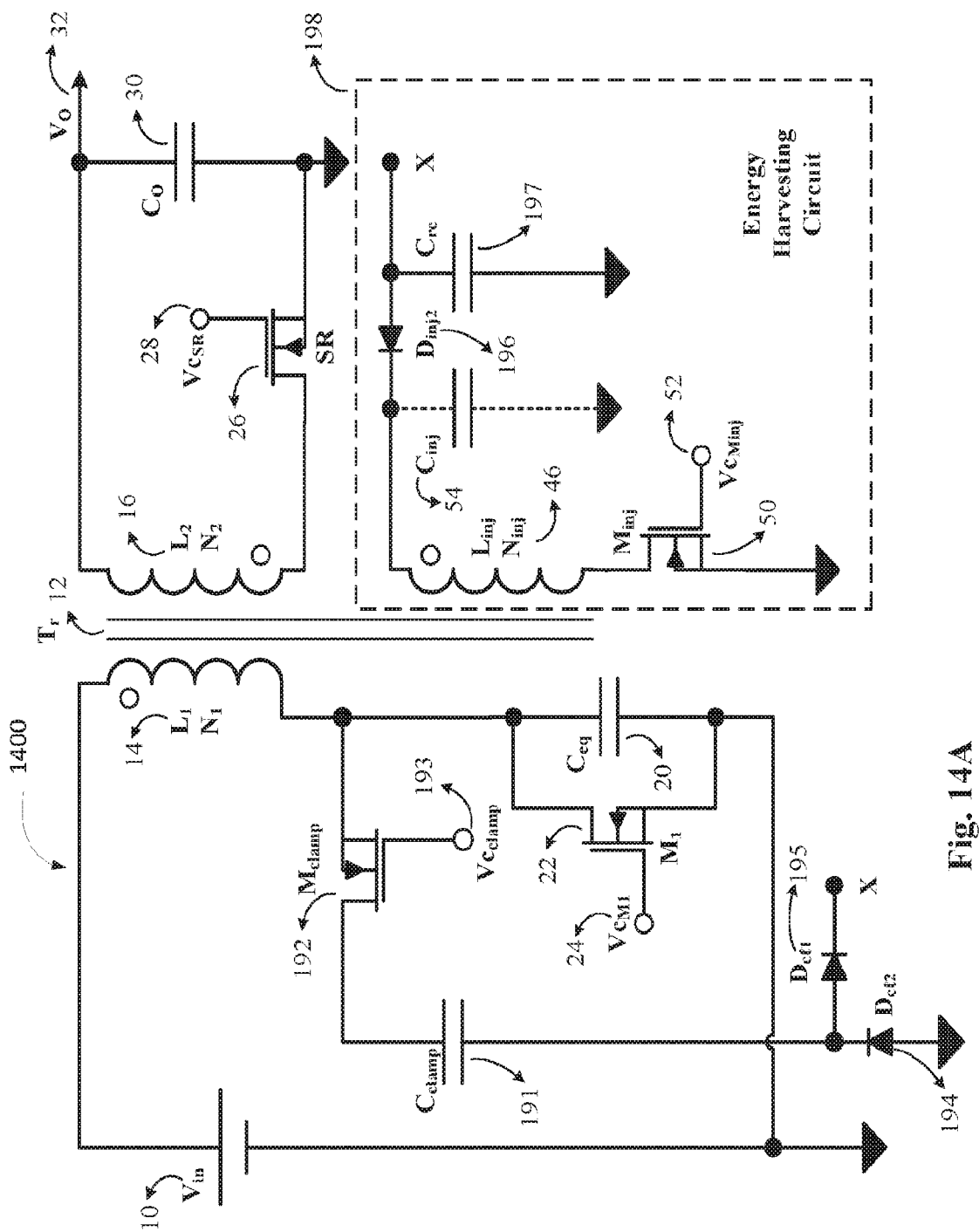
FIG. 14A shows an embodiment of the flyback topology electronic circuitry with a current injection circuit configured to inject current in a fashion that is synchronized with the "valley" and using the energy harvested from the leakage inductance.

Embodiments Configured to Utilize Energy from Leakage Inductance in Combination with Energy from the Parasitic Oscillation to Obtain Zero-Voltage Switching The current injection circuit can be used to harvest the energy from other parasitic elements. For example, the circuit 1400 of FIG. 14A is configured to obtain the energy for the current injection circuit from the energy of the leakage inductance.

U.S. 62/571,594, incorporated herein by reference, presents a technique where some of the leakage inductance energy is harvested while shaping the current through the clamp circuit and forcing some of the leakage inductance energy to be delivered towards the secondary side. In addition to the standard clamp circuit, formed around the clamp switch (Mclamp, 192) and the clamp capacitor (Cclamp, 191), utilized are two additional diodes (Dcl1, 195) and (Dcl2, 194).

The cathode of (Dcl1, 195) is connected to a capacitor (Crc, 197), which in turn is connected to the current injection circuit formed by a diode (Dinj2, 196), the injection winding (Linj, 46), the injection switch (Minj, 50) controlled by the signal (VcMinj, 52). (In a related implementation, there may be an additional capacitor (Cinj, 54) added between the cathode of (Dinj2, 196) and the ground.

Figure 14B:
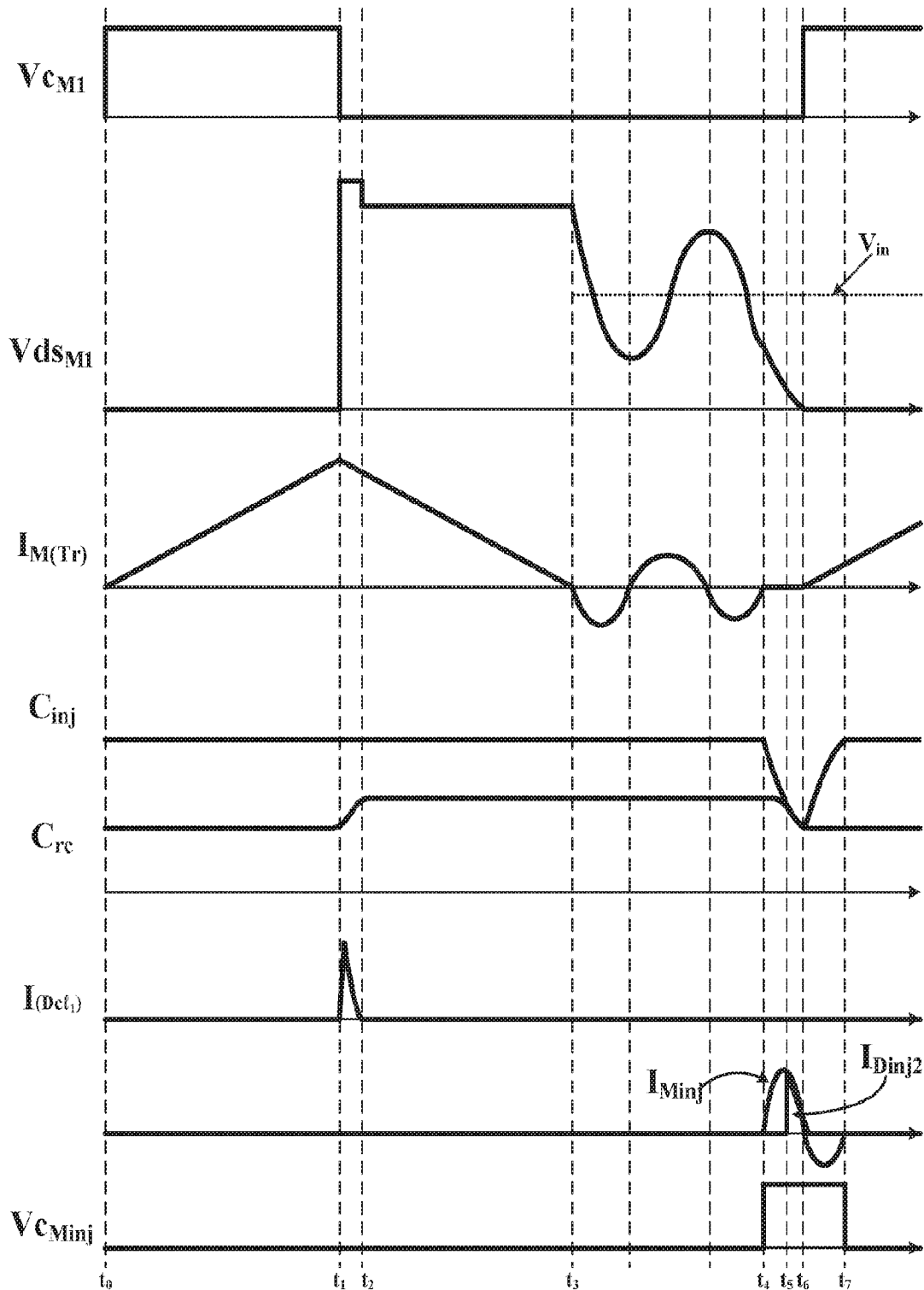
FIG. 14B depicts the key waveforms of operation of the circuit of FIG. 14A

FIG. 14B illustrates, as functions of time of operation, the key waveforms associated with the operation of the circuit 1400, including: the control signal for the main switch VcM1; the voltage across the main switch VdsM1; the magnetizing current IM(Tr) passing through the transformer (Tr, 12); the voltage across the capacitor in the injection circuit, Cinj, and the voltage across Crc; the current through the diode (Dcl1, 195); the current through the diode (Dinj2, 196); and the current through Minj, 50; and the control signal, VcMinj for (Minj, 50).

The circuit 1400 from FIG. 14A does not provide an opportunity to harvest the energy from the parasitic oscillation. For efficient optimization of the operation of this circuit, the valley detection technique (described above) may be employed.

In reference to FIG. 14B, in a time period between t0 and t1 the main switch (M1, 22) is conducting and the magnetizing current builds up in the transformer (Tr, 12). At t1, the main switch (M1, 22) turns "off" and the leakage inductance current starts flowing through the electronic components of the clamp—the switch (Mclamp, 192), the capacitor (Cclamp, 191), and the diode (Dcl1, 195), thereby charging the capacitor (Crc, 197) of the leakage inductance energy-harvesting circuit 198. The voltage across (Crc, 197) will be reflected across the main switch, as can be seen from the curve VdsM1. Between the moments t2 and t3, the magnetizing current flows into the secondary winding (L2, 16) via the rectifier (SR, 26). At t3, the current through the (SR, 26) reaches zero and at that time the parasitic oscillation between the (Ceq, 20) and the inductance of the primary winding starts. At t4, which coincides with the second valley of the curve VdsM1, the current injection switch (Minj, 50) is turned "on" and initially the energy is provided by the (Cinj, 54), which is being discharged until the voltage across Cinj reaches the level of voltage across (Crc, 197). After t5, the energy for the current injection is provided by/drawn from both capacitors (Cinj, 54) and (Crc, 197).

At t6, the current injection reaches zero. The values of (Crc, 197) and (Cinj, 54) are judiciously chosen to ensure that these capacitors have the energy storage sufficient and necessary for the (Ceq, 20) to be discharged by the current injection reflected in the primary winding, to zero and to create zero voltage switching conditions for the main switch (M1, 22). In some applications Crc,197 is much larger than the value of Cinj,54, like one order of magnitude (10 times). After t6, the (Cinj, 54) capacitor is charged through the leakage inductance between the primary winding (L1, 14) and the current injection winding (Linj, 46) to reach the voltage level it had before the moment t4. The parasitic oscillation depicted in VdsM1, IM(Tr) waveforms in the time period t3 to t4 can be eliminated by using different methods of energy harvesting and this embodiment can apply as well without deviating from the scope of this invention.

In embodiments of the invention referred to as the ones utilizing the synchronized current injection—just like in the embodiments utilizing the synchronized voltage injection—the energy from the parasitic oscillation is used for injection. In the synchronised current injection embodiment, the energy of the parasitic oscillation is used to lower the voltage across the main switch to the valley when the magnetizing current reaches zero. The current injection is synchronized with the valley to minimize the energy necessary to reach zero voltage across the main switch. By synchronizing the current injection with the valley, the use of additional energy from the current injection is minimized, which increases the efficiency. When the synchronization of the current injection with the valley is not implemented, the amplitude of the current injection and the energy required by the current injection s higher, and the efficiency of the converter generally decreases.

It would be understood by a person of skill in the art that in the embodiment 1400 discussed in reference to FIGS. 14A, 14B a portion of the leakage inductance energy is harvested in order to deliver the energy for the current injection circuit. Additional energy can be provided for the injection circuit by a Cinj capacitor, which is charged between the moments of time t6 and t7, as depicted in FIG. 14B, in a quasi-resonant mode, from (Vin, 10) during the conduction time of the main switch (M1, 22).

The energy necessary for the current injection can also be acquired from an auxiliary winding. In some application the auxiliary winding 18, can be also used as bias winding as is presented in the embodiment 1500 of FIG. 15A. (In other applications the auxiliary winding can be totally independent as is presented in embodiment 1600A of FIG. 16A and embodiment 1600C of FIG. 16C). In the embodiment 1500 of FIG. 15A makes use of a flyback topology with a current injection circuit, 203. Here, the energy for the current injection comes from the bias winding via a circuit formed by (Dbinj, 199) and the capacitor (Cinj, 54). During the time that the energy is delivered to the main output via SR, the bias winding delivers the energy to the bias circuit via (Db, 200). In parallel with the energy transfer to the bias, some energy is delivered to (Cinj, 54) via (Dbinj, 199). The voltage across (Cinj, 54) is the same as the bias voltage (VBias, 202).

Figure 15A:
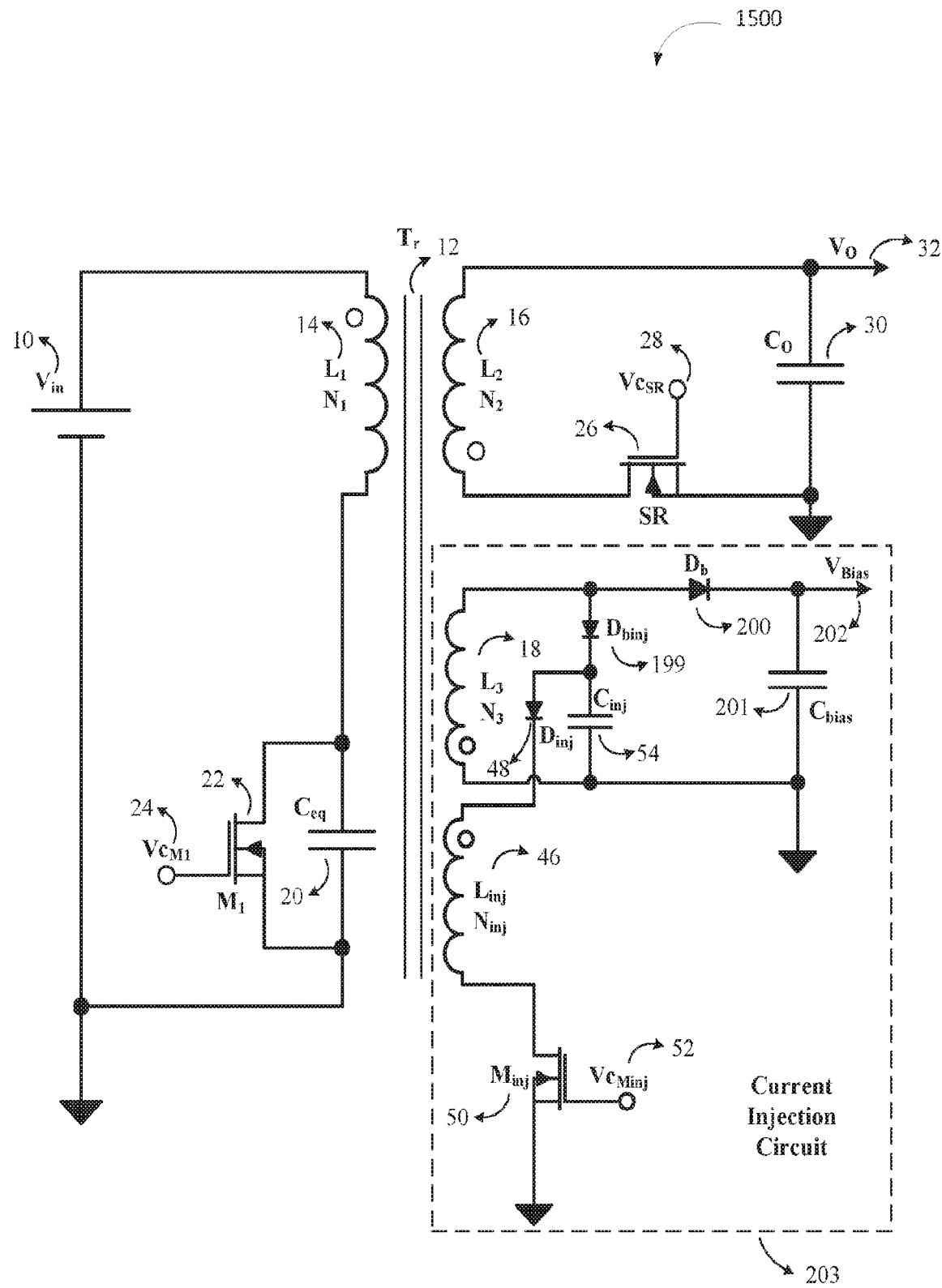
FIG. 15A shows a flyback topology circuitry with a current injection circuit configured to inject current in a fashion that is synchronized with "valley" and using the energy harvested from the bias winding.
Figure 15B:
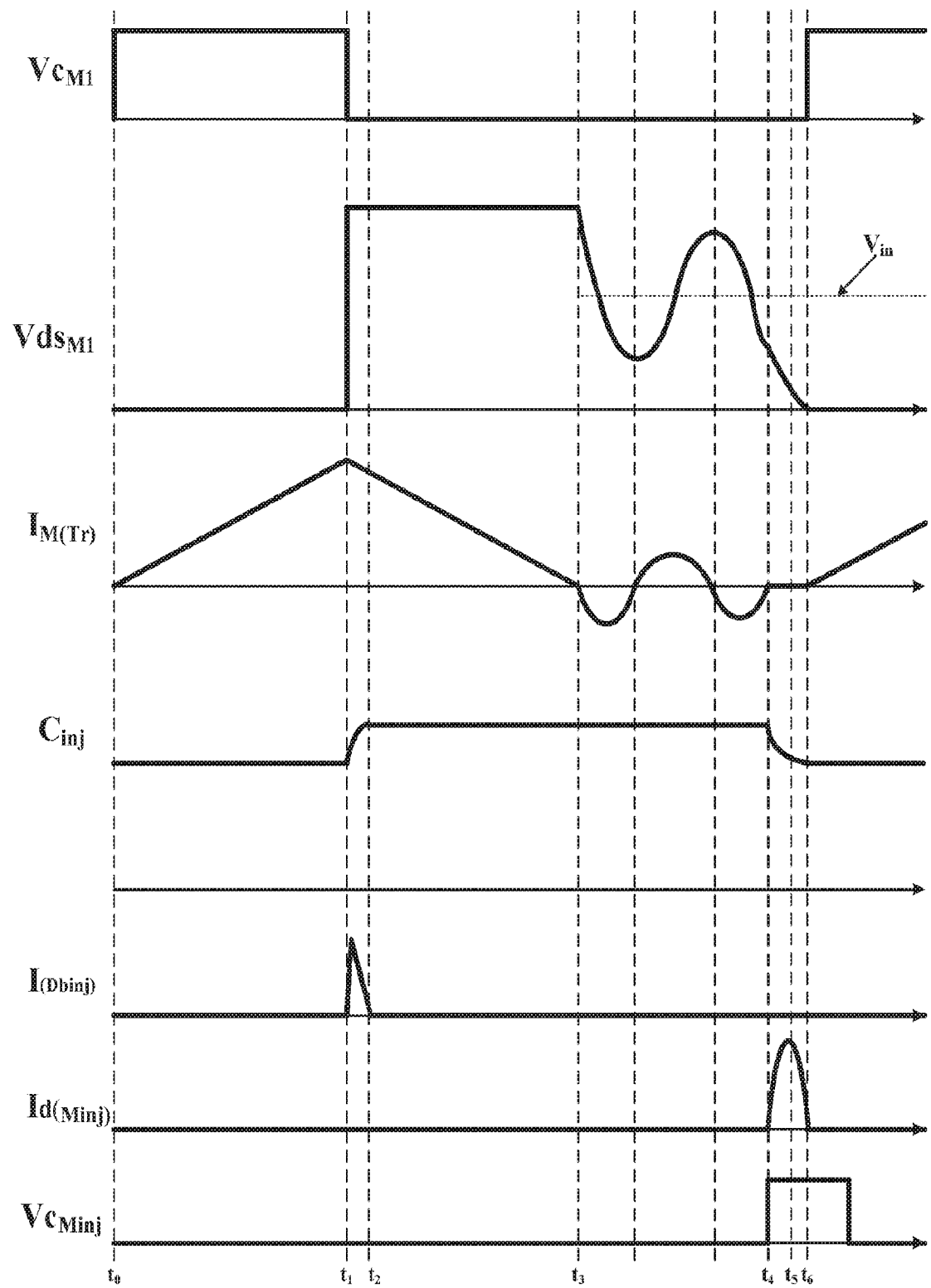
FIG. 15B depicts the key waveforms for the circuitry of FIG. 15A.

The key waveforms of the circuit presented in FIG. 15A are depicted in FIG. 15B. When the current injection switch (Minj, 50) is turned on, which occurs at the end of the dead time, the current injection starts and the injected current flows through (Dinj, 199), the current injection winding 46, and the current injection switch (Minj, 50). The injected current injection is also reflected in the primary side, flowing through the primary winding towards the input voltage source, (Vin, 10) and discharging the parasitic capacitance (Ceq, 20) towards zero.

Figure 16A:
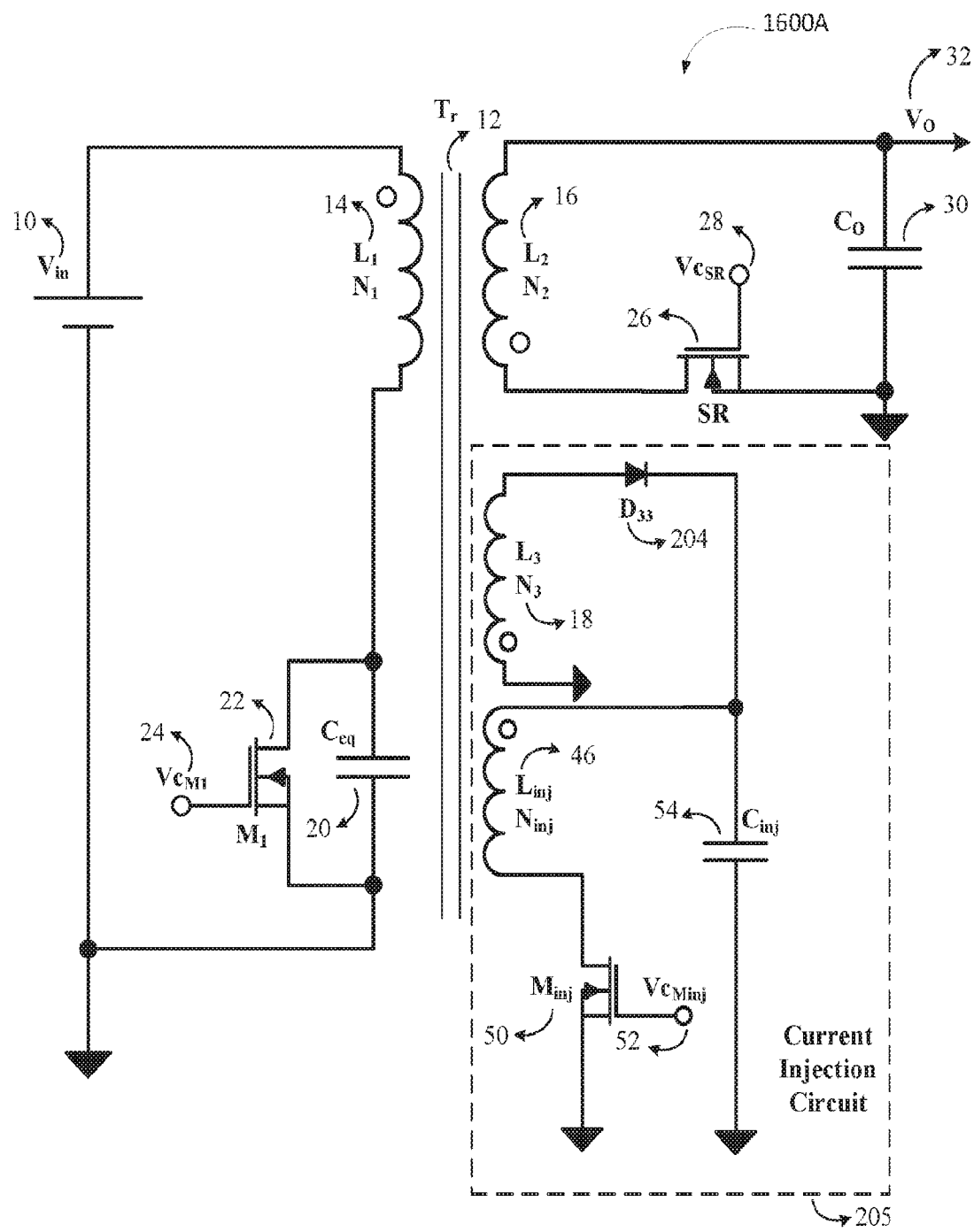
FIG. 16A illustrates an embodiment of the flyback topology circuitry with a current injection based on the energy harvested from an auxiliary winding and current injection synchronized with the valley.
Figure 16B:
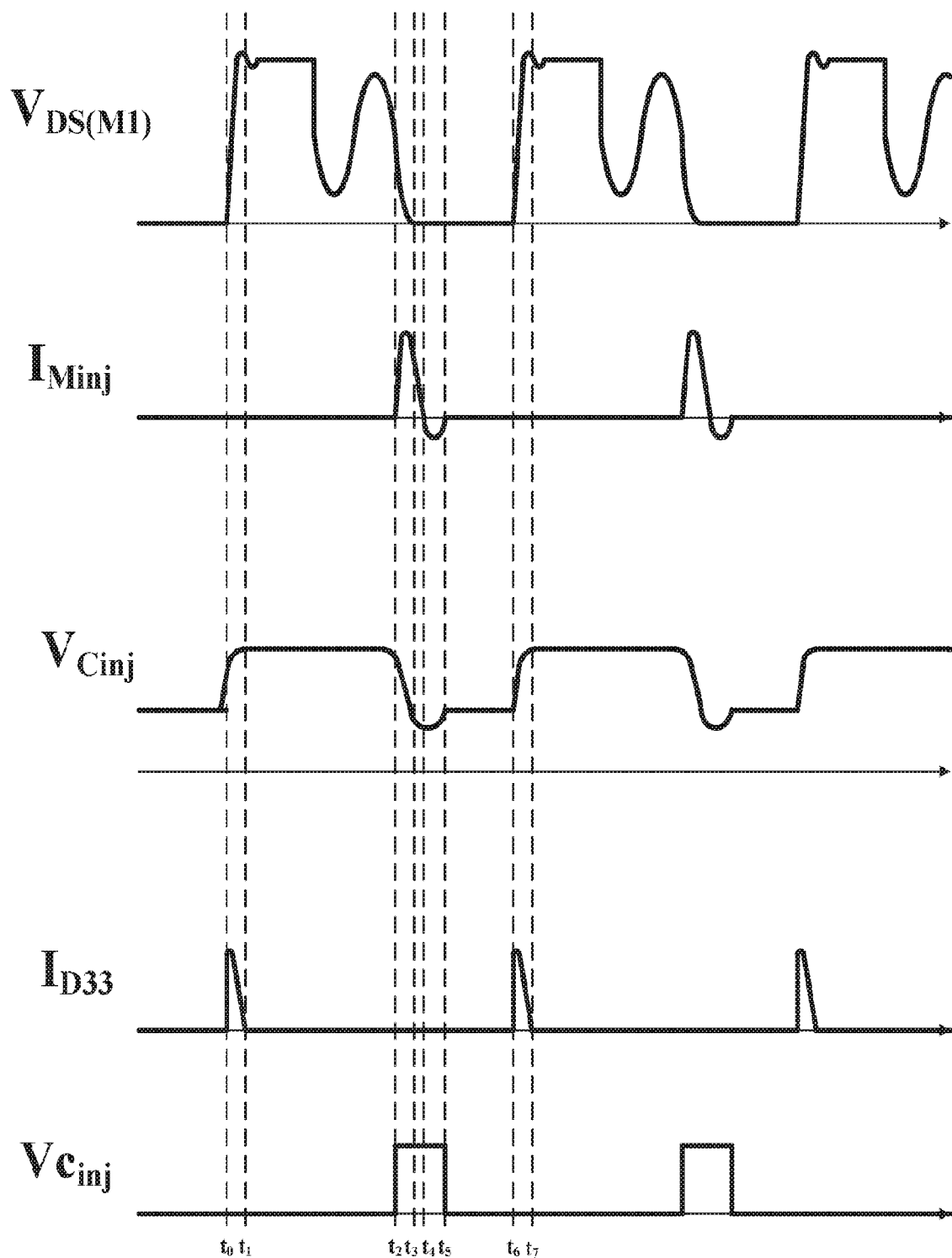
FIG. 16B depicts the key waveforms of the circuit of FIG. 16A.
Figure 16C:
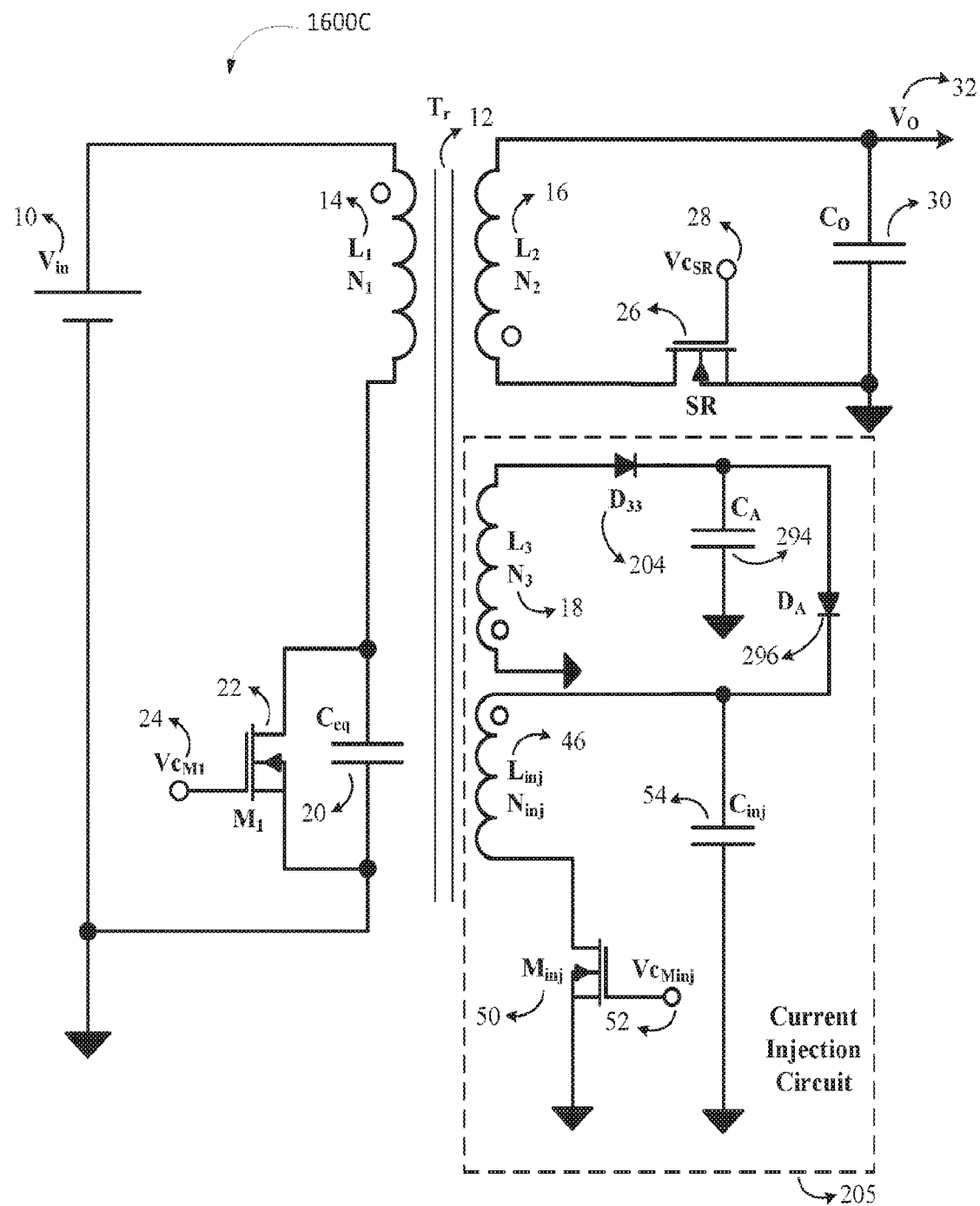
FIG. 16C depicts an embodiment of the circuit similar to that of FIG. 16A, but configured to offer better flexibility to the designer with respect to optimization of the current injection.

In the circuits depicted in FIG. 15A, FIG. 16A, and FIG. 16C, by design the coupling between the auxiliary winding 18 and the primary winding 14 can be very good and, as a result, the energy from the leakage inductance between the primary and secondary can be captured by the bias winding and used for bias power (while some of it is used for the current injection circuit or just for current injection as depicted in FIG. 16A and FIG. 16C). By design, the auxiliary winding 18 can be arranged to belong to the primary side—from the safety perspective—and in this way this winding 18 can have a tighter coupling with the primary winding 14.

FIG. 16A and FIG. 16B describe an embodiment in which the energy for the current injection comes from an auxiliary winding and from a current injection capacitor (Cinj, 54) which is charged in a quasi-resonant way from the input voltage during the conduction of the main switch M1, 22.

FIG. 16A is a schematic of another implementation 1600A with the current injection circuit 205. The key waveforms are presented in FIG. 16B, and include: (a) Vds(M1), which is the voltage across the main switch (M1, 22); (b) the current injection through the current injection winding 46, IMinj; (c) Vcinj, which is the voltage across the current injection capacitor (Cinj,54); d) ID33, the current through the auxiliary winding 18; e) VCinj, the control signal for the current injection switch Minj.

As shown, at to, the main switch (M1, 22) is turned "off" and the voltage across the main switch starts rising, as depicted by Vds(M1). When the voltage across (M1, 22), exceeds the input voltage level the magnetizing current starts flowing into the secondary winding 16 and auxiliary winding 18. The current through (D33, 204) starts charging the capacitor (Cinj, 54), as depicted by the VCinj waveform. That energy is stored in (Cinj, 54) until the moment t2, when the (Minj, 50) switch is turned "on" by (VcMinj, 52). At the moment t2, the current injection is activated and the injected current starts flowing from the (Cinj, 54) to the current injection winding 46, and further through (Minj, 50). The current of the current injection is reflected into the primary winding flowing towards the input voltage source (Vin, 10) and discharging the parasitic capacitor (Ceq, 20) towards zero. At the moment t3, the voltage across (Ceq, 20) is zero and the main switch (M1, 22) turns "on" at zero voltage switching conditions. At the moment t4, the current injection reaches a substantially zero level and at that time the voltage across (Cinj, 54) reaches its lowest amplitude. During the period t4 and t5, the (Cinj, 54) capacitor is charged via the leakage inductance between the primary winding 14, and the current injection winding 46, to a level that is proportional to the input voltage (Vin, 10). In the event the winding 18 is coupled very well with the primary winding 14, this circuit can take a portion of the energy of the leakage inductance of the primary winding and utilize it for the current injection with the purpose of creating a zero voltage switching condition for the main switch (M1, 22). In the event the auxiliary winding 18 is very well coupled with the primary winding 14, part of the current injection energy comes from the leakage inductance energy, leakage inductance between primary winding 14 and secondary winding 16.

In the embodiment 1600C of FIG. 16C, the capacitor $C_A$, 294 is charged by the auxiliary winding 18 by the magnetizing current in the transformer (Tr, 12). The energy from $C_A$ via the diode $D_A$ is injected into the current injection circuit formed by the winding 46, (Cinj, 54), and the Mosfet 50). As a person of skill will readily appreciate, the energy in the current injection is delivered by the energy stored in $C_{inj}$, which is charged during the "on" time of the main switch 22 in a quasi-resonant mode via the leakage inductance between primary winding 14 and the current injection winding 46, and also from the energy stored in ($C_A$, 294), which is charged through the winding 18 by the magnetizing current in transformer (Tr,12).

In this embodiment of the invention, a portion of energy of the leakage inductance between primary winding 14 and secondary winding 16 is used to deliver the energy to the current injection to discharge the parasitic capacitance across the main switch (M1, 22). This solution does not require a clamp switch (such as, for example, a (Mclamp, 192) depicted in FIG. 19A) and does not require a clamp capacitor (Cclamp,191) and the additional diodes (Dcl1, 195) and (Dcl2,194).

By creating a very good coupling from the primary winding to the auxiliary winding 18—specifically, the coupling that is much better than the coupling from the primary winding 14 and the secondary winding, 16, a substantial portion of the leakage inductance energy between primary winding and secondary winding will be diverted via (D33, 204) to the capacitor ($C_A$, 294).

Further, depending on the particular implementation of the overall circuitry, this energy can be used for a bias power and for current injection or both or any other purpose. The main goal of the proposed configuration is to extract as much as possible from the energy of the leakage inductance between the primary winding 14 and secondary winding 16 and to use it to further improve the performance of the converter (such as, for example, to reduce the switching losses).

Figure 17:
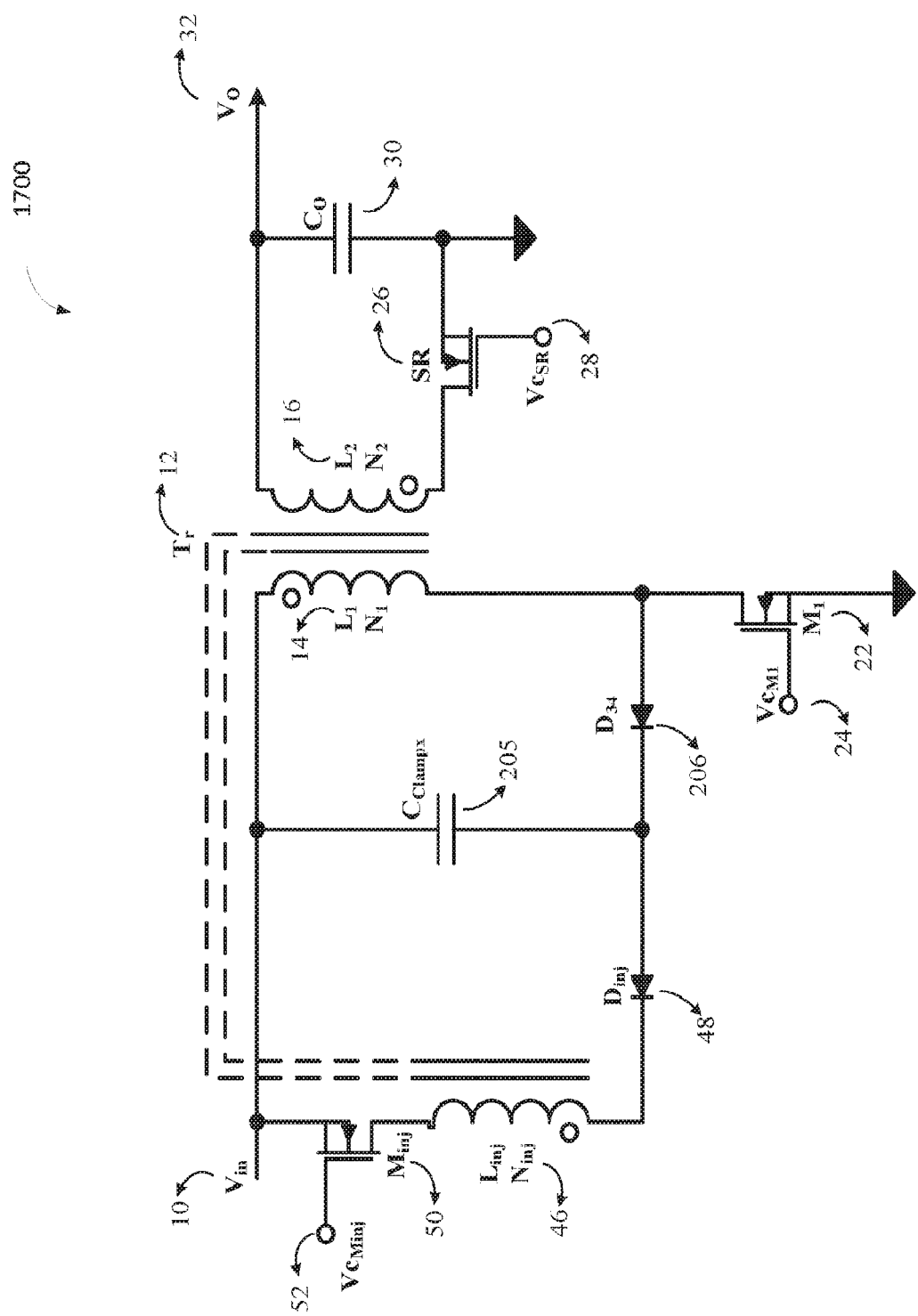
FIG. 17 shows an embodiment of a flyback topology circuitry with a current injection circuit configured to utilize energy harvested from the leakage inductance.

FIG. 17 presents a circuit 1700 implemented to extract the energy, for the current injection circuit, from the energy of the leakage inductance between the primary winding 14 and the secondary winding 16. When the main switch (M1, 22) is turned "off" the leakage inductance current starts flowing through (D34, 206), charging the clamp capacitor (Cclampx, 205). Further, at the end of the dead time the current injection switch (Minj, 50) is turned "on". The injected current (from current injection) starts flowing from (Cclampx, 205) via the (Dinj, 48), the current injection winding 46, and the current injection switch (Minj, 50). The injected current flowing through the current injection winding 46 will reflect in the primary winding 14, flowing towards the (Vin, 10) and discharging the parasitic capacitance of (M1, 22) towards zero. In this example, substantially 100% of the energy of the leakage inductance between the primary winding 14 and the secondary winding 16 is captured by the capacitor (Cclampx) and used for current injection designed to create zero or substantially near zero voltage conditions across the main switch M1.

In the embodiments presented in FIG. 15A, 16A, 16B, 16C and FIG. 17, the current injection energy is derived from the transformer after the main switch (M1, 22) turns "off", using part of the leakage inductance energy, thereby reducing the need in the clamp across the main switch. Additional energy may also come from the (Cinj, 54) capacitor in the event when the (Cinj, 54) capacitor is charged in a quasi-resonant fashion from the input voltage (Vin, 10) during the period of conduction of the main switch (M1, 22). The use of the embodiments depicted in FIG. 15A, 16A, 16B, 16C and FIG. 17 leads to the simplification of the flyback circuit and eliminates the need in a clamp portion of the circuit. (In case of embodiments of FIGS. 15A, 16A, and 16C that will require a very tight coupling between the primary winding and an auxiliary winding 18. The required tight coupling is possible to implement, because both windings are reported to the primary in respect of safety standards.)

The Current Injection portion of the embodiments of the invention in now discussed in reference to FIGS. 18, 19A, 19B, 20, 21A, 21B, 22, 23, and 24.

Figure 19A:
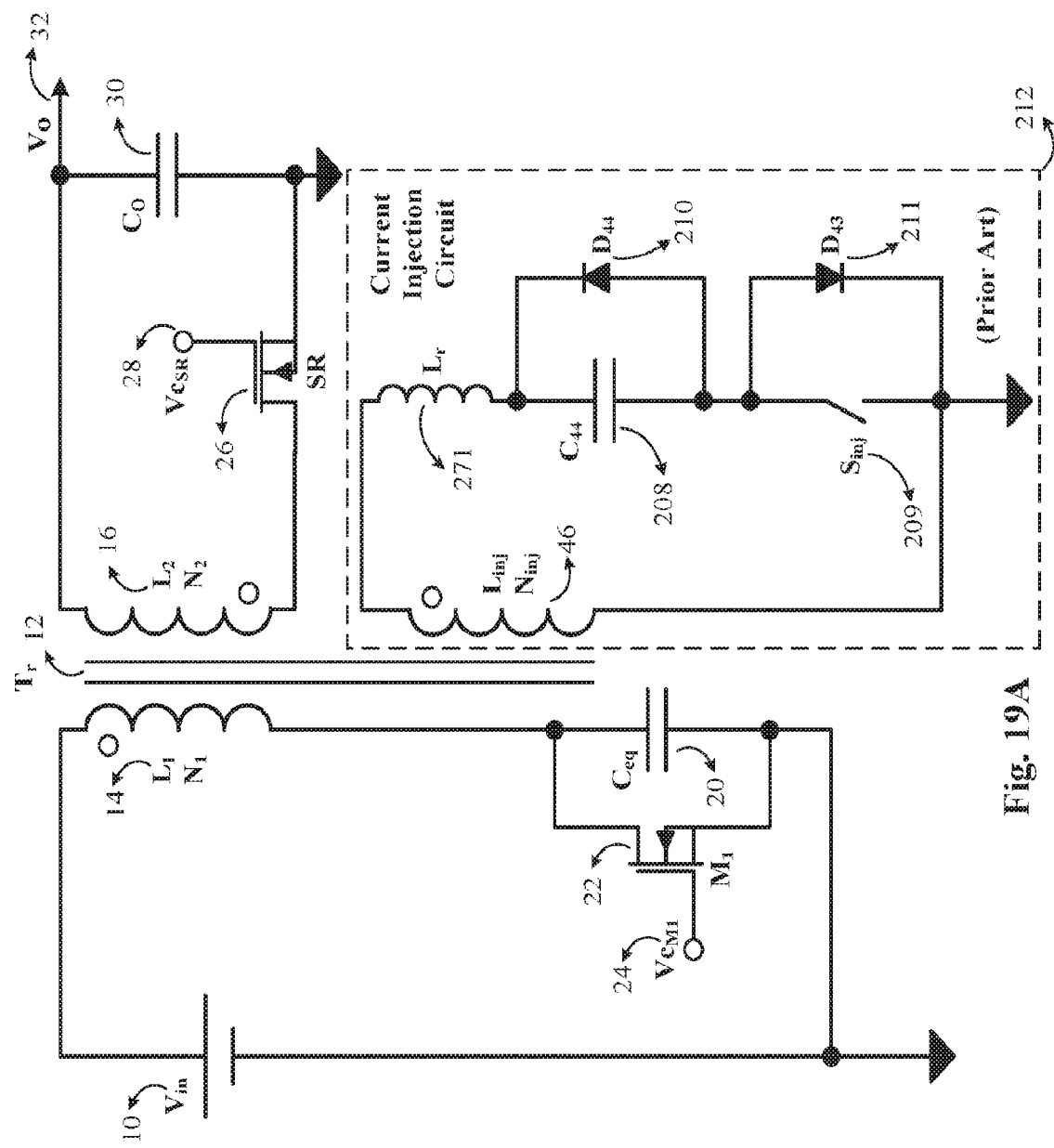
FIG. 19A depicts a circuit based on flyback topology with a conventionally-configured current injection.
Figure 19B:
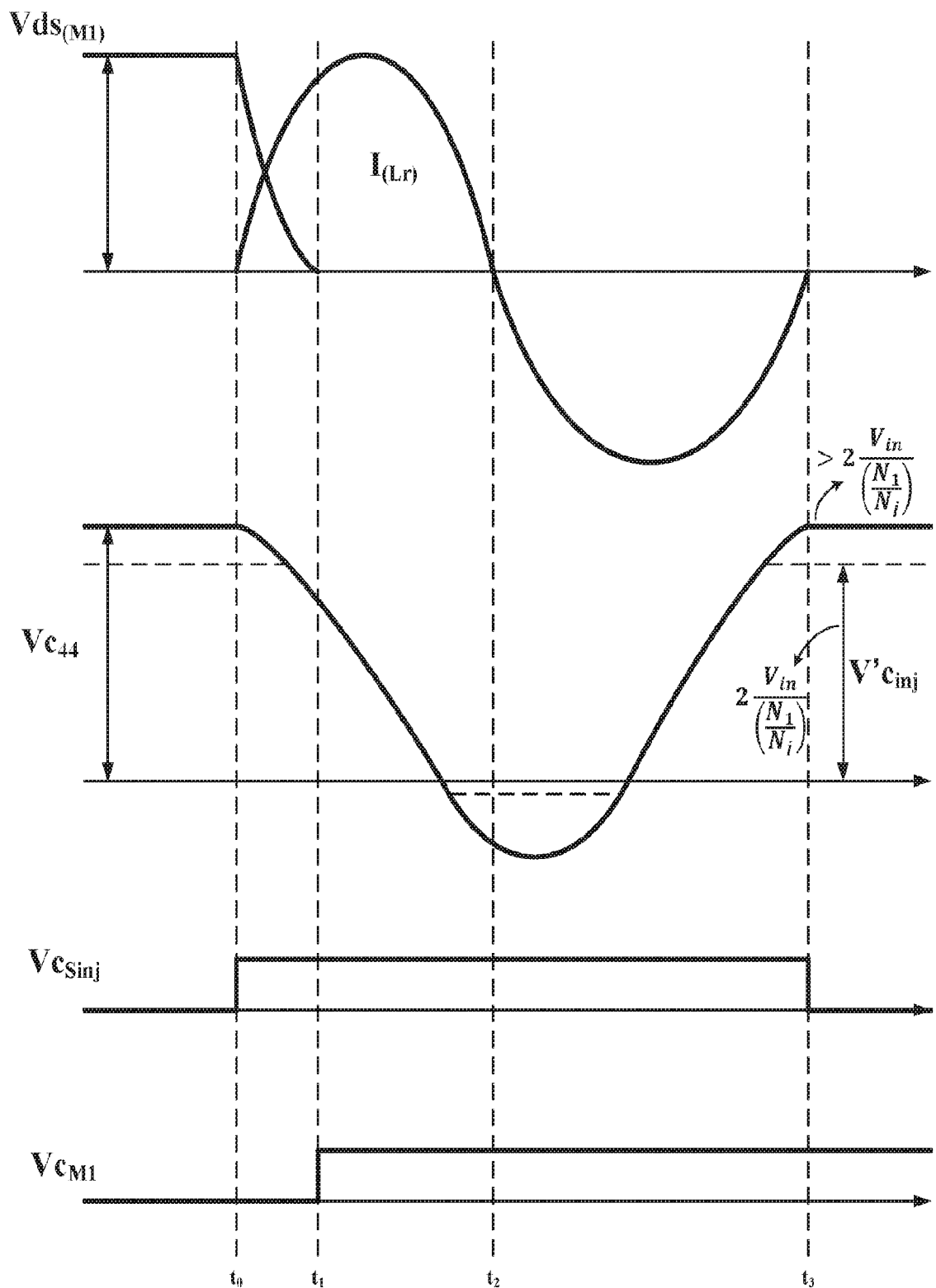
FIG. 19B depicts the key waveforms of the operation of the circuit of FIG. 19A.

FIG. 19A presents a current injection circuit discussed by Mao in U.S. Pat. No. 7,548,435 B2 (the Mao circuit). Mao was referring to a resonant tank cell of FIG. 19A formed by a resonant inductor (Lr, 271), a resonant capacitor (C44, 208), a clamp diode (D44, 210), a switch (Sinj, 209), and a diode (D43, 211). The diode (D43, 211) can be the body diode of a Mosfet while (Sinj, 209) is implemented with the use of a P channel Mosfet. The key waveforms in the Mao circuit are presented in FIG. 19B. These key waveforms are: a) the voltage across the switch (M1, 22), Vds(M1); b) the current through the resonant inductor (Lr, 271), I(Lr); c) the voltage across the resonant capacitor (C44, 208), VC44; d) the control signal for the switch (Sinj, 209), VcSinj; e) the control signal for the main switch (M1, 22), VcM1. In the Mao circuitry, the capacitor C44 is part of the resonant circuit formed by Lr and Ceq. As a result, during the operation of the Mao circuit, the voltage across (C44, 208) changes significantly during the resonance. The current through the resonant inductor (Lr, 207), which reflected in the primary, has the role of discharging the parasitic capacitance of the main switch (Ceq, 20), but because of the resonance with (C44, 208) this current reaches its peak amplitude even after the capacitor (Ceq, 20) is totally discharged at the moment t1. After the voltage across (Ceq, 20) reaches zero, the (Lr, 271) and (C44, 208) continue the resonance and under certain conditions the voltage across (C44, 208) becomes negative, which increases significantly the energy in the resonant tank formed by (C44, 208) and (Lr, 271). At the end of the cycle, which occurs at the moment t3, the voltage across C44 can be much higher than V'Cinj as depicted in the form VC44 of FIG. 19B. In order to limit the negative voltage across (C44, 208), Mao placed a diode (D44, 210) as a clamp across (C44, 208). In the case when the diode (D44, 210) is placed across (C44, 208), the maximum voltage across (C44, 208) is V'Cinj, which is twice the input voltage reflected across the current injection winding 46.

The Mao's implementation of the active resonant tank possesses several drawbacks. One of the drawbacks is that the amplitude of the resonant current cannot be controlled with the phase shift between VcSinj and VcM1 (which, as a person of skill immediately appreciates, is absolutely necessary for optimization of the current injection in many topologies including the flyback topology). In addition to this shortcoming, due to the operational resonance between the (C44, 208) and (Lr, 271) the voltage across (C44, 208) varies significantly and, as a result, the amplitude of the resonant current through (Lr, 271) makes it practically difficult to optimize the energy circulation based on the energy level in (Ceq, 20). The amount of energy circulating through the active resonant tank is high as compared with the amount of energy required to discharge the parasitic capacitance Ceq, thereby negatively impacting the efficiency of the circuit. In the case when the value of (Ceq, 20) is large, the energy in the tank may end up being insufficient to ensure full discharge of (Ceq, 20).

The present embodiment differs from the Mao solution in several aspects, which substantially eliminate the drawbacks of the Mayo circuitry.

Figure 18:
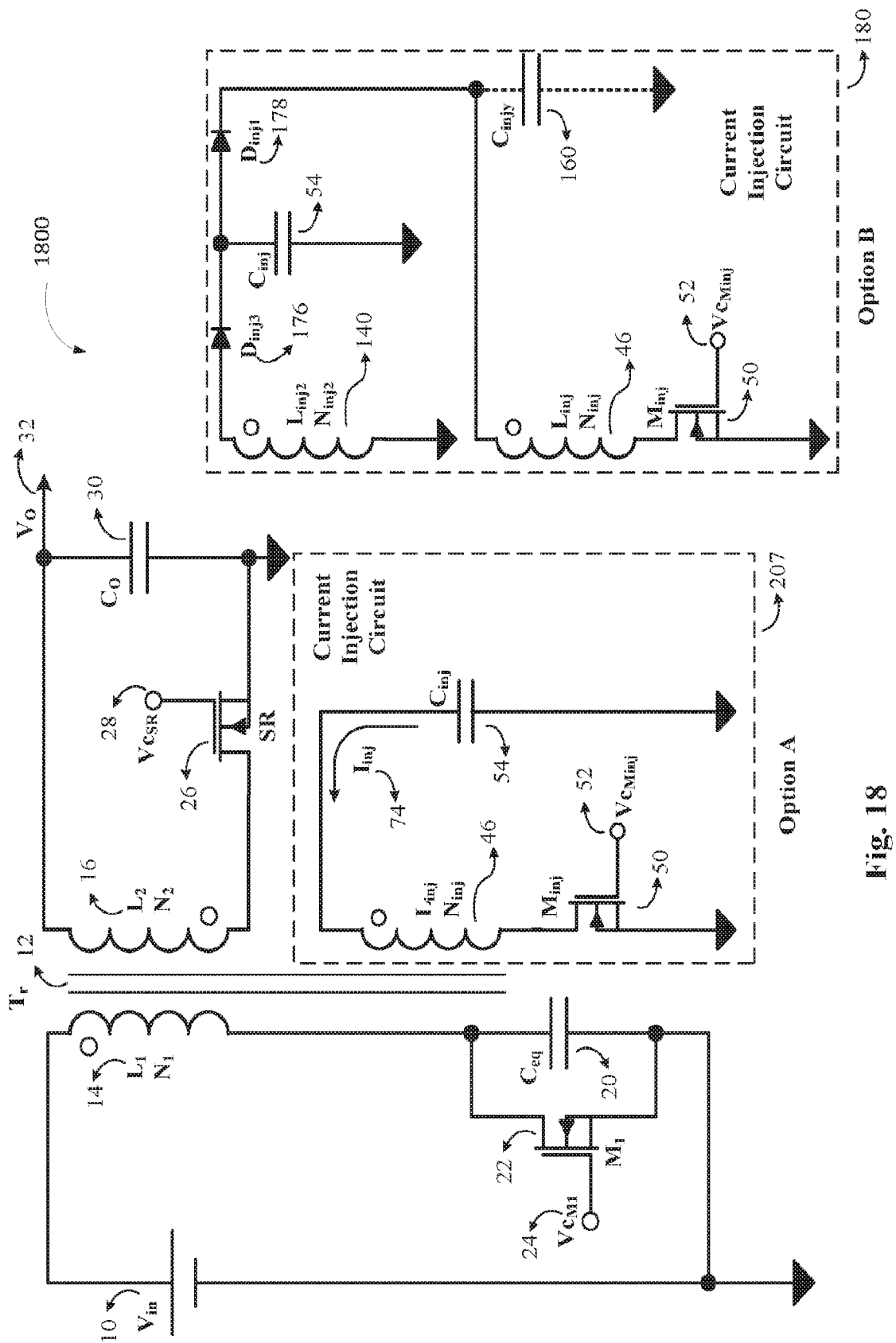
FIG. 18 illustrates an embodiment of a flyback topology circuitry with a self-adjusting current injection circuit.

FIG. 18 presents such embodiment structured based on the flyback topology with alternative Options A and B for the current injection circuit. (Option A utilizes a current injection circuit 207. The current injection circuit 207 is formed by a current injection winding 46, a current injection switch (Minj, 50) controlled by a control signal (VcMinj, 52), and a current injection capacitor (Cinj, 54). Option B utilizes a current injection circuit 180.)

Figure 20:
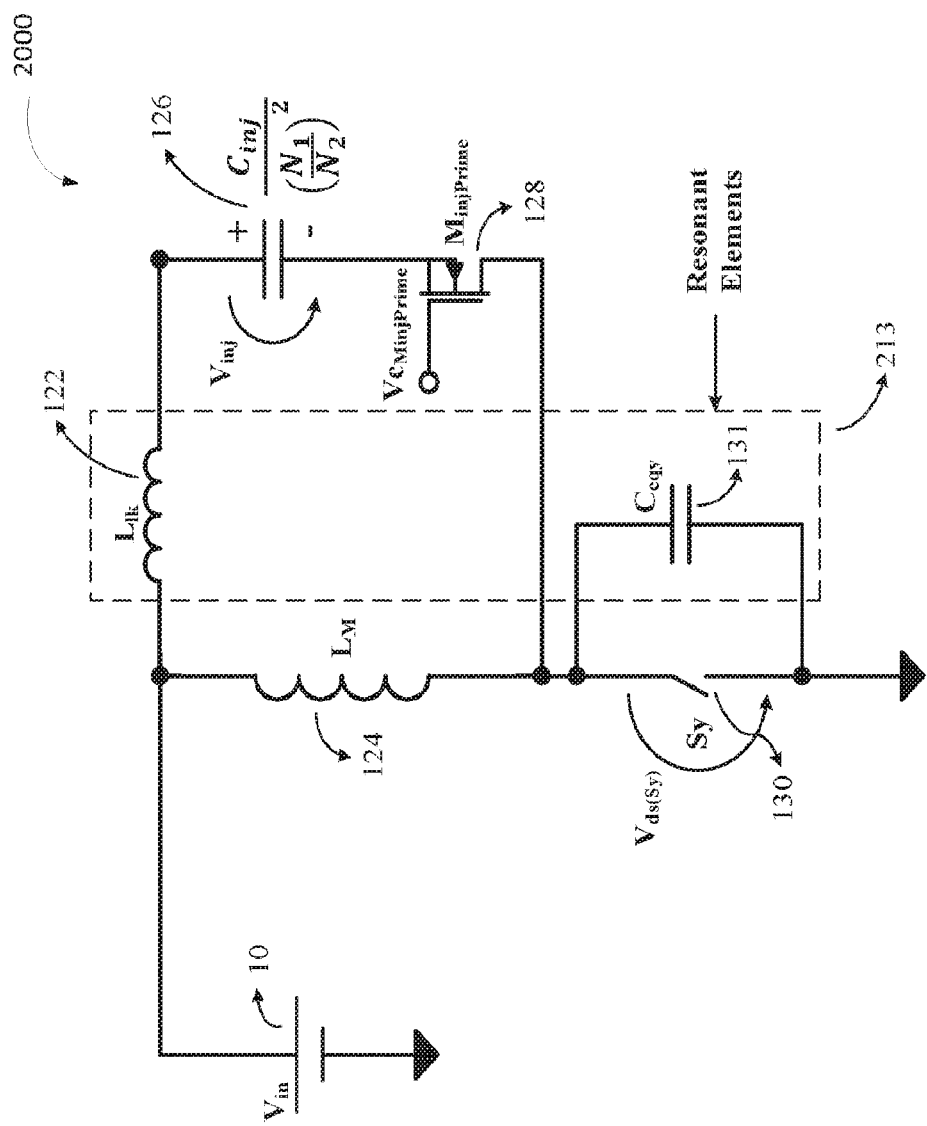
FIG. 20 depicts the equivalent schematic of the current injection circuit from FIG. 18.

In the present embodiment, the capacitance of the capacitor (Cinj, 54), from FIG. 18 is very large, configured to operate as a voltage source it's the voltage of which is substantially constant. Such configuration eliminates the resonant capacitor from the resonant circuit, keeping only (Ceq, 20) in the resonant circuit together with the leakage inductance between the current injection winding 46 and the primary winding 14. FIG. 20 presents the equivalent circuit of the present current injection circuit, when reflected into the primary. In FIG. 20, we identify the input voltage source (Vin,10), the switch (Sy, 130), the parasitic capacitance reflected across the switch (Ceqy, 131). The transformer is simplified into the magnetizing inductance (LM, 124) and the leakage inductance (Llk, 122) reflected into the primary. The current injection capacitor circuit reflected in the primary is 126, and the current injection Mosfet reflected in the primary is (Minj prime, 128). Because the Cinj, 54 is chosen to be very large, in operation it will behave more like a voltage source such as (Vin, 10) and it is charged to the same voltage. The resonant circuit is formed in this case just by the leakage inductance (Llk,122) and the parasitic capacitance reflected across the primary switch (Ceq, 20).

Figure 21:
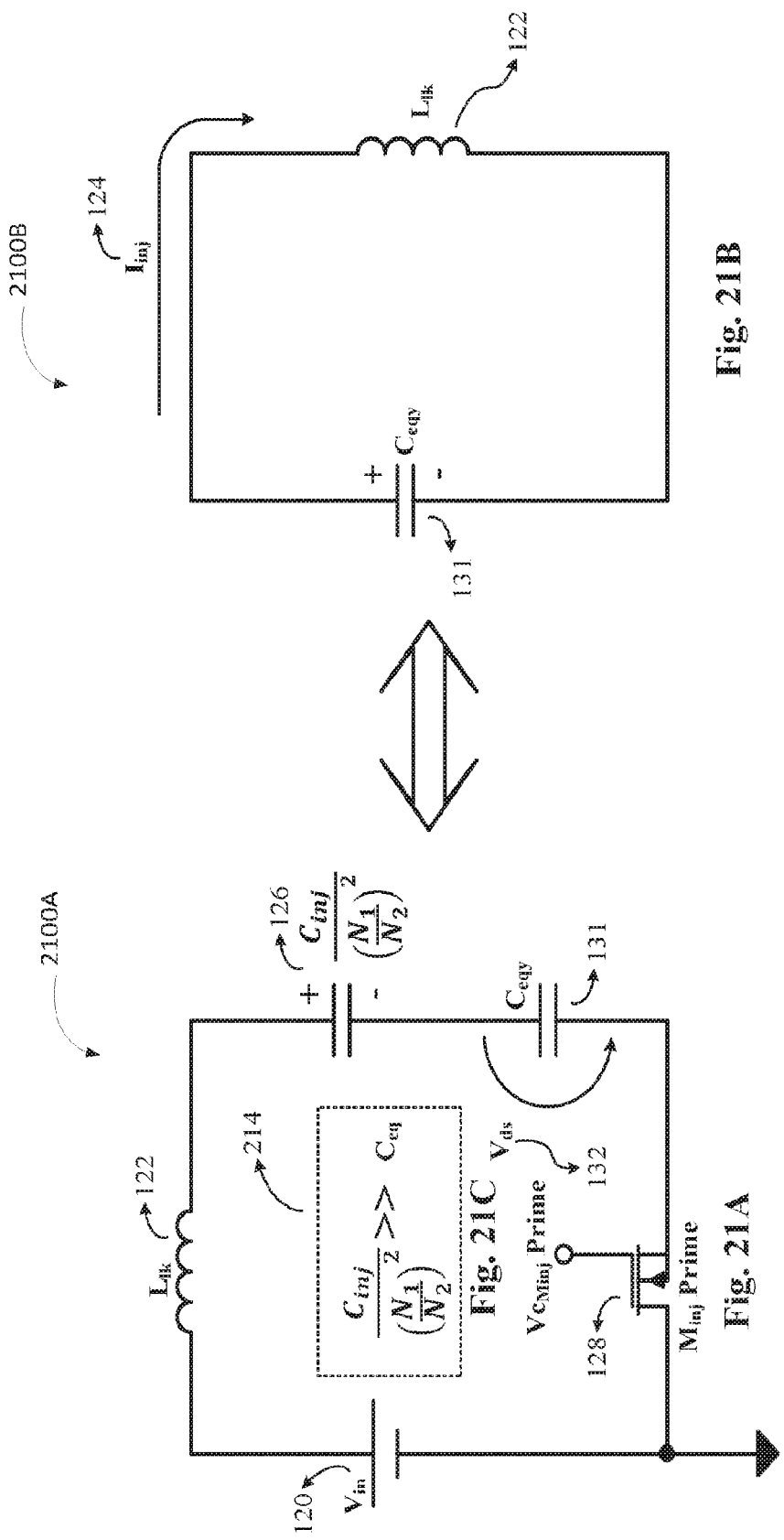
FIGS. 21A, 21B illustrate the equivalent schematic simplifications of the current injection from FIG. 18.

Because (LM, 124) has a much higher impedance than the circuit connected to it, one can effectively not count (eliminate) it, and the equivalent circuit 2000 of FIG. 20 then is further reduced to the circuit 2100A of FIG. 21A. The voltage across the (Cinj, 54), reflected into the primary, 126, has the same voltage across it as (Vin, 10). Since the value of the Cinj is chosen to be quite large, in practice there is no significant ripple present across it. When the current injection switch 128 is turned "on", the equivalent circuit 2100A is represented by the circuit 2100B of FIG. 21B. Because the voltage across the current injection capacitor reflected in the primary does not change (and has the same amplitude as Vin, 10), these two voltage sources effectively cancel each other. In the schematic 2100B of FIG. 21B we have a very simple circuit formed by the capacitor (Ceqy, 131) and the inductor (Llk, 122). When the current injection switch turns "on", these two elements—(Ceqy, 131) and (Llk, 122) will form a resonant circuit with initial conditions represented by the voltage across (Ceqy, 131). The capacitor (Ceqy, 131) will discharge in a resonant manner to zero.

Figure 22:
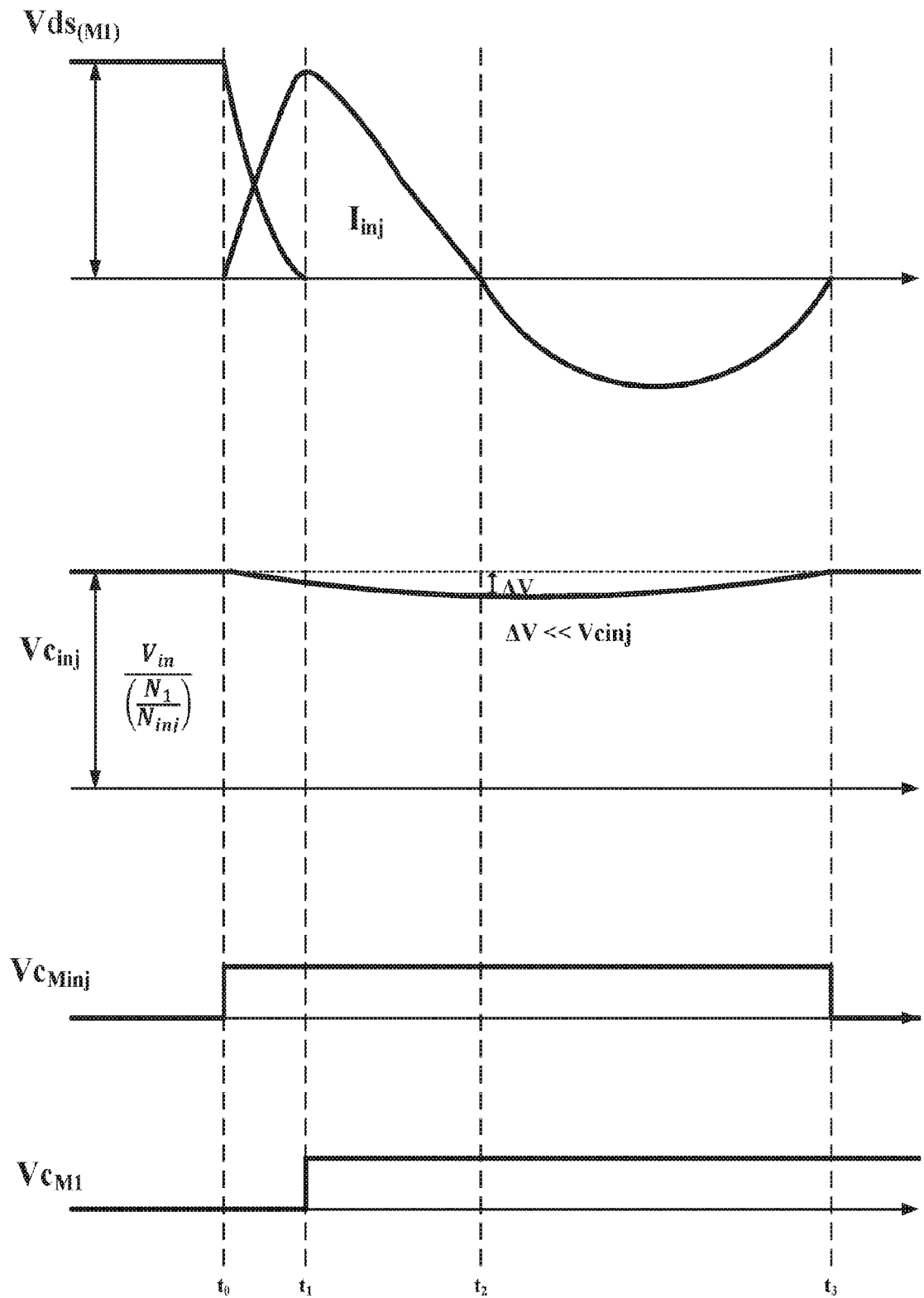
FIG. 22 provides plots illustrating the key waveforms of the circuit of FIG. 18 with self-adjusting current injection.

In FIG. 22 are presented the key waveforms of the circuitry of FIG. 18 using the present embodiment of the invention. The key waveforms are: i) VdsM1, which is the voltage across the main switch (M1, 22); ii) the current injection, Iinj, which flows through the current injection switch; iii) Vcinj, which is the voltage across the Cinj capacitor; iv) (VcMinj, 52), which is the control signal for the (Minj, 50), and v) VcM1, which is the control signal for the main switch M1, 22).

As shown, in operation the circuitry is characterized by self-adjusting current injection. At t0 the current injection switch Minj is turned "on". The current injection builds up almost linearly until the voltage across the main switch reaches zero. In the current injection circuit, the current injection self-adjusts because the current stops increasing when the voltage across (Ceq, 20) reaches zero. The amplitude of the injected current is proportional to the voltage across (Ceq, 20) at to.

The self-adjusting feature of the operation of the current injection circuitry of the embodiment 1800 is a major advantage over the Mao solution, which does not provide for such flexibility. In addition, the current injection of the 1800 circuitry can be also modulated by varying the phase shift between the control signal of the main switch and the control signal of the current injection switch. All these advantages are caused (result from) by effectively taking out (removing) the (Cinj, 54) from the resonant circuit—in comparison with the Mao circuit—by choosing the (Cinj, 50) to have a much larger capacitance value than that of (Ceq, 20). As a result, the (Cinj, 54) of the present embodiment is configured to operate as a voltage source. Furthermore, the voltage across (Cinj, 54) remains practically constant and its amplitude is equal to the input voltage divided by the ratio of turns of winding (the turn ratio) of the primary winding to those of the current injection winding. The slope of the current injection between the moments t0 and t1 is given by (associated with) the voltage across (Ceq, 20) at t0 and the value of the leakage inductance between the primary winding and the current injection winding. At the moment t1, when the voltage across the main switch is zero, the current injection stops increasing, and a recharge cycle begins. The recharge of (Cinj, 54) is carried out during the "on" time of (M1, 22)—that is, between the moments t2 and t3—in a quasi-resonant way through the leakage inductance between the primary winding and the current injection winding. The larger the value of Cinj, 54, the longer the recharge cycle. In some cases, the recharge cycle can extend over the entire time period during which the main switch is "on". At t2, the current injection reaches zero and that is the time when the voltage across (Cinj, 54) has the lowest amplitude. Here, ΔVinj across (Cinj, 54) is much smaller than the voltage across (Cinj, 54)—at least 5 times smaller in one embodiment. The current injection is self-adjusting and well controlled. This current injection can create zero voltage switching across the main switch both in continuous and discontinuous mode operation.

Figure 23:
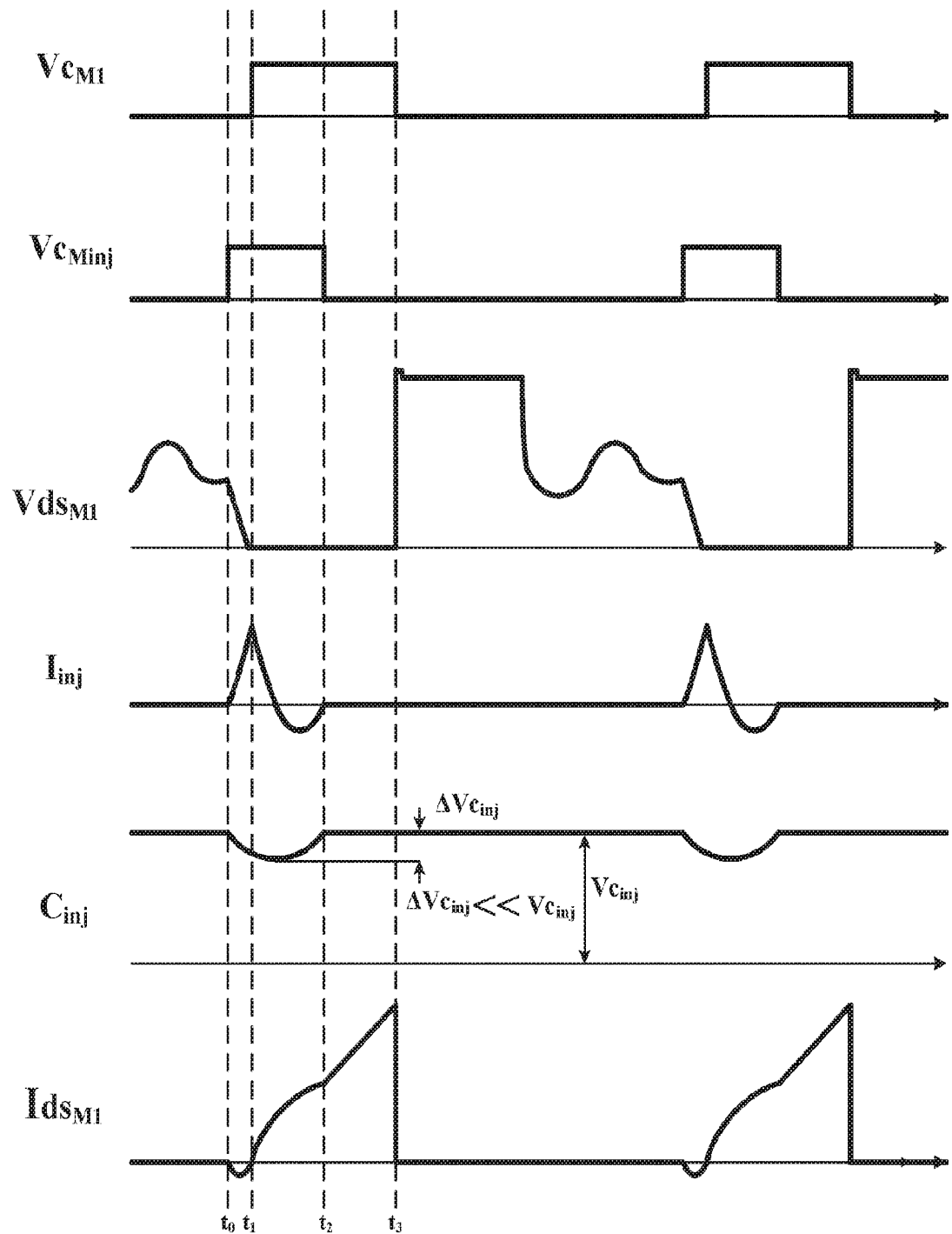
FIG. 23 presents the key waveforms of the flyback topology based circuitry from FIG. 18 using self-adjusting current injection and operating in a discontinuous mode and with current injection that is synchronized with the valley.

FIG. 23 illustrates the key waveforms of the flyback-topology-based circuitry of FIG. 18 that is configured to use self-adjusting current injection and operating in a discontinuous mode and with current injection that is synchronized with the valley.

The key waveforms are: 1) VcM1, the control signal for (M1, 22); 2) VcMinj, the control signal for (the Minj, 50) Mosfet; 3) VdsM1, the voltage across the main switch; 4) Iinj, the current injection flowing through the (Cinj, 54) and (Minj, 50); 5) VCinj, the voltage across the current injection capacitor Cinj; 6) IdsM, the current through the main switch (M1, 22).

At t0 the current injection switch (Minj, 50) is turned "on" and the current injection builds up almost linearly until the moment t1. The voltage across (Cinj, 54) decays slightly between the moments t0 and t1, but that decay is substantially smaller than the voltage across (Cinj, 54), VCinj. The current injection Iinj reflects in the primary flowing through the primary winding towards the input voltage source (Vin, 10). The current injection reflected in the primary is discharging the parasitic capacitance (Ceq, 20) towards zero between t0 to t1.

At t1, the voltage across (Ceq, 20) reaches zero. The injected current (from the current injection circuit) stops increasing at and after t1. At t1, the main switch (M1, 22) turns on at the zero voltage across this switch. Between t1 and t2, (Cinj, 54) is recharged in a quasi-resonant fashion via the leakage inductance between the current injection winding 46 and the primary winding 14. The (Minj, 50) Mosfet turns "off" at t2 at the end of the recharge cycle of (Cinj, 54). The (Minj, 50) can be turned "off" earlier, and the body diode will conduct until the Iinj current reaches zero. The recharge current also reflects in the primary, thereby adding to the current through the main switch (M1, 22), as can be seen by the "bump" over the triangularly-shaped current waveform IdsM1. As a person of skill will appreciate, in FIG. 23 there is a phase shift between VcM1 and VcMinj, which corresponds to the time difference between t1 and t2. In many applications the phase shift is constant and designed (for the not preferred case when the any of values of (Ceq, 54), (Vin, 10), and the leakage inductance between current injection winding, 46, and the primary winding 14 to be very high) in such way that the current injection can reach the amplitude necessary to discharge (Ceq, 20) to zero. If the input voltage is chosen to be low, or the capacitance of (Ceq, 20) is small, the (Ceq, 20) will discharge to the zero level sometime between the moments t0 and t1, and the peak of the injected current will be reduced, thereby self-adjusting.

Figure 24:
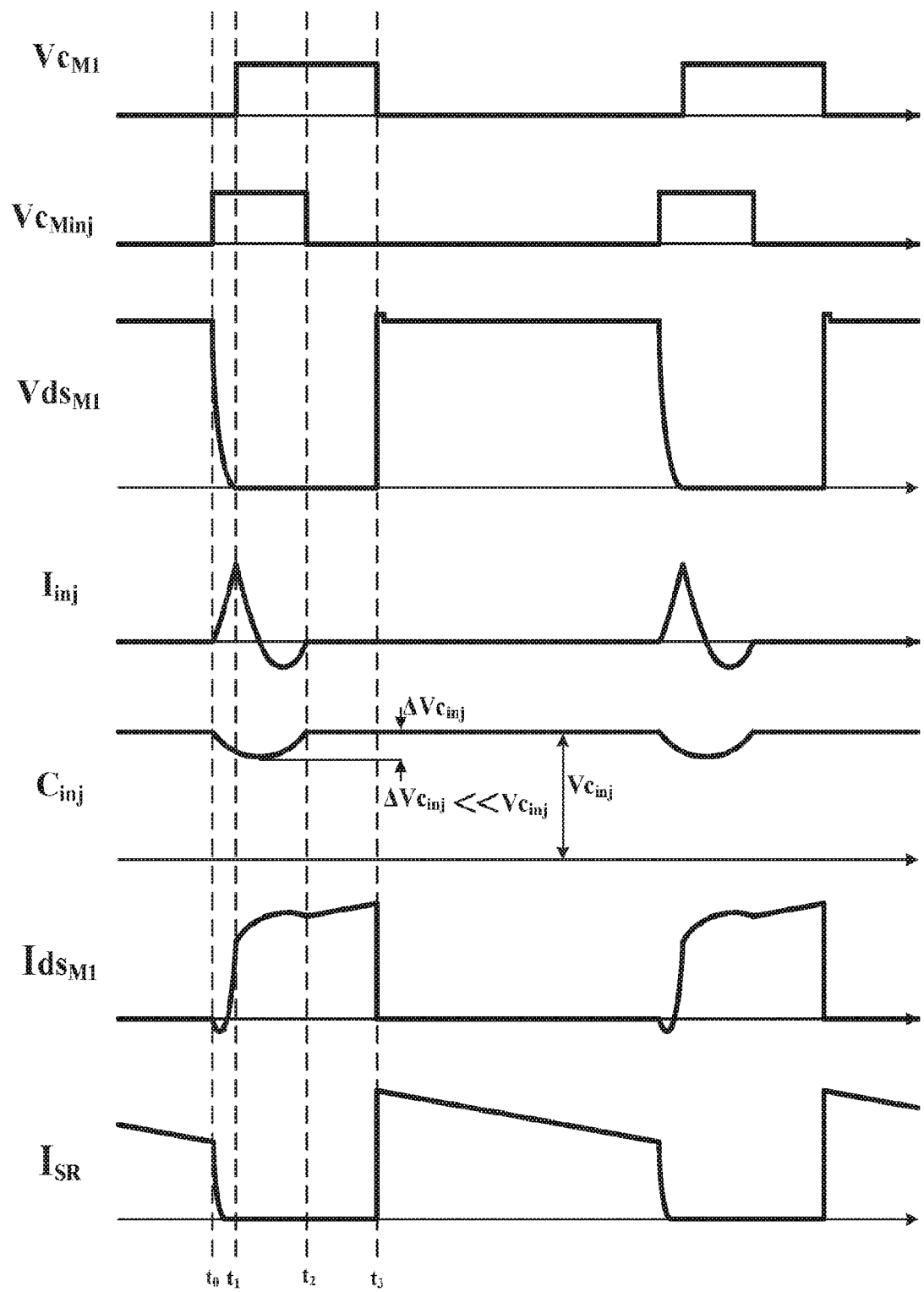
FIG. 24 illustrates the key waveforms of the flyback topology based circuitry from FIG. 18 using self-adjusting current injection and operating in a continuous mode.

FIG. 24 illustrates the key waveforms of the circuit 1800 as functions of time of operation when the flyback operates in a continuous mode. The key waveforms are: a) VcM1, which is the control signal for (M1, 22); b) VcMinj, the control signal for the (Minj, 50) Mosfet; c) VdsM1, the voltage across the main switch; d) Iinj, the current injection flowing through (Cinj, 54) and (Minj, 50); e) VCinj, the voltage across the current injection capacitor; f) IdsM1, the current through the main switch (M1, 22); and g) $I_{SR}$, the current through the synchronized rectifier 26.

As shown, at t0, the current injection switch (Minj, 50) is turned "on" and the current injection builds up almost linearly until t1. The voltage across (Cinj, 54) slightly decays between t0 and t1, but the value of such decay is much smaller than the voltage across (Cinj, 54), VCinj. The injected current Iinj reflects in the secondary winding 16, and at the moment when the amplitude of this current is the same as that of the current flowing through the SR, the SR turns "off" at zero current and further the injected current continues to flow into the primary winding 14, thereby discharging the parasitic capacitance (Ceq, 20) towards zero.

At t1, the voltage across (Ceq, 20) reaches zero. The injected current stops increasing and, after t1, the recharge of (Cinj, 54) cycle starts. At t1 the main switch (M1, 22) turns "on" at zero voltage across the main switch. Between the moments t1 and t2, (Cinj, 54) is recharged in a quasi-resonant fashion via the leakage inductance formed between the current injection winding 46 and the primary winding 14. The Cinj is actually being charged from the time when Iinj reaches zero until the moment t2. The cycle of reversing the current flow starts at t1 when the Iinj reaches its peak value. The (Minj, 50) turns "off" at t2 at the end of the recharge cycle for (Cinj, 54). The (Minj, 50) can turn "off" earlier and the body diode in this case will conduct until the Iinj current reaches zero. The recharge current also reflects in the primary adding to the current through the main switch (M1, 22), as indicated in the waveform IdsM1 by the "bump" over the trapezoidally shaped current. As a person of skill will readily appreciate, in FIG. 24 there is present a phase shift between VcM1 and VcMinj waveforms, which is represented by the time difference between t1 and t2. In many applications the phase shift is constant and designed (for the worst case scenario when the any of values of (Ceq, 54), (Vin, 10), and the leakage inductance between current injection winding, 46, and the primary winding 14 to be very high) such that the injected current can reach the amplitude necessary to discharge (Ceq, 20) to zero. If the input voltage is lower and the (Ceq, 20) is smaller than those in such hypothetical worst-case scenario, the capacitor (Ceq, 20) will discharge to zero sometime between t0 and t1, and the peak value of the injected current will be smaller. In the transition between a discontinuous mode of operation and a continuous mode of operation, the phase shift between VcM1 and VcMinj may be appropriately changed to ensure zero voltage switching conditions on the main switch. A person of skill will immediately recognize that the feature of controlling the current injection amplitude by varying such phase shift provides clear operational advantages over the embodiments of the related art—such as the Mao circuitry, for example.

As discussed above, an embodiment of this invention is configured to eliminates all the operational drawbacks of the Mao circuitry and adds clear benefits such as self-adjustment of the peak current, function of the voltage across the main switch at "turn on", and the capability to control the peak current through the phase shift between the moment of the "turn on" of the current injection switch and the moment of the "turn on" of the main switch. One may consider a possible limitation associated with this embodiment of the invention that manifests in a large recharge time of the current injection capacitor (Cinj, 54). This is due to the high value of the capacitance of the current injection capacitor, necessary to make the current injection process to produce/realize the above-discussed operational advantages. One solution to compensate for such limitation is to recharge the current injection capacitor from another, auxiliary source rather than through the current injection switch (Minj, 50) in a quasi-resonant mode.

Referring now to the implementation of the embodiment 1800 with Option B (see again FIG. 18), the current injection capacitor (Cinj, 50) is charged through a diode (Dinj3, 176) from an additional winding 140. A blocking diode (Dinj1, 178) is additionally disposed in between the current injection capacitor and the current injection winding 46. As a result, the charge of the capacitor (Cinj, 54) is effectuated only through the auxiliary winding 140. In addition to the current injection capacitor (Cinj, 540, in some applications another capacitor (Cinjy, 160) can be added and used. The value of the capacitance of the Cinjy should be at least an order of magnitude smaller than the capacitance value of (Cinj, 54). The operational role of Cinjy is not to deliver main portion of energy to discharge Ceq (which main portion should come from Cinj), but just to shape the injected current passing through (Minj, 50) in a way that the current through the winding 46 becomes zero or even turns negative at the time when (Minj, 50) turns "off". Adjustment of the turn ratio between the windings 46 and 140 will allow the designer to control the shape of the injected current substantially as desired in order to optimize the efficiency of the power converter that utilizes the discussed circuitry and methodology of operation.

The current injection circuit depicted in FIG. 18 (Option B) is similar to the current injection circuit of FIG. 16C. The difference between the two, however, stems from the fact that the capacitor ($C_A$, 294) of FIG. 16C is charged in a flyback mode rather than in a forward mode as in FIG. 18, Option B. In some applications the optimization of the operation may require the number of turns in the winding 140, Ninj2, to be half of the number of turns in the winding 46, Ninj.

In practice, the current injection capacitor can be charged in various ways in order to achieve certain goals, and the specific fashion of charging the current injection capacitor that does not change the scope of the invention. For example, in reference to FIG. 14A, the current injection capacitor, which delivers most of the energy for current injection, takes its energy from the leakage inductance energy between primary winding 14 and secondary winding 16 of the transformer (Tr, 12).

Notably, when the Option B of the circuit 1800 is chosen, the energy necessary for current injection is delivered through the winding 140 via the diode (Dinj3, 176). There is another diode (Dinj1, 178) in series with the current injection winding 46.

If Ninj2>Ninj1, the diode Dinj1 can be eliminated. In this case, the operation will be similar to that of the circuit 1600A described in reference to FIG. 16A.

When the additional diode (Dinj1, 178) is present, the current through (Minj, 50) is half sinusoidal without the recharging section, as presented in Option A of FIG. 18. The charging cycle is carried out via the winding 140 and diode 176. Implementation of this concept offers the operational advantage if and when several current injection circuits are used (each formed by a diode, current injection winding, and current injection switch) and the operations of these circuits are phase-shifted to shape the total current injection as required (for example, to assume a form similar to a rectangular shape). In addition, the implementation of this concept allows the user to tailor the turn ratio for 140 and 46 winding to optimize the operation as needed.

The use of Option B in the embodiment 1800 provides the designer with a very high degree of operational flexibility. Overall, the embodiment(s) of FIG. 18 disclose a current injection circuit, in a flyback-topology-based converter, that, in operation, self-adjusts the current injection amplitude to the level necessary to obtain zero voltage switching conditions across the main switch. Preferably, the current injection capacitor is charged in a quasi-resonant way at the time during which the main switch (M1, 22), conducts or—alternatively—this capacitor can also be charged in quasi-resonant way via an auxiliary winding such as the winding 140. Notably, it is not required for the operation of the embodiment that the coupling between the charging winding 140 and the primary winding 14 be very good. In some applications, the coupling between the windings 140 and 14 can be intentionally made poor in order i) to increase the leakage inductance between the charging winding and the primary winding and ii) to decrease the peak value of the charging current. In some applications, fractional (not complete) turns can be used for when structuring the charging winding 140 to optimize the Option B from FIG. 18 for better efficiency and better operation over a large range of operation conditions. As previously mentioned, the leakage inductance between windings 46 and 14 must be low but the leakage inductance between 140 and 14 can be higher (which is preferred in many applications). to optimize the operation of the current injection circuit. When using Option B, the overall circuit of FIG. 18 is somewhat more complex as compared with the use of Option A.

While the above-described current injection methodologies of enhancing the operation of the AC-DC converter were described with the example of being used in either a discontinuous mode flyback topology or a continuous mode flyback topology, these methodologies are clearly applicable to the boost topology, the buck topology, and other topologies and, as a result of self-adjusting the amplitude of the injected current, the disclosed current injection methodologies create zero voltage switching conditions for the main switch under substantially any operating circumstances when used with these topologies.

Additional Examples: Utilization of Various Embodiments of the Invention in Electronic Circuits Based on Other Topologies and in Different Applications (Such as Power Factor Correction Circuits, PFC).

Additional embodiments configured to implement the idea of the invention to harvest and/or use energy from the parasitic elements of electronic circuitry of a power converter are discussed now in reference to FIGS. 25A, 25B, 26A, 26B, and 26C.

Figure 25A:
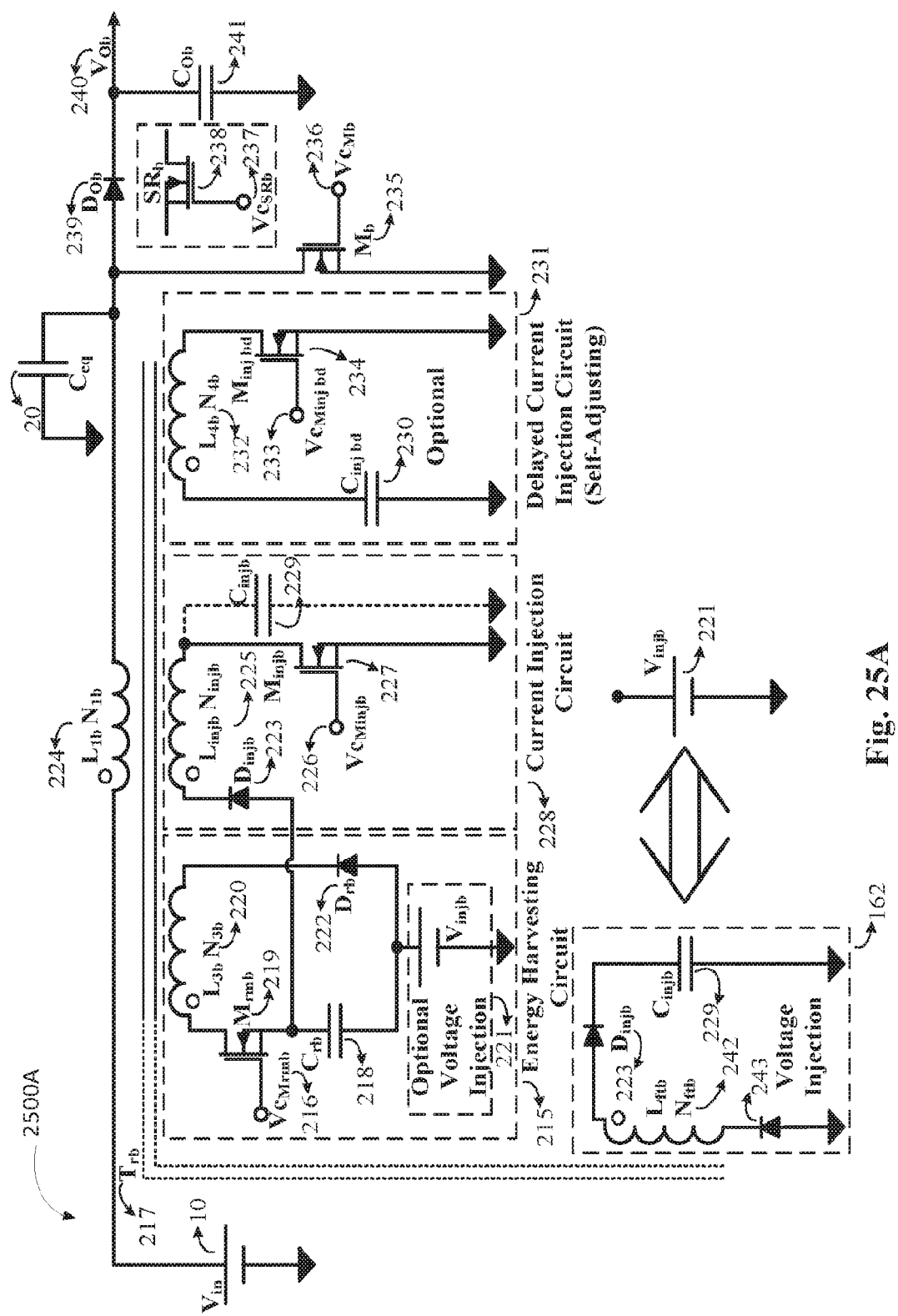
FIG. 25A is a schematic of a boost topology based electronic circuitry configured to utilize several of embodiments of the invention.

FIG. 25A schematically illustrates an electronic circuitry configured according to the boost topology (the boost converter, 2500A). FIG. 25 presents the "compound" view, in which portions of the circuitry 2500A corresponding to several embodiments of the invention are shown simultaneously and inside corresponding dashed-line rectangles and, as a person of skill in the art will understand, such schematic representation (in this of any other Figure) implies the related but alternative use of such portions of the circuitry. There is an energy harvesting circuit 215, configured to harvest the energy from the parasitic oscillation during the dead time period of operation of the converter. The use of the current injection circuit 228 makes it possible to provide current-injection energy from the first energy that was harvested and stored in (Crb,218) and from additional energy associated with (Cinjb, 229), if necessary. To provide for more operational flexibility, the energy harvesting circuit employs a voltage injection technology (see Vinjb), which allows the user to control the level of the second-order parasitic oscillation after most of the energy is already harvested from the parasitic oscillation. The schematic of FIG. 25A also illustrates a simple way of deriving the voltage-injection sources from the transformer 217, preferably engaging fractional (incomplete) turns of a winding to increase the leakage inductance between the voltage injection winding 242 and the primary winding 224. As a skilled artisan readily appreciates, the circuit depicted in FIG. 25A also employs the methodology of self-adjusting current injection discussed above (see portion 231 of the overall circuitry). The use of self-adjusting current injection is preferable in the situation when the boost converter 2500A is used to operate in a continuous mode and zero voltage switch conditions for the main switch (Mb, 235) are necessary.

Figure 25B:
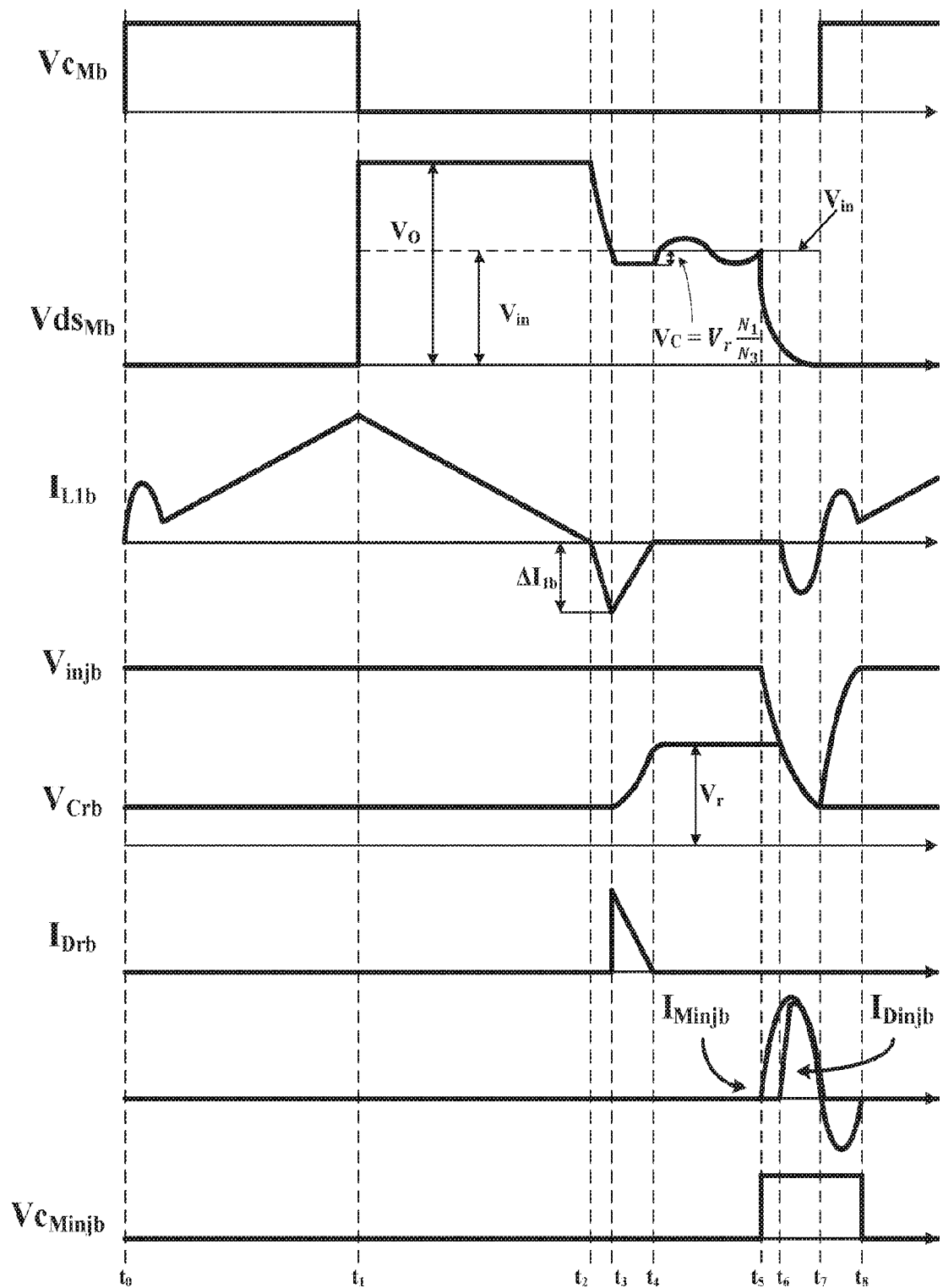
FIG. 25B depicts the key waveforms of operation of the embodiment of the circuit of FIG. 25A.

The key waveforms of the circuit 2500A are depicted in FIG. 25B, as functions of time of operation The key waveforms are: a) VcMb, which is the control signal for the main switch (Mb, 235); VdsMb which is the voltage across the main switch Mb, 235; The current through the primary winding, $IL1b$, of the transformer Trb, 217; The voltage across Vinjb capacitor and the voltage across Crb, 218, which is the energy harvesting capacitor; the current through Drb, 222; the current through Dinjb, 223, and Minjb, 227, and the control signal for VCMinjb, 226.

Between t0 and t1, the main switch (Mb, 235) is conducting and the current is building up through the primary winding of the transformer (Trb, 217). At t1 the main switch (Mb, 235) turns "off". The current through the primary of (Trb, 217) continues to flow via (DOb, 239) to the output, (Vob, 240). In an alternative implementation, the diode (DOb, 239) can be replaced by a synchronous rectifier such as (SRb, 238). From time t1 to time t2, energy is stored in the transformer (Trb, 217) is fully transferred to the output. At t2, the resonant circuit formed by the inductance of the primary winding 224 and the parasitic capacitance (Ceq, 20) starts oscillating and the voltage across (Mb, 235) starts decaying in a resonant manner until this voltage reaches the level of the input voltage (Vin, 10). Between t2 and t3, the energy stored in the (Ceq, 20) at t2 versus (Vin, 10) is being converted into magnetic energy through the magnetizing current. The current in the primary winding 224 reaches its negative peak level of $\Delta I1b$ at t3. Between the moments t3 and t4, the magnetic energy is harvested by the energy-harvesting circuit 215. The magnetizing current energy is transferred to the capacitor (Crb, 218). Between the moments t4 and t5, the energy harvested from the parasitic oscillation is stored in (Crb, 218) substantially without any dissipation during this time interval. At t5, the (Minjb, 227) switch is turned "on". The injected current (provided by the current injection circuit) starts to build up as depicted in FIG. 25B by the waveform IMinjb, and the energy is delivered by the capacitor (Cinjb, 229). The voltage across (Cinjb, 229) is decreasing until t6, at which moment the voltage across (Cinjb, 229) reaches the voltage level corresponding to the voltage level across (Crb, 218). By design, Crb>Cinjb. After the moment t6, the energy for the current injection is acquired from both capacitors (Cinjb, 229) and (Crb, 218). At t7, the injected current reaches zero. The current injection reflects into the primary winding 224 of the transformer (Tr, 217), as depicted in FIG. 25B by the waveform $IL1b$. The injected current reflected in the primary will discharge the parasitic capacitance (Ceq, 20) towards zero during the time window from t5 to t7. By design, the values of (Crb, 218), (Cinj, 54), and the voltage injection Vinjb are chosen to ensure that the parasitic capacitor (Ceq, 20), is fully discharged to zero before t7. Between t7 and t8, the (Cinjb, 229) capacitor recharges (is being recharged) in a quasi-resonant way from the input voltage (Vin, 10) through the leakage inductance formed between the current injection winding 225 and the primary winding 224. The main switch (Mb, 235) is turned "on" at t7 under zero voltage switching conditions.

In the boost topology of FIG. 25A, both circuits (the energy harvesting circuit 215 and the current injection circuit 228) are employed in order to harvest energy from the parasitic ringing (discussed above) and to acquire additional energy from the capacitor (Cinjb, 229), which is charged during the conduction time of the main switch (Mb, 235).

Figure 26A:
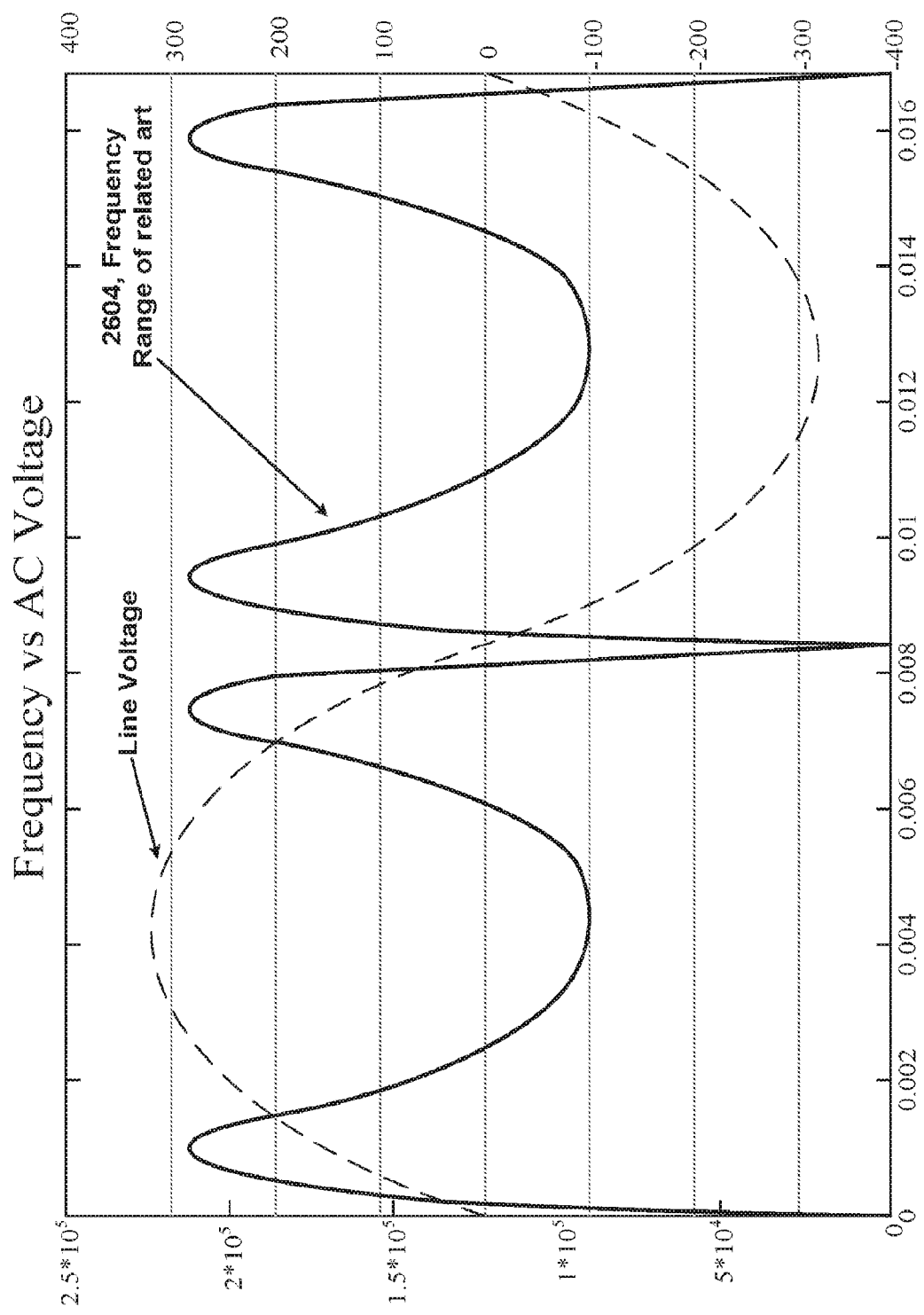
FIG. 26A depicts the line voltage and the frequency variation of a ZVS critical conduction PFC of related art.
Figure 26C:
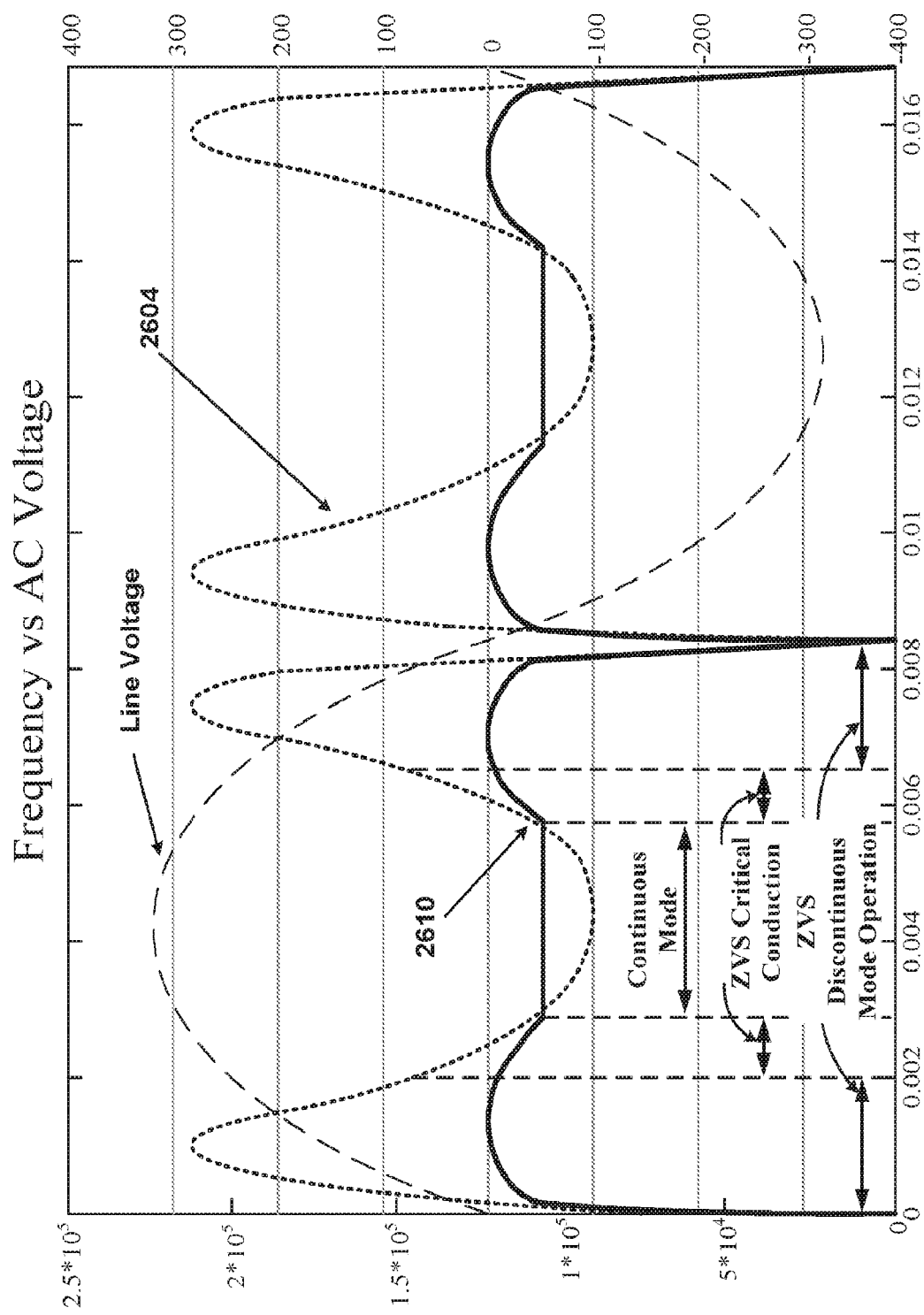
FIG. 26C depicts the line voltage and the frequency variation in a PFC utilizing some other embodiments of this invention.

A skilled artisan will appreciate that the use of the disclosed embodiment will be advantageous in power factor correction (PFC) circuits. The plots of FIG. 26A illustrate the input AC line at the input of a power factor correction circuit and the frequency operation range. In order to operate the boost-topology-based circuitry at zero voltage switching (ZVS) for higher efficiency, the boost topology is configured to operate in a critical conduction mode. Alternatively or in addition, by allowing a negative current (referred to as push back current) through the power switches the zero voltage switching can be achieve in substantially any operating mode. When operating in a critical conduction mode, the frequency of operation (illustrated with the curve 2604) varies in a very large range, as shown in FIG. 26A. This presents a major drawback of the zero-voltage switching critical conduction technology utilized today. Presently, the bridgeless totem pole, critical conduction mode operation is very popular in power factor correction applications due to zero voltage switching on all the switching elements under all operation conditions. The large frequency swings, however, limits the ability to optimize the electromagnetic interference (EMI) filter, leads to structural complexity, and limits the power-processing efficiency. In contradistinction, FIG. 26B illustrates the AC line voltage and the frequency range of operation characterizing a power factor correction application with the use of a boost topology based circuitry configured according to embodiment(s) of the invention. Using the embodiments of this invention, the frequency range (represented by the solid line 2610) can be limited. For example, as the person of skill will recognize, the boost converter can operate in a critical conduction mode just when the input line has the largest amplitude, when most of power is processed and at lower amplitude of the AC line voltage; the boost converter can operate at zero voltage switch conditions at lower frequency; in a discontinuous mode by increasing the dead time, and all the energy contained in the parasitic oscillation can be harvested as described in reference to the disclosed embodiments. FIG. 26C illustrates presents yet another related solution for the power factor correction, which offers also a higher power density and that by operating at ZVS in a continuous mode using the current injection method and when the amplitude of the line voltage is lower the operation is done at zero voltage switching critical conduction mode and zero voltage switching discontinuous mode. Decreasing the frequency range operation of the boost-topology-based converter increases the overall efficiency, reduces the size of the boost converter and also decreases the size of the EMI filter.

The embodiments of this invention allow significant improvements in many applications such as flyback and boost topology with application in power factor correction.

To effectuate the operation of an embodiment of the invention, the judicious use of a processor controlled by application-specific instructions stored in a tangible memory element may be required. Those skilled in the art should readily appreciate that required algorithmical functions, operations, and decisions may be implemented as computer program instructions, software, hardware, firmware or combinations thereof. Those skilled in the art should also readily appreciate that instructions or programs defining the functions and elements of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Within this specification, embodiments have been described in a way that enables a clear and concise specification to be written, but it is intended and will be appreciated that embodiments may be variously combined or separated without parting from the scope of the invention. In particular, it will be appreciated that each of the features described herein is applicable to most if not all aspects of the invention.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The term substantially equivalent is used in the same fashion.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s). In addition, the terminology used herein is with the purpose of describing particular embodiments only, and is not intended to limit the scope of the present invention.

The invention claimed is:

1. An electronic circuitry having primary and secondary sides and comprising:
   a power converter including
      an input voltage source,
      a transformer having primary and secondary windings, on the primary and secondary sides, respectively,
      a combination of a main switch in parallel with a main switch capacitor, the combination being in series with the primary winding on the primary side, and
      a synchronous rectifier in series with the secondary winding on the secondary side,
   and
   a first electronic circuit having
      a first auxiliary winding on the secondary side of the transformer in series with and between a first diode and a first terminal of a first switch,
      a first capacitor connected between a second terminal of the first switch and a ground; and
      a current source circuitry disposed in parallel with the first capacitor and connected directly to the second terminal of the first switch,
   wherein the first electronic circuit is configured to store energy from parasitic oscillations, occurring across the main switch during dead time of operation of the power converter, in the first capacitor, thereby attenuating said parasitic oscillation without substantial dissipation of the energy from the parasitic oscillations.

2. The circuitry according to claim 1, configured according to any of flyback topology, boost topology, and buck topology.

3. The circuitry according to claim 1,
   the current source circuitry includes a second diode in series with an injection winding and an injection switch, the injection switch disposed between the injection winding and the ground, the injection winding being on the secondary side,
   wherein the main switch has a first level of voltage across the main switch at a time when the main switch is turned on.

4. The circuitry according to claim 3, further comprising an injection capacitor disposed between a point, which is electrically common for the injection winding and the second diode, and the ground to define, in operation of the electronic circuitry, a second level of voltage to which the main switch capacitor is discharged, the second level of voltage being lower than a third level of voltage to which the main switch capacitor is discharged in absence of the injection capacitor.

5. The circuitry according to claim 4,
wherein a capacitance of the injection capacitor is defined such that a sum of a first energy and a second energy is sufficient to discharge, in the operation of the electronic circuitry, the main switch capacitor while creating a zero-voltage switching condition for the main switch,
wherein the first energy is energy contained in the injection capacitor and the second energy is the energy from the parasitic oscillations stored in the first capacitor.

6. The circuitry according to claim 5, wherein, in the operation of the electronic circuitry, the first energy has been stored in the injection capacitor during a period of conduction of the main switch.

7. The circuitry according to claim 4, configured to define a fourth level of voltage across the main switch at the time when the main switch is turned on, the fourth level of voltage being lower that the first level of voltage.

8. The circuitry according to claim 1, wherein the first electronic circuit is configured as a current injection circuit to deliver current through a winding on the secondary side to discharge a parasitic capacitance of the main switch capacitor reflected across the main switch.

9. A method for operating an electronic circuitry that has primary and secondary sides and that comprises
a power converter including
an input voltage source,
a transformer having primary and secondary windings, on the primary and secondary sides, respectively,
a combination of a main switch in parallel with a main switch capacitor, the combination being in series with the primary winding on the primary side, and
a synchronous rectifier in series with the secondary winding on the secondary side,
and
a first electronic circuit having
a first auxiliary winding on the secondary side of the transformer in series with and between a first diode and a first terminal of a first switch,
a first capacitor connected between a second terminal of the first switch and a ground; and
a current source circuitry disposed in parallel with the first capacitor and connected directly to the second terminal of the first switch,
the method including:
turning the main switch on to store energy in the transformer via a magnetizing current in the primary side, wherein the main switch has a first level of voltage across the main switch at a time when the main switch is turned on;
switching the synchronous rectifier off at a moment of time when a magnetizing current, transferred to the secondary winding as a result of having the main switch turned off, reaches a zero level to charge a parasitic capacitance reflected across the main switch with a first voltage;
passing a magnetizing current through the transformer to the first capacitor to store energy from parasitic oscillations, occurring across the main switch during dead time of operation of the power converter, in the first electronic circuit; and discharging the first capacitor through the current source circuitry to inject current into a winding on the secondary side.

10. The method according to claim 9, wherein the first voltage depends on a ratio of a number of winding turns in the primary winding to a number of turns in the secondary winding.

11. The method according to claim 9, wherein the electronic circuitry further includes an injection capacitor disposed between a point, which is electrically common for the injection winding and the second diode, and the ground, and further comprising
discharging the injection capacitor to define, in operation of the electronic circuitry, a second level of voltage to which the main switch capacitor is discharged, the second level of voltage being lower than a third level of voltage to which the main switch capacitor is discharged in absence of the injection capacitor.

12. The method according to claim 11, wherein a capacitance of the first capacitor is larger than a capacitance of the injection capacitor.

13. The method according to claim 11, wherein a capacitance of the injection capacitor is defined such that a sum of a first energy and a second energy is sufficient to discharge, in the operation of the electronic circuitry, the main switch capacitor while creating a zero-voltage switching condition for the main switch,
wherein the first energy is energy contained in the injection capacitor and the second energy is the energy from the parasitic oscillations stored in the first capacitor.

14. The method according to claim 9, wherein the discharging the first capacitor includes discharging the first capacitor through the current source circuitry configured as a current-injection circuit and including a second diode in series with an injection winding and an injection switch, wherein the injection switch is disposed between the injection winding and the ground, the injection winding being on the secondary side.

15. The method according to claim 9, wherein said passing the magnetizing current includes storing the energy from the parasitic oscillations in the first capacitor.

16. An electronic circuitry having primary and secondary sides and comprising:
a power converter including
an input voltage source,
a transformer having primary and secondary windings, on the primary and secondary sides, respectively,
a combination of a main switch in parallel with a main switch capacitor, the combination being in series with the primary winding on the primary side, and
a synchronous rectifier in series with the secondary winding on the secondary side,
an active clamp circuit across the main switch, the active clamp circuit containing a clamp switch and the clamp capacitor in series with the clamp switch; and
a first electronic circuit having
a first auxiliary winding on the secondary side of the transformer in series with and between a first diode and a first terminal of a first switch,
a first capacitor connected between a second terminal of the first switch and a ground; and
a current source circuitry disposed in parallel with the first capacitor and connected directly to the second terminal of the first switch,
wherein the first electronic circuit is configured to store energy from parasitic oscillations, occurring across the main switch during dead time of operation of the power converter, in the first capacitor, thereby attenuating said parasitic oscillation without substantial dissipation of the energy from the parasitic oscillations.

17. The electronic circuitry according to claim 16, wherein the active clamp circuit includes a combination of two clamp diodes, and
wherein the current source circuit is configured as a current-injection circuit and includes
- a second diode in series with an injection winding and an auxiliary winding, each of the injection and auxiliary windings being at the secondary side;
- an injection switch disposed between the injection winding and the ground,
- an injection capacitor in series with and between the injection winding and the ground; and
- a third diode disposed between a point common to the injection winding and the injection capacitor and a terminal of a clamp diode from the combination of the two clamp diodes.

18. The electronic circuitry according to claim 17, further comprising an auxiliary capacitor between the terminal of the clamp diode, from the combination of the two clamp diodes, and the ground.

19. The electronic circuitry according to claim 16, wherein the clamp switch is configured to be turned on at a moment of time after the main switch is turned off.

20. The electronic circuitry according to claim 16, wherein the clamp switch is configured to be turned off at a moment of time prior to the moment of time at which current passing through the secondary winding reaches a zero level.

21. The circuitry according to claim 16, configured according to any of flyback topology, boost topology, and buck topology.

22. A method for operating an electronic circuitry having primary and secondary sides and including
a power converter including
  an input voltage source,
  a transformer having primary and secondary windings, on the primary and secondary sides, respectively,
  a combination of a main switch in parallel with a main switch capacitor, the combination being in series with the primary winding on the primary side, and
  a synchronous rectifier in series with the secondary winding on the secondary side,
an active clamp circuit across the main switch, the active clamp circuit containing a clamp switch and the clamp capacitor in series with the clamp switch, and
a first electronic circuit having
  a first auxiliary winding on the secondary side of the transformer in series with and between a first diode and a first terminal of a first switch,
  a first capacitor connected between a second terminal of the first switch and a ground; and
  a current source circuitry disposed in parallel with the first capacitor and connected directly to the second terminal of the first switch,
the method comprising:
  increasing an amplitude of a magnetizing current of the transformer while the main switch is turned on;
  transferring leakage inductance energy of the transformer to an auxiliary capacitor on the secondary side;
  storing energy from parasitic oscillations, occurring across the main switch during dead time of operation of the power converter, in the first capacitor, thereby attenuating said parasitic oscillation without substantial dissipation of the energy from the parasitic oscillations; and
  injecting current, into a winding on the secondary side, by discharging at least one of the auxiliary capacitor and the first capacitor.

23. The method according to claim 22, wherein the clamp switch is configured to be turned on at a moment of time after the main switch is turned off.

24. The method according to claim 22, wherein the clamp switch is configured to be turned off at a moment of time prior to the moment of time at which current passing through the secondary winding reaches a zero level.

25. The method according to claim 22, wherein the active clamp circuit includes a combination of two clamp diodes, and
wherein the current source circuit is configured as a current-injection circuit and includes
- a second diode in series with an injection winding and an auxiliary winding, each of the injection and auxiliary windings being at the secondary side;
- an injection switch disposed between the injection winding and the ground,
- an injection capacitor in series with and between the injection winding and the ground; and
- a third diode disposed between a point common to the injection winding and the injection capacitor and a terminal of a clamp diode from the combination of the two clamp diodes and
- the auxiliary capacitor between the terminal of the clamp diode, from the combination of the two clamp diodes, and the ground,
the method further comprising:
  turning the injection switch on to initiate said injecting current.

26. The method according to claim 25, wherein said injecting current includes injecting a current formed as a result of discharging the injection capacitor.

* * * * *